US012465841B2

(12) United States Patent
Brody

(10) Patent No.: US 12,465,841 B2
(45) Date of Patent: Nov. 11, 2025

(54) BASKETBALL ARCHITECTURE

(71) Applicant: Kevin J. Brody, Brecksville, OH (US)

(72) Inventor: Kevin J. Brody, Brecksville, OH (US)

( * ) Notice: Subject to any disclaimer, the term of this patent is extended or adjusted under 35 U.S.C. 154(b) by 659 days.

(21) Appl. No.: 17/947,147

(22) Filed: Sep. 18, 2022

(65) Prior Publication Data

US 2023/0012632 A1 Jan. 19, 2023

Related U.S. Application Data

(63) Continuation-in-part of application No. 17/088,554, filed on Nov. 3, 2020, now Pat. No. 11,484,759.

(51) Int. Cl.

| | |
|---|---|
| ***A63B 71/06*** | (2006.01) |
| ***A63B 24/00*** | (2006.01) |
| ***A63B 63/08*** | (2006.01) |
| ***A63C 19/00*** | (2006.01) |
| ***A63F 13/812*** | (2014.01) |

(52) U.S. Cl.

CPC ...... *A63B 71/0605* (2013.01); *A63B 24/0021* (2013.01); *A63B 63/083* (2013.01); *A63B 71/0622* (2013.01); *A63F 13/812* (2014.09); *A63B 2024/0028* (2013.01); *A63B 2071/0694* (2013.01); *A63B 2220/05* (2013.01); *A63B 2225/74* (2020.08); *A63C 19/00* (2013.01); *A63F 2300/8011* (2013.01); *A63F 2300/8082* (2013.01)

(58) Field of Classification Search

CPC ............ A63B 71/0605; A63B 24/0021; A63B 63/083; A63B 71/0622; A63B 2225/74; A63B 2071/069; A63B 2220/05; A63F 13/812; A63F 2300/801; A63F 2300/808; A63C 19/00

USPC .......................................................... 472/92

See application file for complete search history.

(56) References Cited

U.S. PATENT DOCUMENTS

| | | | | |
|---|---|---|---|---|
| 4,171,808 | A | 10/1979 | Bauer | |
| 4,482,157 | A | 11/1984 | McNeil | |
| 5,064,195 | A | 11/1991 | McMahan et al. | |
| 5,312,109 | A | 5/1994 | Cagle | |
| 5,549,293 | A | 8/1996 | Seifert | |
| 5,882,271 | A | 3/1999 | Byrd | |
| 6,390,940 | B1 | 5/2002 | Naulls et al. | |
| 6,554,724 | B2 | 4/2003 | Taylor | |
| 7,507,170 | B1 * | 3/2009 | Steen ................. | A63B 69/0071 473/472 |
| 8,986,140 | B1 | 3/2015 | Fuller | |
| 10,159,888 | B2 * | 12/2018 | Ianni ..................... | H04W 4/029 |

(Continued)

OTHER PUBLICATIONS

"Big3", Wikipedia, Nov. 21, 2017, link found at https://en.wikipedia.org/wiki/BIG3, 11 pages.

*Primary Examiner* — Joshua D Huson

(74) *Attorney, Agent, or Firm* — Eric D. Jorgenson; E.D. Jorgenson Law, LLC

(57) ABSTRACT

A basketball system comprising a court system having shot locations defined by shot location lines on the play surface and the shot areas defined by shot area lines on the play surface, and a goal system comprising a respective backboard suspended above the play surface at each opposing farthest end of the play surface, an instrumentation system comprises sensors to detect activities within the boundary line of the court system, and a respective penalty box for each team in which players, coaches, and referees can serve a penalty assessed for an infraction.

25 Claims, 19 Drawing Sheets

(56) References Cited

U.S. PATENT DOCUMENTS

| | | | | |
|---|---|---|---|---|
| 11,497,964 | B1 * | 11/2022 | Hunter | A63B 53/005 |
| 2001/0034278 | A1 | 10/2001 | Villacorta | |
| 2003/0054905 | A1 * | 3/2003 | King, Jr. | A63B 24/0021 700/91 |
| 2007/0135238 | A1 | 6/2007 | Dones | |
| 2008/0137038 | A1 | 6/2008 | Winstanley | |
| 2009/0143173 | A1 * | 6/2009 | Maki-Petaja | A63B 59/20 473/517 |
| 2011/0121987 | A1 * | 5/2011 | McDonnell | E05B 41/00 362/276 |
| 2012/0021855 | A1 * | 1/2012 | Brown | A63B 67/002 473/470 |
| 2012/0227340 | A1 * | 9/2012 | Seguin | A63C 19/12 52/247 |
| 2016/0317903 | A1 * | 11/2016 | Kurt | A63B 71/02 |
| 2020/0054930 | A1 * | 2/2020 | Simón Vilar | G06V 20/20 |
| 2021/0001196 | A1 * | 1/2021 | McCarter | A43B 3/34 |

* cited by examiner

1300

BASKETBALL ARCHITECTURE

BACKGROUND

Basketball remains one of the premier sporting events for fans around the world. In the professional venue, for example, the NBA (National Basketball Association) has a long history of adapting the game to allow its players the opportunity to excel and bring gameplay to its fullest potential.

However, one problem that is foremost in the existing basketball game (e.g., professional, college, etc.) is that the players have outgrown the original dimensions of the court as well as conventional scoring opportunities. For example, the size, strength, and speed of the professional NBA player is significantly greater than that of late 19th century athletes. In order to meet these evolving player characteristics, continue to retain fan excitement and participation, and ensure a safer environment for players and officials, the overall design of the basketball game and system needs to evolve as well.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed Basketball Architecture finds applicability and implementations as electronic- and/or software-based games (virtual "egames") in computing devices such as smart phones, tablets, portable and desktop computers, and servers, for example, all devices and systems capable of executing software algorithms, programs, and applications. The Basketball Architecture also finds egame implementations in standalone computing systems such as kiosks, and game centers typically provide standalone and single-user interaction gameplay systems, that can, for example, receive coins or other forms of credit/money/tickets, etc., to play the egame on the machine. In such an implementation, the single user can "play against the machine", where the software is executed by the machine software algorithms and electronics to outplay ("beat") the single user.

Accordingly, as described in detail herein, the basketball game system comprises: a court system having a play surface on which gameplay occurs, the play surface defined by a boundary line imposed on the play surface and within which gameplay occurs, the court system comprising: shot locations and shot areas, the shot locations defined by shot location lines on the play surface and the shot areas defined by shot area lines on the play surface; and a goal system comprising a respective backboard suspended above the play surface at each opposing farthest end of the play surface; and an instrumentation system of sensors which detects play activities within the boundary line of the court system and non-player activities outside the boundary line of the court system, the instrumentation system derives ball data sensed from ball location and ball heading as a player advances the ball toward a specific goal, the instrumentation system interfaces to the goal system to control features of the respective backboards during the gameplay, the instrumentation system executes rules of gameplay as part of the gameplay, the rules based in part on the ball data, player and non-player activities relative to the court system, the goal system, lines on the play surface, and player interactions relative to each other and the lines during the gameplay.

The basketball game system is employed as part of at least one of a virtual game or a physical game, the virtual game mimics at least one of a physical game previously played, a game currently being played, or a computing device generated game. The virtual game can be played using consoles, virtual reality glasses and headsets, electronic eyewear, avatars, neural nets, augmented reality, artificial intelligence, and television monitors. The virtual game enables a single user to compete as part of a first virtual team against another virtual team, one or both virtual teams generated by a computing device. The virtual game and the physical game comprise no more than three periods of agreed-upon timed gameplay. The gameplay includes at least six players and up to four referees who officiate the gameplay.

The system can further comprise a respective penalty box for each of two teams participating in the gameplay, each penalty box of a respective team located outside the boundary line, wherein each respective penalty box can accommodate at least one player who has created an infraction, the infraction time-based and after time expiration the one player can be released for further gameplay play or ejected from the game.

The system can further comprise a respective penalty box for each of two teams participating in the gameplay, wherein the rules of gameplay include directing at least one of an official, a coach, or a player to the penalty box due to one or more penalties. The goal system is controlled to display a shot cue on a corresponding backboard based on location and heading of a player currently in control of the basketball, the cue suggests where a ball of a shot made by the player should impact the corresponding backboard to score a goal.

The shot cue is displayed only when attempting a goal which scores at least a predetermined number of points. The shot cue is displayed only when attempting a goal from a specified location on the court. The shot cue is prevented from display on the backboard when the player attempting the shot causes an infraction while attempting the shot.

In another implementation, a basketball game system is disclosed where the system comprises: a court system having a play surface on which gameplay occurs, the play surface defined by a boundary line imposed on the play surface and within which gameplay occurs, the court system further comprising shot locations and shot areas, the shot locations defined by shot location lines on the play surface and the shot areas defined by shot area lines on the play surface, and a goal system comprising a respective backboard suspended above the play surface at each opposing farthest end of the play surface; an instrumentation system which comprises sensors to detect activities within the boundary line of the court system, which activities detected comprise ball data sensed from ball location and ball handler identification as the ball handler attempts to advance the ball toward a specific goal, line infraction data obtained relative to play surface lines, player infraction data related to player interactions during gameplay, and shot point data to score relative to a shot location line; and a respective penalty box for each team in which to serve a penalty assessed for an infraction, the respective penalty box located outside the boundary line and proximate to a corresponding team.

Each respective penalty box can accommodate at least one player assessed with an infraction, the infraction time-based such that after expiration of the associated infraction time, the at least one player can be released for further gameplay play or ejected from the game. The penalty assessed and to serve in the penalty box relates to a breakaway foul, a single technical foul, two single technical fouls, and a double technical foul. The penalty assessed for a single technical foul after a prior double technical foul or a double technical foul after a prior single technical foul, is ejection from the game.

A penalty assessed for a single flagrant foul is equivalent to a single technical foul, which is two minutes in the penalty box. A penalty assessed for a second flagrant foul is equivalent to a double technical foul, which is five minutes in the penalty box. A player serving time in the penalty box can return to play only when there is an official stoppage of play. A coach is subject to an assessed infraction by serving time in the penalty box. The coach is subject to an assessed additional infraction for coaching while in the penalty box, which time associated with the additional infraction is served while the coach is in the penalty box for a prior infraction. A referee is subject to an assessed infraction and penalized by serving time in the penalty box. The line infraction data is processed to determine when a shot attempt by a player is to be a specific point value.

The basketball game system is employed as part of at least one of a virtual game or a physical game, the virtual game mimics at least one of a physical game previously played, a game currently being played, or a computing device generated game, the virtual game played using at least one of consoles, virtual reality glasses and headsets, electronic eyewear, avatars, neural nets, augmented reality, artificial intelligence, or television monitors, the virtual game enables a single user to compete as part of a first virtual team against another virtual team, one or both virtual teams generated by a computing device.

In another implementation, a basketball game system is disclosed comprising, a court system having a play surface on which gameplay occurs, the play surface defined by a boundary line imposed on the play surface and within which gameplay occurs, the court system further comprising shot locations and shot areas, the shot locations defined by shot location lines on the play surface and the shot areas defined by shot area lines on the play surface, and a goal system comprising a respective backboard suspended above the play surface at each opposing farthest end of the play surface; an instrumentation system which comprises sensors to detect activities within the boundary line of the court system, which activities detected comprise ball data sensed from ball location and ball handler identification as the ball handler attempts to advance the ball toward a specific goal, line infraction data obtained relative to play surface lines, player infraction data related to player interactions during gameplay, and shot point data to score relative to a shot location line; and a respective penalty box for each team in which to serve a penalty assessed for an infraction, the respective penalty box located outside the boundary line and proximate to a corresponding team.

The instrumentation system further comprises a shot location system which detects on the play surface from where a shot attempt of a specific point amount has occurred, a shot detection system which detects on the play surface when a shot is taken, a goal indication system which detects which of several goal indications to activate based on a made or missed goal, an image recognition system which detects the player who attempted the shot, and a floor sensing system which detects location of the ball and players relative to lines on the play surface.

The image recognition system further detects activities on and off the court as relate to behavior of players and non-players, the players and non-players can be assessed penalties associated with the activities. The basketball game system is employed as part of at least one of a virtual game or a physical game, the virtual game mimics at least one of a physical game previously played, a game currently being played, or a computing device generated game, the virtual game played using at least one of consoles, virtual reality glasses and headsets, electronic eyewear, avatars, neural nets, augmented reality, artificial intelligence, or television monitors, the virtual game enables a single user to compete as part of a first virtual team against another virtual team, one or both virtual teams generated by a computing device.

The basketball architecture that provides a safer environment for the players in which to play the game and officials to officiate the game while improving the flow of the game. The architecture further enables players of any age group and level of talent room to grow at least in the sense of shooting abilities and overall gameplay. Additionally, while fan interest tends to wane or even be non-existent in existing sports venues near the end of the game (i.e., the clock is close to "running out"), at least one goal of the disclosed court design and increased number of point-scoring opportunities is to keep the outcome of the game in doubt as long as possible, and thereby keeping fans in their seats as long as possible.

The disclosed basketball architecture finds applicability to a wide variety of basketball venues such as the NBA (National Basketball Association), WNBA (Women's National Basketball Association), NCAA (National Collegiate Athletic Association), U.S. high schools, and U.S. junior high schools, and FIBA (International Basketball Federation or more specifically, Federation Internationale de Basket-ball)).

In support thereof, the disclosed architecture comprises a basketball goal system, comprising a backboard assembly positioned above a basketball game playing surface, the backboard assembly comprising; a backboard having a back surface and a front surface; a suspension frame affixed to the back surface; and a goal affixed to the front surface; a suspension structure connected on a proximal end to the suspension frame of the backboard and secured on a distal end to a supporting foundation, the suspension structure suspends the backboard assembly above the playing surface, which can be at a basketball arena; and a goal indication system which interfaces to the suspension structure to cause an indication to be presented via the suspension system, the indication relates to the shot points associated with a shot attempted at the goal.

The suspension structure provides primary strength in supporting above the playing surface, at least loading of the backboard assembly, gameplay interactions with the backboard assembly, and peripheral systems proximate the backboard assembly and above the playing surface. The suspension structure further comprises a light transmissive property where, at least one of light impinged on the suspension structure or light caused to be generated within the suspension structure, causes the suspension structure to emit a color indicative of the points associated with the shot attempted at the goal.

The suspension structure is at least one of, a goose-necked structure affixed at the distal end to a floor surface and which is controlled to change color based on the shot points associated with the shot attempted at the goal, or an overhead structure which suspends the backboard assembly from above and is controlled to change color based on the points associated with the shot attempted toward the goal. The suspension structure is encased in a light transmissive material which can be caused to transmit a color by the goal indication system, which color indicates the shot points of a shot attempted at the goal. The suspension structure can be constructed entirely of a light transmissive material which can be caused to transmit a color by the goal indication system, which color indicates the shot points of a shot attempted at the goal.

The architecture can further comprise at least one display system mounted proximate the back surface of the backboard and at the proximal end of the suspension structure, the at least one display system presents basketball gameplay actions for viewing by viewers in attendance at the basketball arena. At least one of the suspension structure, the goal, the suspension frame, or the backboard, comprise graphene as a strength material. The suspension structure can comprise light emitting electronics controlled to emit light of a specific color which corresponds to the shot attempted at the goal. The backboard can comprise elements that are controlled to emit light of a specific color which corresponds to the shot attempted at the goal.

The goal indication system further interfaces to the backboard to cause presentation of a cue on the front surface of the backboard, the cue of a color related to shot points associated with the shot attempted at the goal. The cue indicates where the attempted shot should impact the backboard for a goal based on the location from where the shot is attempted.

The backboard goal system can be a standalone system designed for at least one of personal use at a private venue or public use at an outdoor public venue. The backboard can be of a fan-based design of planar rectangular dimensions having opposing upper corners on a top horizontal side and opposing lower corners on a bottom horizontal side, the opposing lower corners proximate the goal and upwardly-angled to respective vertical sides, and opposing upper corners above the goal and arcuate from the vertical sides to the top horizontal side.

In another implementation, a basketball goal system can be provided comprising a backboard assembly positioned above a basketball game playing surface, the backboard assembly further comprising a backboard, a suspension frame affixed to a back surface of the backboard, a goal affixed to a front surface of the backboard; a suspension structure connected on one end to the suspension frame of the backboard, and secured on a distal end to a supporting structure for suspending the backboard assembly above the playing surface, the suspension structure further comprises a light transmissive property for emitting light; and a goal indication system which interfaces to the suspension structure to cause the suspension structure to emit a color of light which relates to shot points associated with a shot attempted at the goal. The color of light is emitted from the entire suspension structure.

The suspension structure is at least one of, encased in a light transmissive material which can be controlled by the goal indication system to emit the color of light or made entirely of a light transmissive material which can be controlled by the goal indication system to emit the color of light. The suspension structure comprises light emitting elements controlled by the goal indication system to emit the color of light which corresponds to the shot points attempted by the shot at the goal. The backboard comprises light emitting elements controlled by the goal indication system to emit light of a specific color which corresponds to the shot attempted at the goal.

The goal indication system can further interface to the backboard to cause presentation of a cue on a front surface of the backboard, the cue of a color corresponding to shot points associated with the shot attempted at the goal, the cue indicates where on the front surface of the backboard the attempted shot should impact for a goal based on a location from where the shot is attempted. The backboard goal system can also be a standalone system designed for at least one of personal use at a private venue or public use at an outdoor public venue.

In yet another implementation, a basketball goal system can be provided where the system comprises a backboard assembly positioned above a basketball game playing surface, the backboard assembly further comprising a backboard, a suspension frame affixed to a back surface of the backboard, a goal affixed to a front surface of the backboard; a suspension structure connected on one end to the suspension frame of the backboard, and secured on a distal end to a supporting structure for suspending the backboard assembly above the playing surface, the suspension structure further comprises a light transmissive property for emitting light; a goal indication system which interfaces to the suspension structure to cause the suspension structure to emit a color of light which relates to shot points associated with a shot attempted at the goal, the goal indication system further interfaces to the backboard to cause presentation of a cue on a front surface of the backboard, the cue of a color corresponding to shot points associated with the shot attempted at the goal; and a display system mounted proximate the back surface of the backboard and at the proximal end of the suspension structure, the display system presents basketball gameplay actions for viewing by viewers in attendance at the basketball game.

The cue indicates where on the front surface of the backboard the attempted shot should impact for a goal based on a location from where the shot is attempted. The backboard comprises light emitting elements around a perimeter, which elements are controlled by the goal indication system to emit light of a specific color which corresponds to the shot attempted at the goal, the goal indication system controls the backboard elements and light emission of the suspension frame in synchronism or out of synchronism. The cue indicates where on the front surface of the backboard the attempted shot should impact for a goal based on a location from where the shot is attempted.

Other novel features include an enhanced court which exhibits features such as updated dimensions and court visual markings (also referred to as annotations and artifacts) that accommodate and promote the increased size and athletic capabilities of the players, as well as improve the game at least insofar as playing and viewing. For example, the improved court architecture includes increased point scoring opportunities such as for four-point goals and five-point goals, as well as clearly marked scoring areas on the court surface from which to make these shots.

The use of colorization of selected areas of the court surface facilitate increased visual acuity of the players in determining from where shots should be taken and for officiating to ensure the proper scoring and game rules are enforced. The use of contrasting colors of court features such as shooting areas enables players who may be color-blind, for example, or have other visual deficiencies to still compete and enjoy the game. Moreover, colorization can be used to enhance the contrast between adjacent scoring areas and other floor features so that players and officials can more readily determine where they are on the court and to more quickly make decisions based on the current court location.

Additionally, a redesigned backboard system also facilitates the increased likelihood of making the four-point and five-point shots by incorporating backboard shot cues at which the shooting player can aim to make these longer shots.

More specifically, the court has increased dimensions and incorporates additional shooting locations for an increased number of points not currently employed in basketball courts. For example, the court includes one or more four-point shooting locations, and a larger and more expansive three-point area for shooting three-point shots. In one implementation, the three-point line can be entirely an arc, which contrasts with existing basketball three-point design of a semi-circular arc with added straight lines. Additional features include increasing the distance from the baseline to the center of the basket (also referred to as the "hoop"), which introduces additional room for players to traverse this area behind the basket, as well as facilitating the use of additional four-point shooting areas by the back baseline and on either side of the basket.

In another implementation, the court surface is clearly marked into five scoring areas, and can use different floor colorations and floor shot cues from which to attempt the shots. This further enables not only four-point shots, but also five-point shots, and even six-point shots. The flexibility of the disclosed implementations enable the user to decide to what extent high-point scoring will be employed, the associated floor shot cues and other markings, and the backboard shot cues.

More specifically, and in one implementation, the dimensions of the court are increased from an existing length of ninety-four feet to a new length of one hundred feet, and from an existing width of fifty feet to a new width of fifty-four feet. In another implementation, the dimensions of the court are increased from an existing length of ninety-four feet to a new length of one hundred feet, and from an existing width of fifty feet to a new width of fifty-six feet.

The added area in the new court dimensions can be used to increase the distance to the baseline by an additional one foot (where a "baseline" is a short side (or width line) on the boundary line of the rectangular court, and is also referred to as the "back baseline"). For example, it is to be appreciated that the distance between the baseline and the center of the basket in an existing court, ranges from approximately sixty-three inches to sixty-four inches, whereas the new distance in the updated court ranges from approximately seventy-five inches to seventy-six inches.

Another new feature due to the increased court dimensions relates to the three-point line (also called the three-point shot line). In existing basketball courts, the three-point line is a combination of an arc and straight-line segments, such as a semi-circular arc, the ends of the arc which are then connected to straight lines (segments) to the back baseline, and which straight line segments are parallel to the sidelines. The three-point arc (which forms some or all of the three-point line) can be a partial circle (e.g., a semi-circular arc (of 180-degrees), a minor arc (of less than 180-degrees), or a major arc (of greater than 180-degrees)).

However, in one new implementation, the distance from the center of the basketball hoop to the three-point line can be extended three inches to a new distance of twenty-four feet, over the existing twenty-three feet, nine inches. Additionally, in alternative implementations, the three-point line can be entirely in the shape of a partial circle (an arc) (where the straight lines of the existing court are essentially replaced by the three-point arc), or a combination of a semi-circular arc and straight-line segments. With the three-point line at twenty-four feet, a player has more room outside the perimeter of the three-point shot line with which to shoot a three-point shot while avoiding a line infraction by stepping on the sideline, for example.

Based on these updated dimensions and features, the four-point scoring opportunities can be incorporated into the updated basketball court at or near the mid-court line (also called the center court line or mid-court division line) and other locations such as near the baseline. The four-point scoring locations can be demarcated by a four-point line (or four-point shot line) and/or as a four-point shot box.

For example, the four-point shot line at mid-court can be a straight line extending across the court width and parallel to the mid-court line, and of a predetermined distance from the mid-court line (e.g., a maximum of two feet, three feet, four feet, six feet, etc.). Alternatively, the four-point shot line at mid-court can be entirely a minor arc (the "apex" of which is offset from the mid-court line a predetermined distance, where the "apex" is the point on the four-point shot line closest to the mid-court line). Still alternatively, the four-point shot line at (or near) mid-court can be a combination of a minor arc (the apex of which is offset from the mid-court line a predetermined distance) and straight line segments to the sidelines, where any point on the four-point shot line is no closer to the mid-court line than the radius of the center court jump circle (e.g., six feet in the NBA, WNBA, NCAA, U.S. high schools, and U.S. junior high schools, and a smaller radius for FIBA). In either or both of the alternative implementations, the apex of the four-point shot arc line as relates to the outer circle of the center court jump ball area, is congruent with the outer circle, adjoins the outer circle, or is adjacent to the outer circle.

In all cases of the four-point shot line at or near mid-court, a goal made by an offensive player "behind" the four-point shot line is scored as four points. Thus, the four-point scoring area "behind" the line comprises the entire offensive court area (across which the offensive team brings the ball down court into the defensive court area) and the area from the mid-court line to the four-point shot line in the defensive court area. The four-point shot must be made behind (the edge of the four-point line away from the basket to which the shot is being attempted) the four-point shot line and within the sideline boundaries; otherwise, the shot made will be three points or less. In other words, in one implementation, the four-point shot line begins approximately forty-one feet, eight inches from the center of the basketball hoop.

The baseline four-point shot scoring locations (also referred to as four-point shot "box(es)" (e.g., polygons)) are near the baselines of the team court areas and facilitate four-point "side" shots to the hoop (or goal). Where the three-point line is entirely a major arc, a four-point shot box can be defined as a polygon having a first side as part of the sideline, a second side as part of the baseline, a third side as an arcuate part of the three-point shot line with one end of the arcuate part intersecting the baseline, and the fourth side as a straight line from the other end of the arcuate part to the sideline, where the fourth side is parallel to the baseline.

Where the three-point line comprises a semi-circular arc and straight-line segments, the four-point shot box can be defined as a polygon having a first side as part of the sideline, a second side as part of the baseline, a third side as one of the straight-line segments, and the fourth side as a straight line from one end of the straight-line segment to the sideline (where the fourth side is parallel to the baseline). When using the larger court dimensions of fifty-four feet wide and fifty-six feet wide, the four-point shot box can be approximately thirty-six inches wide and seventy-three inches long, and forty-eight inches wide and seventy-three inches long, respectively.

In one implementation, the fourth side of the four-point shot box coincides with an imaginary hoop center line parallel to the baseline, and which extends across the width of the basketball court and through the center of the goal. In an alternative implementation, the fourth side of the four-point shot box is not part of the imaginary hoop center line.

The four-point scoring location of the first court area is bounded by, a four-point scoring line in the first court area that extends across the court proximate a center court line, and a baseline of the opposing court area. In a four-point scoring line implementation, every point of the four-point scoring line in the first court area is at least two feet from every point on the center court line. The four-point scoring line in the first court area can be a straight line that extends across the court and parallel to the center court line. The first court area can include a three-point scoring location, the three-point scoring location bounded by a three-point arc, the boundary line, and the four-point scoring line. The three-point arc comprises a semi-circle the center of which is vertically aligned with a center of the goal. The three-point arc is a semi-circular arc having a first end and a second end, the first and second ends each connect to a straight-line segment that extends to the baseline, the straight-line segments parallel to a sideline.

In another implementation, the four-point scoring line in the first court area includes an arcuate section having a radius of curvature equal to or greater than a radius of curvature of the three-point arc. The four-point scoring line in the first court area includes the arcuate section, and a straight-line section connected at each end of the arcuate section, the straight-line sections intersecting corresponding sidelines of the court. The first court area further comprises a second four-point scoring location, the second four-point scoring location adjacent to a baseline of the first court area.

In yet another implementation, a basketball court is described on which basketball gameplay is performed, the court comprising: a rectangular court surface which includes a boundary line that circumscribes court areas within which the gameplay occurs, the court areas include a first court area and an opposing court area, the court surface includes visual artifacts that facilitate the gameplay; at least one four-point scoring location in each of the court areas from which a shot can be made to a goal, the four-point scoring location of each court area bounded in part by a corresponding four-point scoring line, the four-point scoring line in the first court area is at least two feet from every point on a center court line; and, a three-point scoring location in each of the court areas, the three-point scoring location bounded by, in part, the four-point scoring line, the boundary line, and a three-point line.

The first court area and the opposing court area define the rectangular court surface, which rectangular court surface exceeds a width of fifty feet and exceeds a length of ninety-four feet. The first court area includes a three-point arc that serves as a three-point shot line, the three-point arc is a semi-circular arc having a first end and a second end, the first and second ends each connect to a straight-line segment that extends to a back-court baseline, the straight-line segments parallel to a sideline.

The four-point scoring line in the first court area includes an arcuate section having a radius of curvature equal to or greater than a radius of curvature of the three-point line. The first court area comprises at least three four-point scoring locations: a first four-point scoring location proximate the center court line, a second four-point scoring location on one side of the goal and bounded on one side by a back-court baseline, and a third four-point scoring location on an opposite side of the goal relative to the second four-point scoring location and bounded on one side by the back-court baseline. The four-point scoring line of the first court is non-intersecting to the three-point line.

In another implementation, the court surface is clearly marked into five scoring areas, and can use different floor colorations and floor shot cues from which to attempt the shots. This further enables not only four-point shots, but also, optionally, five-point shots, and optionally, even six-point shots. The flexibility of the disclosed implementations enable the user to decide to what extent high-point scoring will be employed, the associated floor shot cues and other markings, and the backboard shot cues.

In a variation on aspects of the disclosed basketball architecture and with existing basketball rules, certain novel features can be employed to affect game strategy and thereby improve the flow of the game while also improving on fan interest over what currently exists in sports. Game stoppage is a major negative aspect of gameplay, as well as waning fan attention or interest in the closing minutes of the game or any time segment of the game (e.g., a quarter) when the apparent possibility of a team recovering to win the game, is seemingly impossible.

The following novel features can negate certain aspects normally associated with existing basketball games by reducing the time of gameplay while increasing fan interest until the game clock runs out. In one example, gameplay can be shortened in time such as to ten-minute quarters, for example, rather than quarters using a greater amount of time such as twelve minutes. The disclosed architecture and features offer more excitement in less time than existing basketball designs.

One specific example which now occurs quite frequently in basketball play is the Hack-a-Shaq play. The Hack-a-Shaq play is defined on Wikipedia™ as "a basketball strategy initially instituted in the NBA . . . to hinder the scoring ability of the opposing team by continuously committing personal fouls against one of its opposing players, the player chosen being the one with the weakest free throw percentage among players on the court." This play not only significantly reduces the flow of the game to "a crawl" by using what many people consider as substandard play techniques, but also reduces fan excitement and increases the possibly of player injury by the continual fouling that occurs.

As a novel feature that counters the Hack-a-Shaq play, basketball play can now incorporate features/rules/structure of other sports. For example, fouls can be similarly categorized as in existing gameplay, but the penalties can be enhanced to mitigate bad player behavior. Thus, in accordance with optional feature of the basketball architecture, and similar to an aspect of ice hockey, a player committing a foul can be directed to a penalty area to sit for a predetermined amount of time (e.g., two minutes) or until an event has occurred in the gameplay, such as the offensive team scored. The penalty area can be located along the court perimeter so that the player(s) sitting in the penalty area are isolated from other team players and the coach.

The use of the penalty area provides a team "power play" that does not currently exist in basketball, but would give the fouled team at least a one-man advantage until such time as a terminating event occurs. Furthermore, it is conceivable to incorporate features that enable multi-player power plays where the same team has two players or more in the penalty box. Such features would retain also fan interest until the last second of the game while maintaining the flow of the game. This feature can apply at least to five and six-player basketball teams.

Another feature that can be employed alone or in combination with the penalty box can be increased penalty shots based on where the penalty was called. For example, if the player was fouled while attempting a three-point shot, the number of free throws awarded to the fouled player will also be three. This feature also applies to five and six player teams (if higher-point shots such as five-point shots and six-point shots).

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
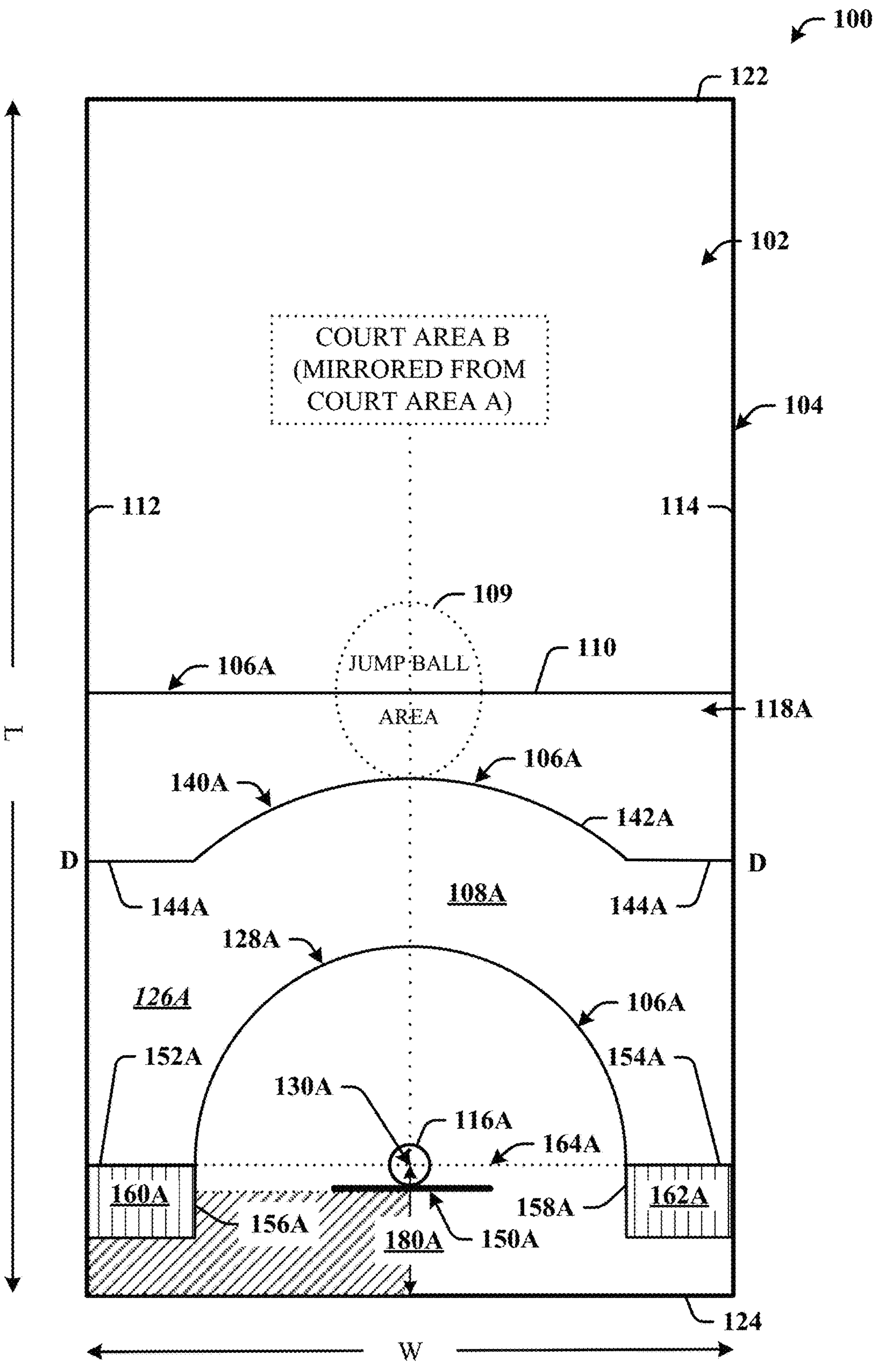
FIG. 1 illustrates an implementation of a basketball court showing correspondingly alternative dimensions and features for enhanced gameplay.

Court-based sports, such as basketball, need to adapt to the increased size, strength, and athletic capabilities of the players. For example, existing court dimensions and scoring zones (also referred to as "shot locations") in the NBA (National Basketball Association) are no longer challenging for many of the players. This potential disconnect between existing court limitations and enhanced player athletics can have an effect on the economics of the sport by way of fan attendance and participation in other ways, whether at the arena or viewing the sporting event on television or computing devices. Thus, a basketball court architecture so designed and employed that enhances gameplay and player talents can have a significant impact on fan interest, and consequently, profitability of the sport whether professional, collegiate, or otherwise.

Additionally, existing gameplay has changed in several ways from its initial inception. Each change has been an attempt to make the game more entertaining. In one significant way, the game is no longer the game of the "big man" (the tall center) who when on offence is strategically positioned under or near the basket and to whom the ball is passed to setup or to make the shot. In other words, once the ball is passed to the "big man" play collapses to the "big man" and he passes the ball out to a player who takes the shot. On defense, the "big man" roams the close-in area under and around the basket to block shots.

Today's games are dominated by "wing" play where outside (non-center) players take a more direct role in scoring by taking "outside" shots, which are farther from the basket. The further introduction of the three-point shot in combination with "wing" play typically pushes the outside shot to the three-point line. This forces the defense to move farther away from the basket to defend against the three-point shot. Consequently, the game now provides more opportunities for the "slashers", who are quicker players that use their athletic ability to score such as to lob shots from the three-point line, drive-in to the basket to either shoot the close-in shot or pass out to an open player, or to receive a pass from a wing player. This evolution provides more fan enjoyment.

The disclosed basketball architecture comprises a redesigned ("updated") sporting surface that among many things provides a safe environment for the players in which to play the game and officials to manage gameplay. The disclosed updated court exhibits new court dimensions and features that meet the needs of evolving player capabilities (e.g., physical, shooting, passing, etc.) and at least maintain or increase fan interest in the sport by further incorporating additional shooting locations and scoring opportunities, such as with four-point shots, five-point shots, and even six-point shots. (In a sports venue, a court is defined as an open and level area marked with appropriate lines and indications upon which a game is played.)

Using the more expansive court and potentially the higher-point scoring opportunities, the disclosed basketball architecture opens the game up further by providing strategic importance to many new areas of the entire court. Thus, players will need to defend much sooner as the offensive team brings the ball down the court, and the defense will be more spread out to defend against offensive scoring. The "full court press" will no longer be unusual, but may be quite commonplace in the game to guard against attempts at the higher-point shots as the ball is brought down the court.

In keeping with these increased features of larger court size and more opportunities to score, it is conceivable that the basketball team can be expanded to six players during play. No longer will the game be focused solely on the one or two dominantly tall players but can move to a more balanced approach for the all-around skilled player. Thus, passing and running will be even more important, and equally entertaining to the fans.

A prime objective in any sport is to keep the game moving, and thus exciting for the fans. Increased scoring opportunities build fan excitement and prolong interest in the game by extending the doubt in the outcome. Increasing the length and width of the court not only enables the implementation of a full three-point arc, but also opens the game for more speedy and skilled players to maneuver, which, in turn, increases spacing on the floor to promote driving plays to the basket. Additionally, the passing game becomes an even more important aspect on the new court.

The increased dimensions enhance gameplay in several ways by at least improving the flow of the game. Unnecessary stoppage of play is not helpful in any game or sport, at least with respect to maintaining fan excitement. Thus, increasing the distance behind the basket in the disclosed updated (expanded) court also reduces the chance that players will be forced out-of-bounds, as well as inadvertently touching the baseline and triggering an out-of-bounds infraction. Moreover, given this additional area provided by this expanded court, it is conceivable that players and coaches will generate plays that use the additional space, such as behind the basket, for example.

It is to be understood that although the description focuses on the dimensions of the professional basketball court, the updated features described herein can be applied to smaller courts that may be used by colleges, high schools etc., by simply reducing in proportion to the reduced dimensions of the court, as one way to accommodate the disclosed new court features.

Additionally, the court dimensions enable a new facet to the game in the implementation of four-point scoring opportunities. The increased dimensions of the court easily incorporate one or more four-point shot areas (also referred to as four-point scoring areas or locations) that are fair and consistent with the abilities of more experienced players (e.g., college, professional, etc.). It is to be understood that any new multi-point shots and court features introduced into this new basketball architecture are compliant with existing basketball rules. Thus, for example, the ball must be inbounded and the clock running for the shot to be valid.

Other potential benefits include the capability of adding a fourth referee/official to officiate games. If this were to occur, the added official would be better employed on the new court than on the current court due to the increased dimensions in the new court, and consequently, improved safety to both officials and players on the improved court disclosed herein. As another benefit, the enhanced size of the new court encourages amateur players to consider improving basic skills such as ball handling, shooting, and passing before entering the professional draft. Moreover, a player may choose to spend more time in college in order to improve their draft status. An older player with more time in college will improve the overall play in the professional game, once drafted, as well as improve the college game.

Some specific changes and components of the updated court include increasing the outward dimensions of length (L) and width (W) (in the format of L×W feet). For example, in one implementation, existing court dimensions of ninety-four feet by fifty feet can be increased to one hundred feet by fifty-four feet in the updated court. In another implementation, existing court dimensions of ninety-four feet by fifty feet can be increased to one hundred feet by fifty-six feet in the updated court.

The increased dimensions can be used to extend the back baseline (e.g., one or more feet), for example. Additionally, the current distance between the back baseline and the center of the basket (also referred to as the "hoop") can be increased (e.g., ranging from approximately seventy-five inches to seventy-six inches), as desired, as this is not a requirement.

Further improvements include increasing the distance between the center of the basketball hoop to the three-point arc (as part of the "three-point line" or "three-point shot line") of the existing court (e.g., extending the distance three inches to a total of twenty-four feet).

The three-point line can comprise the three-point arc (a curved line) which is defined by a curved segment of a two-dimensional geometric shape having, a curved line the ends of which connect to form a closed loop (e.g., geometric objects as a circle, an ellipse, etc.).

In the implementation of a circle, the curved segment is a circular segment—a region of a circle defined by an arc and a chord of the circle (in geometry, a chord is a straight-line segment whose endpoints both lie on a circle or arc of the circle) that connects the endpoints of the arc. When the arc is of a circle, the angle measure of the arc can be less than one hundred eighty degrees (referred to herein as a "minor arc"), exactly one hundred eighty degrees (referred to herein as a "semi-circle arc" or "or semi-circular arc"), or greater than one hundred eighty degrees (referred to herein as a "major arc"). The angle measure is the angle (in degrees) created using the circle center as the angle vertex and the arc endpoints forming the two respective lines joining at the vertex. When using a closed-loop geometric object other than a circle, the angle measure can be determined using the vertex as anywhere in the closed loop object (e.g., the center of an ellipse).

Generally, the three-point line can include the arc of a circle, as well as arcs, lines, etc., of other two-dimensional geometric shapes defined on the (surface of) court. Thus, in one implementation, the three-point line (from which three-point goals are made (the ball goes through the hoop or basket) are worth three points) can be only the arc of a circle (e.g., a major arc).

In another implementation, the overall length of the three-point line is increased and thereby extended toward the center of the court (the "top of the arc" is a point of the arc closest to the mid-court line). This can be accomplished by including the semi-circular arc, and on one end (a first arc endpoint) of this arc appending a first straight line (segment) of a first length that extends from the first arc endpoint to the back baseline, and on the other end of the arc (a second arc endpoint) appending a second straight line (segment) of the same first length that extends from the second arc endpoint to the back baseline.

Alternatively, in this latter implementation, the overall length of the three-point line is extended toward the center of the court (mid-court line) by including the arc of a circle (e.g., greater than the semi-circle) and on one end of this arc (the first arc endpoint), appending a first straight line of a first length that extends from the first arc endpoint of the chord to the back baseline, and on the other end of the arc (the second arc endpoint), appending a second straight line of the same first length that extends from the second arc endpoint of the chord to the back baseline.

In still another implementation, a four-point scoring opportunity (one or more shooting locations from which a player can make a goal to score four points, also referred to as "the 4-point line" and/or "4-point shot" area) can be incorporated in the court (within the rectangular dimensions of the court). For example, in one implementation, a four-point scoring opportunity can be located near the center of the basketball court (i.e., near the mid-court line). The 4-point scoring opportunity at this location, for example, can be a line that is perpendicular to a sideline and extends the width of the court (which is also parallel to the baseline at each end of the court).

In another implementation, a four-point scoring opportunity can be located in one or more spaces within the court dimensions, near the back baseline and, bounded by the back baseline, sideline, a portion of the arc of the circle, and a line extending from the arc (arc endpoint) to the sideline.

In yet another implementation, a four-point scoring opportunity can be located in one or more spaces within the court dimensions, near a back baseline and, bounded by the back baseline, sideline, a line segment of the three-point shot line that is parallel to the sideline and extends to the back baseline, and a line segment extending from the three-point shot line to the sideline and parallel to the baseline.

It is to be understood that most, if not all, features described herein with reference to full court gameplay, can also be applied to half-court gameplay. Half-court gameplay typically only requires half of a full-sized court. Thus, one out-of-bounds baseline now becomes what is normally the mid-court line in the full-sized court. Half-court play is commonly known; however, the use of four-point shot zones as described herein are not.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates an implementation of a basketball court 100 showing corresponding dimensions and features for enhanced gameplay, in accordance with the disclosed architecture. In this implementation, the dimensions of the court 100 are increased from the existing length of ninety-four feet to one-hundred feet, and the width of the court is increased from fifty feet to fifty-four feet. In another alternative implementation, the dimensions of the court 100 can be increased from the existing ninety-four feet to one-hundred feet, and the width of the court is increased from fifty feet to fifty-six feet.

The basketball court 100 comprises a substantially rectangular design and a court surface 102. The court 100 is defined as having two long sides (coincidental and parallel to the length L) and two short sides (coincidental and parallel to the width W): a long side 112 (also referred to sideline 112), another long side 114 (also referred to sideline 114), a short side 122 (also referred to baseline 122), and another short side 124 (also referred to baseline 124).

The court surface 102 has marked thereon a boundary line 104 within which the gameplay occurs (is restricted), and various other markings/visual artifacts/visual cues that facilitate shooting, scoring, and officiating gameplay. For example, a center court line 110 (also referred to as the mid-court line 110) is a line marking that extends across the width of the court 100 from sideline 112 to sideline 114, and divides the court 100 (and court surface 102) into two identical play areas: Court Area A (labeled 108A) and Court Area B (labeled 108B). Other markings (visual cues or artifacts) on the court surface 102 that facilitate gameplay and are commonly used, include but are not limited to, a center-court jump circle 109, the free throw section (not shown here), and so on, some of which are depicted in later figures.

Although describing in detail only Court Area A of the court 100, it is to be understood that Court Area B is mirrored in every detail relative to the center court line 110 that extends the width of the court 100, so as to provide two identically sized (dimensioned), marked, and equipped (e.g., hoop, backboard, etc.) areas for gameplay.

The description now focuses on the "Court Area A" (also referenced as court area 108A) end of the court 100, with like-designated numbering referring to corresponding items/areas that are mirrored on the "Court Area B" end of the court 100 (e.g., where 108A indicates an item/area in the Court Area A, 108B indicates the duplicate item/area in Court Area B, while the description of 108 refers to both 108A and 108B).

The court surface 102 can also include visual cues or artifacts 106 and that facilitate the gameplay. The visual artifacts 106A (e.g., lines, sideline/baseline hash marks, shot lines, mid-court line, etc., three instances of which are labeled in FIG. 1) provided on the court surface 102 in court area 108A enable structured gameplay according to well-defined rules. For example, such artifacts 106 can include lines, circles, arcs, hash marks, lettering, polygons of any shape and size, etc., and virtually any type and kind of mark/object that facilities/enables gameplay.

The court surface 102 further comprises well-demarcated scoring areas on the court 100. For example, the court area 108A is an area bounded by the boundary line 104 (on three sides) and the center court line 110 of the court 100.

A goal 116A (also referred to as "the hoop") can be positioned (e.g., suspended) above each court area 108, such as court area 108A. The goal 116A can be a basketball hoop of dimensions that conform to current basketball regulations. For example, the current hoop diameter in gameplay is eighteen inches; however, the hoop diameter can be changed in any desired way to enhance gameplay in accordance with the disclosed implementations. In one example, the hoop diameter can be increased to nineteen inches, and even twenty inches or more to further increase the likelihood of scoring from the long and higher-point shots described herein, such as four-point and five-point shots.

The court areas 108 can include several scoring locations such as three point and four-point scoring areas. A four-point scoring location 118A is provided as part of the court area 108A near the mid-court line 110 and is demarcated by a four-point shot (scoring) line 140A. In this one example, the four-point shot line 140A includes an arcuate section 142A, and straight-line sections 144A, one each straight-line section 144A connected at each end of the arcuate section 142A. The straight-line sections 144A intersect corresponding sidelines (112 and 114) of the court 100. In this case, the straight-line sections 144A are perpendicular to the sidelines (112 and 114), parallel to the baseline 124, and equidistant from the center court line 110.

In one example, the distance from the mid-court line 110 to point D on either sideline (112 or 114) ranges from approximately fourteen feet six inches to fourteen feet nine inches. In one example, the straight-line sections 144A can approximate thirty-six inches in length in the fifty-four foot wide court, and can approximate forty-eight inches in length in the fifty-six foot wide court.

The design of this particular four-point shot line 140A is not to be construed as limiting, since the straight-line sections 144A need not be perpendicular to the respective sidelines (112 and 114), but should be the same distance from the center court line 110 (i.e., intersect the respective sideline at the same distance from the center court line 110).

It is to be understood that the court areas 108 (A and B) of the court 100 can also include three-point scoring locations 126 (e.g., three-point scoring location 126A, using italicization only to more clearly distinguish the various areas and locations in the Figures).

In this implementation, the three-point scoring location 126A in Court Area A is an area bounded by a three-point arc 128A (also referred to as a "three-point line" and "three-point shot line"), the boundary line 104 (e.g., part of long side 112, part of the short side 124, and part of the long side 114), the line segments (152A and 154A), and the four-point scoring line 140A. Thus, any goal made from within the three-point scoring location 126A (and without an infraction) will be scored as three points.

In this example implementation, the three-point arc 128A comprises a semi-circular arc, the center point of which is vertically aligned (coaxially) with the (hoop) center 130A of the goal 116A. In both the fifty-four feet and fifty-six feet wide court implementations, the additional four feet and six feet in court width enables the distance from (any point of) the three-point arc 128A to the center 130A of the basket 116A to be increased from twenty-three feet nine inches to twenty-four feet. This additional increase in the width enables the three-point arc 128A to become a true and complete (one-hundred eighty degree) semi-circular arc.

The three-point arc 128A can be extended partially but short of the baseline 124, or entirely to the baseline 124. The partial or entire extension can be by way of straight-line segments. Consider that the three-point arc 128A has two ends: a first arc end and a second arc end. At the first arc end of the semi-circular arc 128A, near the sideline 112, a straight-line segment 152A (e.g., two-inch wide visual artifact) parallel to the baseline 124 can be applied to extend from the first arc end to the sideline 112. Similarly, at the second arc end of the three-point arc 128A, nearest the sideline 114, another straight-line segment 154A (e.g., two-inch wide visual artifact) parallel to the baseline 124 can be applied to extend from the second arc end to the sideline 114.

Alternatively, or in combination with the line segments (152A and 154A), at the first arc end of the three-point arc 128A (the first arc end near the sideline 112), a straight-line segment 156A (e.g., two-inch wide visual artifact parallel to the sideline 112) can be applied to extend from the first arc end to the baseline 124. Note that the line segments (152A and 154A) need not be designed into the court 100 at all. Similarly, at the second arc end of the three-point arc 128A (the second arc end nearest the sideline 114), another straight-line segment 158A (e.g., two-inch wide visual artifact parallel to the long side 114) can be applied to extend from the second arc end to the baseline 124. These (full length) straight-line segments (156A and 158A) extend approximately seventy-five inches in length from the respective arc ends to the baseline 124.

Alternatively, these straight-line segments (156A and 158A) can be designed as partial length segments (as depicted) such that the baseline 124 is not intersected. Thus, the partial length segments (156A and 158A) are simply of sufficient length to assist in defining two additional four point shot locations (160A and 162A) from where shots can be taken from the side of or behind the basket (goal) 116A (where "behind" means on the baseline side of the vertical plane of the backboard 150A).

With respect to line segment 152A, it can be the case where one edge of the two-inch wide straight-line segment 152A can be made to be even with the center 130A of the basket 116A (i.e., the edge aligned coincident on the imaginary line 164A through the center 130A of the hoop (goal 116A)), and thus, the width of the line segment 152A extends two inches toward the back baseline 124. In other words, in one instance, the bottom edge (toward the baseline 124) of the two-inch wide straight-line segment 152A can be aligned to the imaginary line 164A. In another implementation, the top edge (toward the mid-court line 110) of the two-inch wide straight-line segment 152A can be aligned to the imaginary line 164A. This discussion applies to straight-line segment 154A, and to the four-point shot boxes (806B and 808B) in FIG. 8.

It is to be understood that where colorization is described herein, the utilization of a color (e.g., red), for the shot locations (160A and 162A) and shot boxes (806B and 808B) can obviate the need for different colorization (e.g., black) of the straight-line segments (152A and 154A). In other words, the four sides and interior of shot location 160A (and 162A) can be a single solid color.

Shown is a hatched area 180A, which for purposes of FIG. 1 and this description, visually indicates the area under and behind the backboard 150A from which any shot attempted can be deemed an illegal shot. An illegal shot would be made by attempting to shoot over the top (any top edge) of the backboard 150A to the goal or to make a pass over the backboard 150A, which is illegal in most, if not all, basketball play. Thus, the dimensions of the hatched area 180A can be determined by shot analysis of the players during testing or even organized gameplay (e.g., "any shot from this particular point cannot be made without being illegal", etc.), or simply by the area bounded by a line parallel to the court surface 102 and the vertical plane of the back of the backboard 150A, the baseline 124, and part of the two sidelines (112 and 114).

The type and kind of visual artifact(s) employed on the court surface 102 can be any suitable design, or no visual artifact(s) at all. (As currently indicated in the game rules, the front, sides, top, and bottom of the backboard 150A are all in-play (in bounds), while the back of the backboard 150A is out-of-bounds and any pass over the backboard 150A from front-to-back or back-to-front is a violation).

The hatched area 180A need not be physically shown on the court surface 102; however, this can be an optional visual cue for the players, viewers, and officials, and for the particular design and court implementation to keep flow of the game moving along, since the players (and officials and viewers) can readily see the areas that would cause game stoppage due to line violations and/or shooting violations (e.g., while attempting to score).

Moreover, while the hatched area 180A is depicted as extending the full width of the court 100, this is not a requirement. It can be the case that the hatched area 180A is only employed as a visual cue in/proximate to the four-point scoring locations (160A and 162A), or not at all. Thus, the hatched areas depicted as "under" (toward the baseline 124) the respective four-point scoring locations (160A and 162A) can be visually indicated on the court surface 102 so that the players, officials, and fans can more readily see if the shooting player has committed a line infraction, for example, that invalidates a goal attempted or made therefrom.

In yet another depiction of the use of the hatched area 180A (or other visual indication such as a solid color painted, or applied in some other suitable manner, on the court surface 102, for example) in a physical implementation on the court surface 102 and four-point scoring locations (160A and 162A), and for purposes of this description only in describing possible alternative implementations, FIG. 1 is shown with two different variations of the hatched area 180A or lack thereof behind the backboard 150A: a left side implementation with four-point scoring location 160A, and a right side implementation with four-point scoring location 162A.

In the left side implementation, the viewable version of the hatched area 180A is visually marked on the court surface 102 across the entire court width behind the backboard 150A. Additionally, the four-point scoring location 160A is visually bounded on all sides by lines (e.g., two inches wide) that can be clearly and quickly viewed by the player, officials, and viewers, and that show the demarcated limits of taking a shot from the scoring location 160A without a violation.

In the right-side implementation, the area behind the backboard 150A and the entire court width is not visually marked on the court surface 102. Additionally, the four-point scoring location 162A is visually bounded on all sides by lines (e.g., two inches wide) that can be clearly and quickly viewed by the player, officials, and viewers, and that show the demarcated limits of taking a shot from the scoring location 162A without a violation. It is to be appreciated that, in practice, only one alternative would be utilized behind the backboard 150A and in conjunction with the four-point scoring locations (160A and 162A).

It can be the case where the four-point scoring locations (160A and 162A) are painted as a solid color on the court surface 102, such as red. Thus, radio and television announcers can announce shooting/scoring from or activity in those areas during gameplay as "[Player A] takes a shot from the left red zone", or "[Player B] takes a shot from the right-side red box", for example. The use of a solid color on the court, for example, provides a way to readily identify to viewers and listeners the likely activity associated with play there. For example, a radio listener (even the visually impaired) would quickly know that activity in a "red zone" is where four-point shots are typically attempted, without needing to see the game on television or a video. It can also be the case that the left side of the court uses a "red box", and the right side of the court uses a "yellow box", the left side of the court uses a "yellow box" and the right side, the "red box", or any combination of solid color boxes, multi-color boxes, color and lines, etc.

In this way, the color quickly conveys to the listener (announcer: "The shot is being made from the red box!", etc.) from which side of the basket the four-point shot is being attempted. Whatever the choice for colors and/or patterns on the floor, these should be those that enable the player to quickly understand their location on the floor relative to lines of infraction, shot scoring, and so on.

In other words, a specific color can be implemented for a particular shot location (or "zone"), for example, blue for the mid-court four-point scoring location(s). In this example at the mid-court line, the four-point scoring location at mid-court for the opposing team can be the same color blue, which then may require a more contrasting color/pattern for the mid-court line rather than the traditional black. For example, the mid-court line could be white to provide more contrast and easy perception by officials, viewers, and the players, such as for over-and-back mid-court line violations.

The introduction of colors offers many other advantages, such as for new revenue streams. For example, colors/patterns/writings can be selected and applied to the court based on team colors, advertising/sponsors, colors that stimulate viewers in predetermined ways, such as to eat, etc. Moreover, using a specific color(s)/pattern(s) in all corner or baseline four-point scoring locations and a different color for the mid-court scoring locations provides a mechanism to assist players, fans, and officials to readily identify the scoring locations from which shots are attempted/made, as well as line violations such as out-of-bounds, a three-point shot versus a four-point shot, over-and-back violations, and so on. Additionally, team mascots can be applied to any one or more of the shooting zones, as well as sponsor emblems, corporate names, trademarks, product/service names/identifications/logos, etc.

With respect to advertising and sponsors, for a given game or the entire season, and advertiser can advertise in one or more of the scoring locations. Thus, when a shot is being attempted from that zone, the shot can be announced as " . . . being attempted from the [vendor name] zone!". The use of a vendor name in combination with the four-point shot can be used to readily identify and differentiate to the fans that the given shot is being attempted or was made from the mid-court scoring location, rather than one of the four-point baseline boxes. Similarly, the announcement that four points were made from the "four-point shot box" or "four-point shot zone" or "the red zone", or "the red shot box", etc., can be used to readily identify and differentiate that the shot was attempted or made from one of the baseline four-point shot locations.

Thus, in one court implementation, the four baseline four-point scoring locations can be the color red (the "red zones" or the "red shot boxes"), and the mid-court scoring locations can be any color, decided by the teams, sponsors, advertisers, etc. The jump circle(s) can also be implemented with colorization for advertisers, sponsors, etc. Additionally, the scoring locations and other court locations can be localized to the geographic locality in which the court is implemented.

The use of specific colors also enable device users to more readily identify game activity, and thus, enjoy the game. For example, users of handheld devices (e.g., tablets, cell phones, smart phones, etc.) that typically have smaller displays can now more easily see where shots are taken relative to the colors on the court, as well as make the viewing experience more appealing to the user.

The four-point scoring locations (160A and 162A, also referred to as "four-point shot boxes") can be incorporated by designing one four-point shot box in each corner of the court 100, and are shown generally in this implementation, in FIG. 1. Where the court width is fifty-four feet, the four-point shot box (on each side at the basket) approximates the dimensions of thirty-six inches wide and seventy-three inches long. Where the court width is fifty-six feet, the four-point shot box (on each/either side at the basket) approximates the dimensions of forty-eight inches wide and seventy-three inches long.

Correspondingly, the line segments 144A and associated arcuate section 142A can be adjusted based on the width of the court 100. Thus, the arcuate section 142A may vary according to the lengths of the straight-line sections 144A employed for the various widths of the court 100. By approximately or precisely matching the lengths of the straight-line sections 144A to the lengths of the line segments (152A and 154A), the curvature of the arcuate section 142A and the three-point arc 128A are closely matched as well.

It is to be understood, however, that the dimensions mentioned above for the four-point shot boxes are only one implementation, and can be changed as desired, for example, to a thirty-six inch square shot box (for the fifty-four foot wide court) or to a forty-eight inch square shot box or forty-eight inch by thirty-six inch shot box (for the fifty-six foot wide court), for example, or any other size deemed appropriate.

Additional features to either implementation can be to incorporate four-point scoring zones. Commencing at the center 130A of the basketball hoop 116A and extending to the bottom edge (toward the baseline 124) of the center court jump circle 109 (approximately thirty-seven feet, nine inches), the four-point shot line 140A (e.g., two inches wide) can be extended at an end to respective sidelines (112 and 114). Thus, rather than continuing the arcuate section 142A, which would create an awkward and unplayable area behind the four-point shot line 140A and near the sidelines (112 and 114), the straight-line section 144A at each end of the arcuate section 142A (and perpendicular to the corresponding sideline) enables usable shot areas near the sidelines (112 and 114).

Thus, in one implementation of the fifty-four foot wide court, both arc ends of the three-point arc 128A terminate when the outside edge (the line edge away from the back baseline 124) of the three-point arc line extends approximately thirty-six inches from the inside edge of the two-inch wide line of the back baseline.

With respect to the baseline 124, in this new court implementation, the distance from the (inside edge of the) baseline 124 to the front of the backboard 150A is increased from forty-eight inches to sixty inches. Given that it is fifteen inches from the front face of the backboard 150A to the center 130A of the hoop 116A, this increases the distance from the baseline 124 to the center 130A of the goal 116A from approximately sixty-three inches to a new distance of approximately seventy-five inches, or any distance as desired.

In one implementation of the fifty-six foot wide court, both arc ends of the three-point arc 128A terminate when the outside edge (the line edge away from the back baseline 124) of the three-point arc 128A extends approximately forty-eight inches from the inside edge of the two-inch wide line of the back baseline 124. At this point, a straight-line segment (152A and 154A, e.g., two inches wide) can be provided as a visual cues perpendicular to each sideline from the arc end.

In one implementation, any shot attempted and made in goal 116A without the shooter touching the edge of the four-point scoring line 140A (that is away from the goal 116A) is a four-point goal. This means that the player can attempt a four-point shot to the goal 116A from anywhere within the court area 108B, as well. Thus, the four-point scoring location (e.g., location 118A) of a given court area 108 (e.g., court area 108A) extends from the four-point scoring line 140A (of the given court area) to the back baseline 122 of Court Area B. In other words, the four-point scoring area of the offensive team (e.g., Court Area B) can be expanded to extend from the back baseline 122 of the offensive team to the four-point scoring line 140A in the Court Area A of the defensive team.

In an alternative, but more restrictive, implementation, the four-point scoring line (e.g., scoring line 140A) for each court area (e.g., court area 108A), is no more than two feet from the center court line 110.

In an even more restrictive implementation, the court area 108A comprises at least one four-point scoring location 118A proximate the center court line 110. The four-point scoring location 118A is an area bounded by the center court line 110, the four-point scoring line 140A parallel to the center court line 110 (and extending across the width of the court 100), and the boundary line 104 (the boundary line 104 is rectangular and includes the two long sides (112 and 114) and two short sides (122 and 124)).

Thus, in this strict implementation where, for example, the four-point scoring line 140A is two inches wide, attempting a four-point goal from within the four-point scoring location 118A, but stepping on any part of either the center court line 110, the four-point scoring line 140A, or the boundary line 104 (on either sideline), can result in a line infraction and/or game stoppage. It is to be understood, however, that if the shot is successfully made in goal 116A, but while the shooter was stepping on the four-point scoring line 140A, it scores as three points, since the shooter was "outside" the four-point scoring location 118A, but now in the three-point scoring area 126A.

As shown in other figures, the court areas 108 (e.g., court area 108A and court area 108B) can further comprise one or more other four-point scoring locations, which are located near the baseline (short side 124). For example, Court Area A comprises the four-point scoring location 118A demarcated at least by four-point scoring (shot) line 140A. Similarly, for example, Court Area B includes a four-point scoring location, which is demarcated at least by four-point scoring (shot) line 118B.

Figure 2:
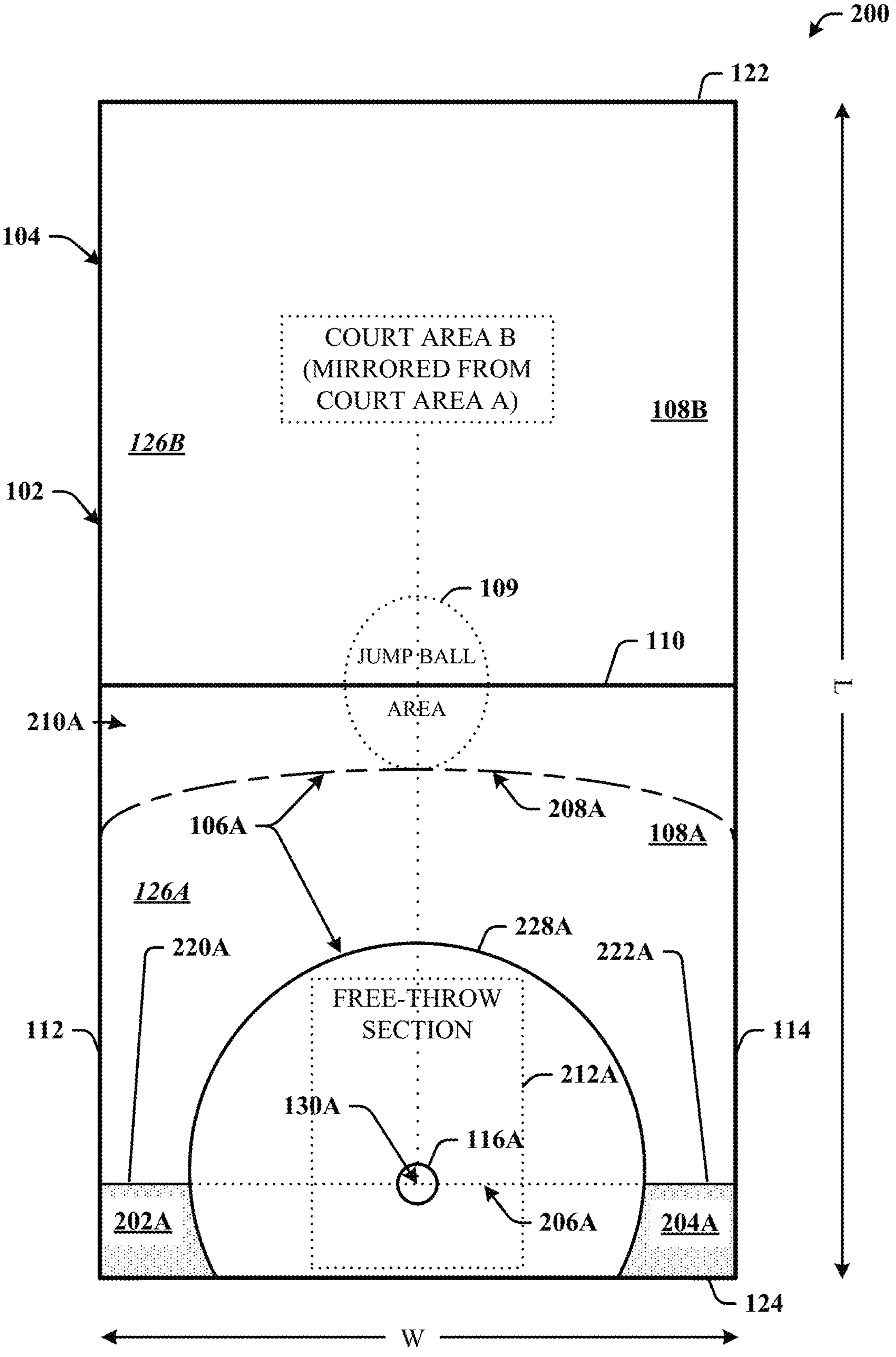
FIG. 2 illustrates an alternative implementation of a basketball court that comprises additional four-point scoring locations.

FIG. 2 illustrates an alternative implementation of a basketball court 200. The basketball court 200 utilizes and includes some of the features as described for court 100, with exception to the design of the four-point scoring line 140A (of FIG. 1) now depicted differently as a completely arcuate four-point scoring line 208A, the shape and extent of the three-point arc (now designated 228A), and the baseline four-point shot boxes (202A and 204A). The baseline four-point shooting locations (202A and 204A) are located under and off to the side of the goal 116A and outside the three-point arc 228A.

As shown, the three-point arc 228A is a major arc the ends of which terminate on the baseline 124. Thus, the baseline four-point shot boxes (202A and 204A) are shaped differently than the baseline four-point shot boxes (160A and 162A) of FIG. 1.

The first four-point scoring location 202A is bounded by the three-point arc 228A, the sideline 112, a line segment 220A, and the baseline 124 (of Court Area A). Similarly, the second four-point scoring location 204A is bounded by the three-point arc 228A, the sideline 114, a line segment 222A, and the short side (baseline) 124.

The visible line segments (220A and 222A) are part of (coincidentally aligned to) an imaginary line 206A (similar to imaginary line 164A) that extends the width of the court 200 and is parallel to the baseline 124. The description herein with respect to the "imaginary" line 206A is simply a way to describe and depict the relationship(s) of the goal 116A (e.g., center 130A of) and various visual cues on the court surface 102. Thus, a two-inch wide line as a visual cue on the court surface 102 and located under or near the goal 116A can be designed to be centered on the imaginary line 206A, or the visual cue can be edge-aligned to the imaginary line 206A on either of the two edges of the visual cue.

It can be the case that one implementation of the court 200 utilizes a visual cue the entire width of the court 200 in parallel or coincidental alignment to/with the imaginary line 206A and the goal 116A. This is simply according to the particular design for the given application of the court 200.

Consider that a vertical axis (not shown), perpendicular to the court surface 102, extends upward through the hoop center point 130A (which is also the center the overhead goal 116A). The vertical axis also intersects the court surface 102 at a point on the imaginary line 206A directly under the hoop center point 130A. Thus, the location of the imaginary line 206A can be determined by the vertical axis through the hoop center point 130A.

Alternatively, the imaginary line 206A can be positioned farther away from the baseline 124 (and no longer on the vertical axis through the hoop center point 130A) to enlarge the four-point scoring locations (202A and 204A).

As previously indicated, this alternative embodiment changes the four-point scoring line 140A (a combination of arcuate and straight-line segments) into the entirely arcuate line 208A. In this example, the four-point scoring location 118A (of FIG. 1) then becomes center-court four-point scoring location 210A, which generally resembles a rectangular shape (three-sided), but with a concave fourth side (shaped by the line 208A) facing the goal 116A. This enables the shooter more room to setup and move for a four-point shot to the goal 116A, and especially more room to setup and move near the sidelines (long side 112 and long side 114).

It is to be understood that the four-point scoring locations (202A and/or 204A), the alternative center-court four-point scoring location 210A, and the four-point scoring location 118A of FIG. 1, can be implemented in any combination. Thus, one court implementation utilizes only the four-point scoring location 118A of FIG. 1, a second court implementation utilizes the four-point scoring location 118A of FIG. 1 and the alternative four-point scoring locations (202A and/or 204A), a third court implementation utilizes the center-court four-point scoring location 210A and the alternative four-point scoring locations (202A and/or 204A), and so on. This can include the utilization of some existing basketball court features to facilitate gameplay, such as the center-court jump zone, or no existing court features at all.

It is further to be understood that the court 100 of FIG. 1 and court 200 of FIG. 2, as both described in detail herein, can optionally include other features typically associated with an existing basketball court, such as a free-throw section (generally represented by the box 212A) and the jump-ball circle 109. Thus, the free-throw section is substantially rectangular and is entirely encompassed within the three-point arc 228A.

In another implementation, the four-point scoring line 208A is an arc (and not a straight line), having endpoints that intersect corresponding long sides (long side 112 and long side 114) of the boundary line 104. The four-point scoring line 208A can be designed to touch the outer edge of the jump-ball circle 109 in the center of the court 200. Thus, where the jump-ball circle 109 has a diameter of twelve feet, a point on the four-point scoring line 208A that is the closest point to the center court line 110 is approximately six feet from the center court line 110. This metric can be applied to the four-point scoring line 140A of FIG. 1, as well.

Put another way, a basketball court 100 is described on which basketball gameplay is performed, the court 100 comprising: a rectangular court surface 102, which includes a boundary line 104 that circumscribes the court surface 102 and within which the gameplay occurs, and visual artifacts 106 as part of the court surface 102 that facilitate the gameplay. The court surface 102 comprises scoring areas which include a first scoring area (e.g., the court area 108A for a first team) and a second scoring area (e.g., the court area 108B for a second or opposing team).

At least one four-point scoring location is provided in each scoring area (e.g., a four-point scoring location 118A in court area 108A, and another four-point scoring location in court area 108B). The four-point scoring location of each court area is bounded in part by a four-point scoring line. For example, the four-point scoring location 118A is bounded on one side by the four-point scoring line 140A, and the four-point scoring location on Court Area B is bounded on one side by the four-point scoring line 140B (not shown).

Additionally, a three-point scoring location can be provided in each scoring area. For example, the three-point scoring location 126A is provided in court area 108A, and the three-point scoring location 126B is provided in court area 108B. The three-point scoring location (126A or 126B) in each scoring area (court 108A or court 108B) can be bounded by the associated four-point scoring line, the boundary line, and a circular arc the center of which is vertically aligned with a center of an overhead goal.

More specifically for court area 108A, for example, the three-point scoring location 126A in court area 108A can be bounded by the four-point scoring line 140A, the boundary line (includes part of the long side 112, part of the short side 124, and part of long side 114), and the circular arc 128A. Similarly, the three-point scoring location 126B in court area 108B can be bounded by the four-point scoring line 121B (not shown), the boundary line (includes part of the long side 112, part of the short side 122, and part of long side 114), and the circular arc (not shown, but implied in the Mirrored End for Scoring Area B).

The four-point scoring line of each scoring area is non-intersecting to the circular arc. In other words, the four-point scoring line 140A in court area 108A (of FIG. 1) does not intersect the three-point arc 128A. Similarly, the four-point scoring line 208A (of FIG. 2) does not intersect the three-point arc 228A. This implies that the four-point scoring line 140A can be moved any desired distance from the center court line 110 (in the scoring area 108A) to the three-point (circular) arc 128A.

In one example, the four-point scoring line for each scoring area is no more than four feet from the center court line 110 of the court 100. In other words, the four-point scoring line 140A in court area 108A is no more than four feet from the center court line 110 of the court 100. In yet another example, as described herein, the four-point scoring line 140A in court area 108A is no more than two feet from the center court line 110 of the court 100. Similarly, the four-point scoring line 208A in court area 108A is no more than four feet from the center court line 110 of the court 100. In yet another example, as described herein, the four-point scoring line 208A in court area 108A is no more than two feet from the center court line 110 of the court 100.

As previously indicated, the circular arc (three-point arc 128A) can encompass a free-throw location, as currently implemented in existing basketball play. Should this feature be carried over from existing basketball courts (and rules), the free-throw location will fit inside the three-point arc 128A.

In this example, the circular arc (three-point arc 128A) is a major arc having an arc center (or center point 130A) vertically aligned to the center of the goal 116A. Moreover, in one implementation, the court surface 102 has a length that does not exceed one-hundred feet and a width that does not exceed fifty-four feet. In another implementation, the court surface 102 has a length that does not exceed one-hundred feet and a width that does not exceed fifty-six feet.

Figure 3:
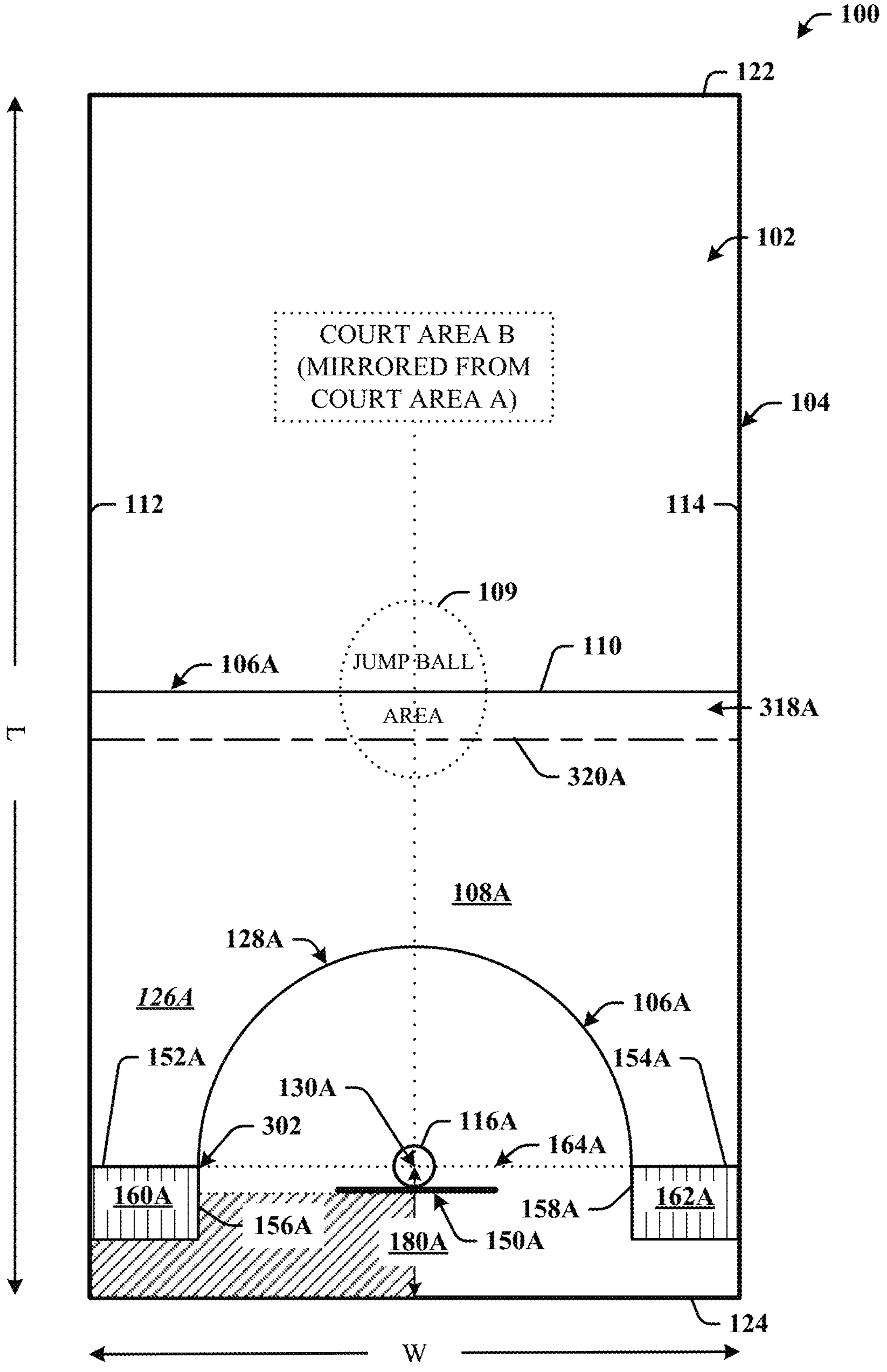
FIG. 3 illustrates a basketball court on which basketball can be played in accordance with the disclosed architecture.

FIG. 3 illustrates an alternative implementation of a basketball court 300 showing corresponding dimensions and features for enhanced gameplay, in accordance with the disclosed architecture. The court 300 comprises one or more of the features described in FIG. 1. However, in this implementation, the mid-court four-point shot location 318A employs a four-point shot line 320A that is a straight line across the entire width of the court 300, and parallel to both of the baselines (e.g., baseline 124).

The distance of the shot line 320A from the mid-court line 110 can be based on the dimensions of the jump ball circle 109. For example, the shot line 320A can be three feet or six feet from the mid-court line 110.

In keeping with increased points scoring areas, it is within contemplation of the disclosed architecture that one or more five-point scoring locations can also be implemented. For example, in one implementation, the mid court jump-circle 109 offers a location from which a five-point shot can be scored. More particularly, in one implementation, the offensive team player "bringing the ball down the court" can score five points by making the goal from the semi-circle portion of the jump circle 109 located in its own court area, but not in the defensive team's court area. In other words, the shooting player must shoot from inside the jump-circle 109, but not come across the mid-court line 110 into the defensive team's court area, to make the five-point shot. Should the shot be made on or across the mid-court line 110, the shot would, at best, be a four-point shot.

It can be the case that the jump-circle 109 is also designated by color and/or other markings that clearly indicate to the players, officials, and viewing audience the point from which the player attempts the five-point shot. Moreover, the two semi-circles of the jump-circle 109 can be colored or marked differently (although this is not a requirement) to clearly indicate the team affiliation for the given five-point semi-circle shot location. For example, the color and/or markings of the five-point semi-circle for the offensive (e.g., the "home") team can be yellow, or a team color, while the color and/or markings of the five-point semi-circle for the defensive (e.g., the "visiting") team can be blue, or a team color.

Figure 4:
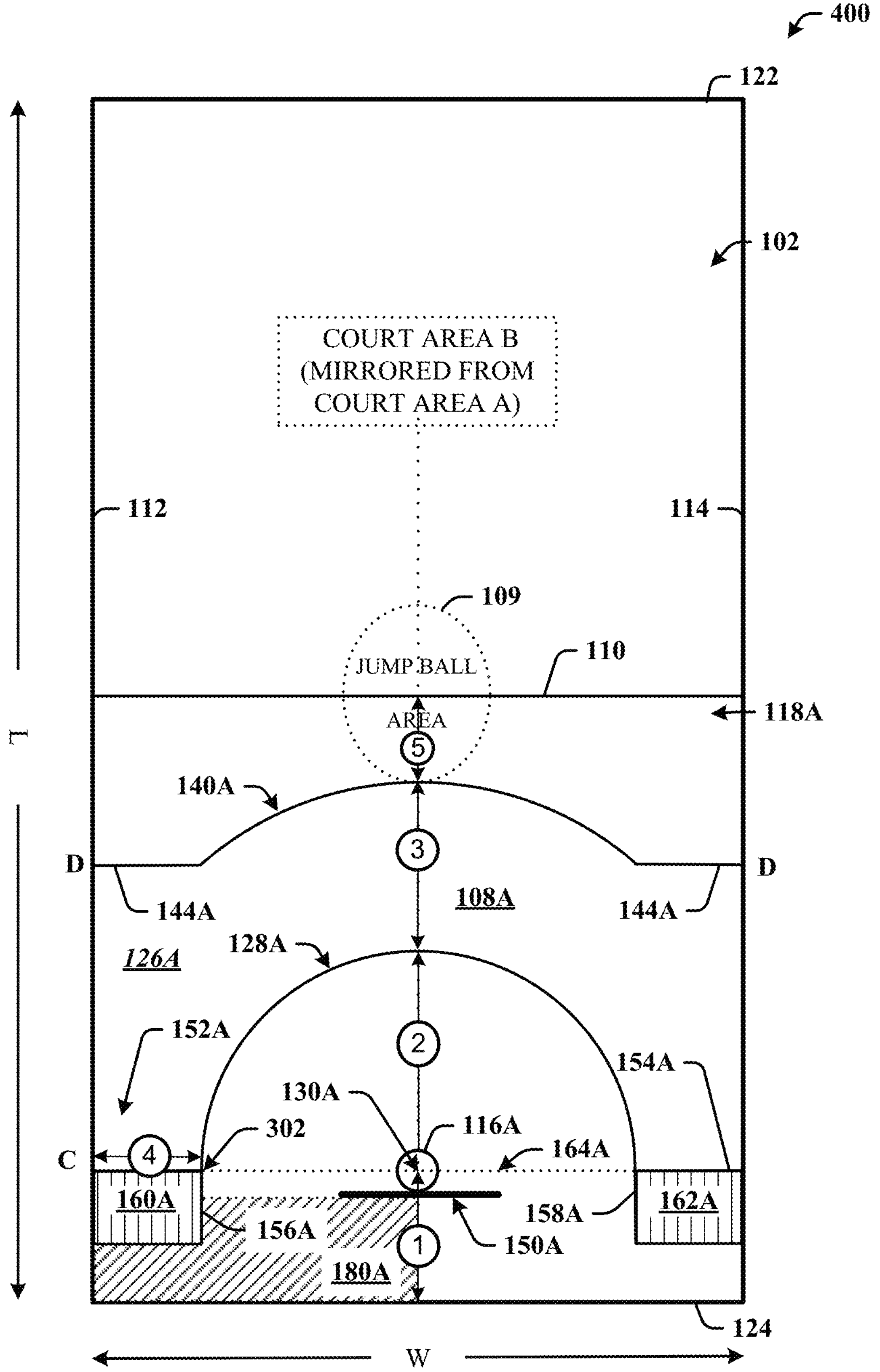
FIG. 4 illustrates an implementation of a basketball court showing specific dimensions for enhanced gameplay.

FIG. 4 illustrates an implementation of a basketball court 400 showing dimensions for enhanced gameplay. Some specific changes and components of the updated court include increasing the outward dimensions of length (L) and width (W). For example, existing court dimensions of ninety-four feet (L) and fifty feet (W) can be increased to one hundred feet (L) and fifty-four feet (W) in the updated basketball court 400.

The increased dimensions can be used to extend not only the length of the baseline (e.g., same as short side 124), but also the distance ① between the back baseline 124 and the center point 130A of the basketball goal 116A. The distance ① can be increased up to seventy-six inches, for example, in court 400. Further improvements include increasing the distance ② between the center point 130A of the basketball goal 116A to the three-point arc 128A (or "three-point line") to twenty-four feet. At twenty-four feet, the player has more room to attempt a three-point goal without stepping on the sideline 112 or the baseline 124.

The distance ④ from either sideline (e.g., long side 112 or long side 114) to the respective apex of the three-point arc 128A (also, for three-point arc 228A) at a point C on the sideline as measured from the center point of the goal 116A and on the imaginary line 164A, is three feet (in the implementation of the fifty-four foot wide court), which is the same distance in an existing professional court.

However, in this new court implementation, the three-point shot from any point on the three-point arc 128A is now a true twenty-four foot shot (at a minimum), rather than the lesser distance of twenty three feet nine inches currently in use in professional basketball courts. In other words, when incorporating the "baseline four-point scoring areas" (e.g., the four-point scoring areas 160A and 162A abutting the back baseline 124), the distance ④ can be three feet when measuring from the sideline directly to a point 302 on the three-point arc 128A, which is nearest the corresponding sideline (e.g., long side 112, long side 114).

The distance ③ from the three-point arc 128A ("top of the arc") to the mid-court, cross-court, four-point line 140A approximates seventeen feet eight inches. Thus, the four-point shot will not legally begin closer than forty-one feet eight inches from the center point 130A of the basketball goal 116A.

It is to be appreciated that, alternatively, the distance ① can be increased resulting in a corresponding increase in the size of the baseline four-point scoring areas. In other words, it is not a requirement that the distance ① result in the center 130A of the goal 116A being directly overhead of the imaginary line 164A.

The cross-court four-point scoring line 140A can be a distance ⑤ of two feet, for example, from the mid-court line 110, which can indicate the beginning of a four-point shot line for the scoring area 118A. As alternatively indicated, the distance ⑤ can be increased to the radius of the jump-ball circle 109 (shown in FIG. 2), which can approximate six feet from the mid-court line 110.

The basketball court alternative implementations described herein can be employed in overall court dimensions, three-point scoring locations, and four-point scoring locations.

It is to be appreciated that the larger court and the additional scoring opportunities provided can be readily adapted into a video game and/or as a physical board game using dice, cards, or other suitable game components and accessories. Moreover, the disclosed four-point implementations can be utilized during games as half-time entertainment for fans to be selected to attempt four-point shots from various locations on the court. Note also that the hash marks currently employed on basketball courts can be adjusted accordingly when utilizing the disclosed four-point-shot courts.

As described in detail herein, the optional use of a penalty area and other features disclosed herein find adaptation to a computer game as well. For example, the penalty area in the video game can be drawn as a "cage" in reference to basketball that was played long ago. In these earlier times, loose in-bound passes by players resulted in player skirmishes for the ball as well as by fans who charged in from the sideline to get involved. To prevent this, the court was fenced-in (or "caged") to prevent this type of fan "participation".

The implementation of the disclosed architecture as video and computer games also facilitates the utilization of the latest technology such as augmented reality (AR) technology. AR technology enables the user/player to have a view of the physical world (e.g., the court) while also viewing computer-generated real world sensory inputs such as sound, geolocation data (e.g., GPS-Global Positioning System), video, images, graphics, and/or kinesthetic inputs (e.g., force, vibration, motion, etc.) related to touch, as well as non-contact interactions such as hand-motions, eye motions, and other detectable body motions. Thus, the computer game player can don AR equipment such as helmet (e.g., head-mounted display)/glasses that enables the surrounding real world to become interactive. AR technology can be further enhanced using computer vision, speech recognition, and object recognition, for example.

Put another way, a basketball court is described on which basketball gameplay is performed. The court can comprise a rectangular court surface which includes a boundary line that circumscribes court areas within which the gameplay occurs, the court areas include a first court area and an opposing court area, the court surface includes visual artifacts that facilitate the gameplay; and, at least one four-point scoring location in each of the court areas from which a shot can be made to a goal.

The four-point scoring location of the first court area is bounded by, a four-point scoring line in the first court area that extends across the court proximate a center court line, and a baseline of the opposing court area. In a four-point scoring line implementation, every point of the four-point scoring line in the first court area is at least two feet from every point on the center court line. The four-point scoring line in the first court area can be a straight line that extends across the court and parallel to the center court line. The first court area can include a three-point scoring location, the three-point scoring location bounded by a three-point arc, the boundary line, and the four-point scoring line. The three-point arc comprises a semi-circle the center of which is vertically aligned with a center of the goal. The three-point arc is a semi-circular arc having a first end and a second end, the first and second ends each connect to a straight-line segment that extends to the baseline, the straight-line segments parallel to a sideline.

In another implementation, the four-point scoring line in the first court area includes an arcuate section having a radius of curvature equal to or greater than a radius of curvature of the three-point arc. The four-point scoring line in the first court area includes the arcuate section, and a straight-line section connected at each end of the arcuate section, the straight-line sections intersecting corresponding sidelines of the court. The first court area further comprises a second four-point scoring location, the second four-point scoring location adjacent to a baseline of the first court area.

In another implementation, a basketball court is described on which basketball gameplay is performed, the court comprising: a rectangular court surface which includes a boundary line that circumscribes court areas within which the gameplay occurs, the court areas include a first court area and an opposing court area, the court surface includes visual artifacts that facilitate the gameplay; at least one four-point scoring location in each of the court areas from which a shot can be made to a goal, the four-point scoring location of each court area bounded in part by a corresponding four-point scoring line, the four-point scoring line in the first court area is at least two feet from every point on a center court line; and, a three-point scoring location in each of the court areas, the three-point scoring location bounded by, in part, the four-point scoring line, the boundary line, and a three-point line.

The first court area and the opposing court area define the rectangular court surface, which rectangular court surface exceeds a width of fifty feet and exceeds a length of ninety-four feet. The first court area includes a three-point arc that serves as a three-point shot line, the three-point arc is a semi-circular arc having a first end and a second end, the first and second ends each connect to a straight-line segment that extends to a back-court baseline, the straight-line segments parallel to a sideline.

The four-point scoring line in the first court area includes an arcuate section having a radius of curvature equal to or greater than a radius of curvature of the three-point line. The first court area comprises at least three four-point scoring locations: a first four-point scoring location proximate the center court line, a second four-point scoring location on one side of the goal and bounded on one side by a back-court baseline, and a third four-point scoring location on an opposite side of the goal relative to the second four-point scoring location and bounded on one side by the back-court baseline. The four-point scoring line of the first court is non-intersecting to the three-point line.

Following is a description of modified goal systems that can be employed to enhance gameplay in accordance with the disclosed architecture. The modified goal systems address optional changes not only in the backboard design, but also changes to the bracket system employed as part of or independent to the basketball hoop.

It is to be understood that an objective of the disclosed court architecture and goal systems is not to drastically change the current aspects of the basketball game, but to enhance traditional elements that need to evolve, or have evolved and already exist.

Figure 5:
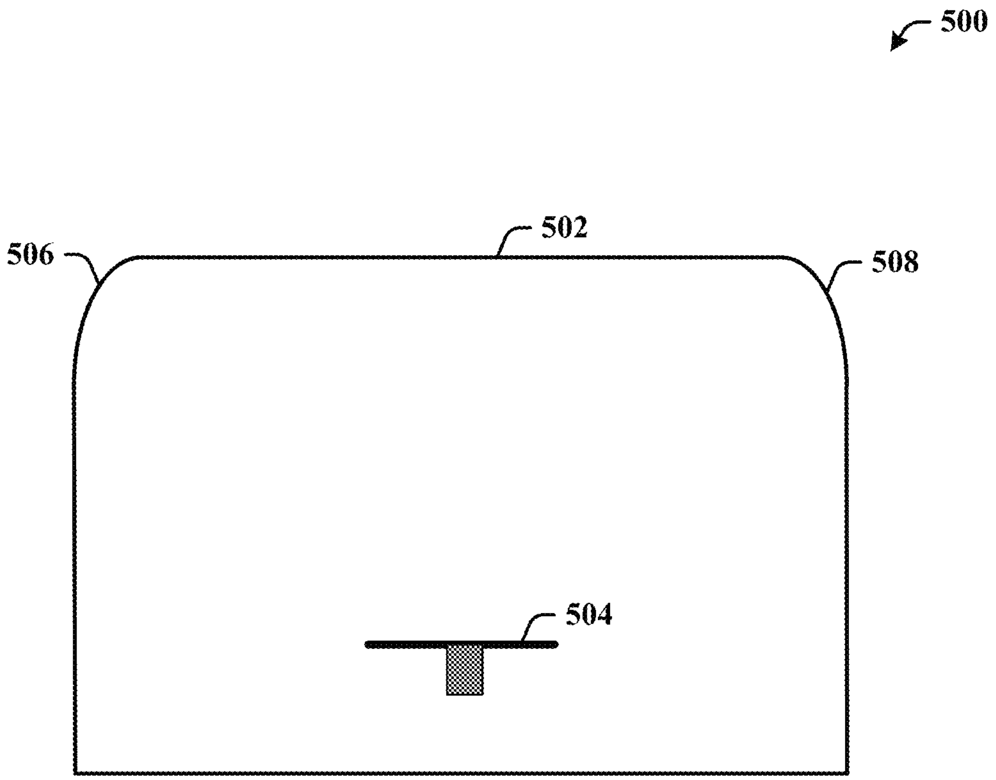
FIG. 5 illustrates an implementation of a substantially rectangular basketball goal system showing modifications that can be employed in the enhanced basketball court.

FIG. 5 illustrates an implementation of a substantially rectangular basketball goal system 500 showing modifications that can be employed in the enhanced basketball court. The system 500 includes a modified backboard 502 and the goal 504. In this implementation, the modified backboard 502 comprises rounded corners: a first rounded corner 506 and a second rounded corner 508. The purpose of the modified backboard 502 is to enable the shooter to more readily see and make the four-point shot from the corner four point shot locations (also referred to as the baseline four-point shot locations). Thus, in baseline shots, the sharp upper corners of the existing backboard make the corner baseline shot more difficult, the corner baseline shot being made from an angle that positions the shooter behind (the side opposite on which the goal ("hoop") is mounted) the vertical plane of the backboard. In one implementation, the distance from the front of the backboard to the center of the hoop approximates fifteen inches.

Contrariwise, the modified backboard 502 increases player motivation to take the corner baseline four-point shot, since the backboard corners (506 and 508) are now rounded. Thus, the shooting player can make a corner baseline four-point shot that would otherwise possibly contact the sharp corners of the existing backboards and make the shot much more difficult and less motivated to attempt.

The structure of the corners (506 and 508) at least with respect to degree and type of roundness can be designed and tested for optimal implementation. For example, the structure can be tested using computer simulations and analysis from shot data obtained over years of player shots attempted off the backboard. An alternative method can be to product test backboard designs in actual gameplay and track basketball contact with the various parts of the test backboard and from various shot locations on the court surface 102. From this testing, specific points on the backboard 502 can be determine to be impacted a greater number of times than other points, thereby providing actual data as to the design of the backboard 602.

For example, if it is computed that ninety-percent of the shots do not impact what would otherwise be the "sharp" corners of the entirely-rectangular backboard, some of which are currently in use, then the corners can be modified to the corners (506 and 508) shown here. Still further, if it can be shown that the shot impact data of the backboard 502 are even more tightly packed (clustered) near the basket, it can be possible to modify the backboard 502 into the fan-shaped backboard design of FIG. 6. Thus, computer analysis and physical testing and data collection can be employed to design the backboard, not only for conventional gameplay, but for the three-point and four-point shot implementations described herein.

The type of roundness can be based on the type of triangle used when designing the rounded corner: right triangle and/or isosceles triangle. Here, a right triangle design is employed where the long side of the right triangle is the vertical segment and the short side is the horizontal segment along the top. In the isosceles triangle design, the vertical segment and horizontal segment are equal in length. The degree of roundness can be defined by the overall size of the triangle, which then defines the total area consumed by the rounded corner design.

Figure 6:
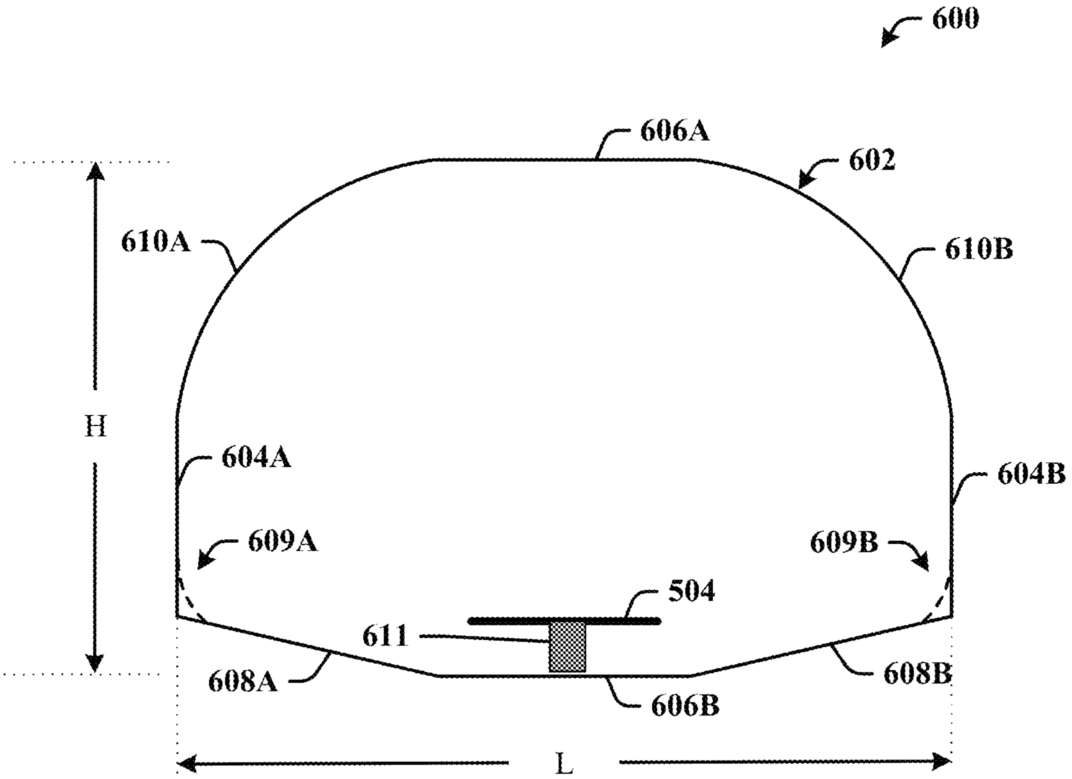
FIG. 6 illustrates an alternative implementation of a fan-shaped basketball goal system showing modifications that can be employed in the enhanced basketball court.

The disclosed basketball court architecture variations described herein find use with fan-shaped backboards as well. FIG. 6 illustrates an alternative implementation of a fan-shaped basketball goal system 600 showing modifications that can be employed in the enhanced basketball court. The particular fan-shaped design employed can be selected to facilitate the "corner" (or baseline) four-point shots without going over the top of the backboard 602. For example, the fan-shaped backboard 602 comprises parallel vertical side portions (a left portion 604A and a right portion 604B) along the height (H)) and the distance between which defines the length (L), and parallel horizontal side portions (a top portion 606A and a bottom portion 606B) along the length and the distance between which define the height.

The bottom portion 606B is a line segment having two ends, each end connecting to respective straight-line angled segments (608A and 608B). The straight-line angled segment 608A is angled upward to the left portion 604A at a predetermined number of degrees from the horizontal plane in which bottom portion 606B resides. Similarly, the straight-line angled segment 608B is angled upward to the right portion 604B at a predetermined number of degrees from the horizontal plane in which bottom portion 606B resides. In a typical design, the straight-line angled segments (608A and 608B) are angled upward the same number of degrees.

The angle of the straight-line angled segments (608A and 608B) can be adjusted to provide maximum safety to the players, such as for arms, hands, head, etc., when potentially coming into contact with the lower areas or portions of the backboard 602 such as for lay-up shots or other contingencies concerning play, such as shot blocking, and so on, underneath or around the goal 504 and backboard 602. In one implementation, the angle employed ranges from about five degrees to forty degrees. In another implementation, the angle employed ranges from about ten degrees to thirty degrees, and in yet another implementation, the angle ranges from about fifteen degrees to about twenty-five degrees.

The straight-line angled segments (608A and 608B) each angle upward from the horizontal bottom portion 606B to connect to respective ends of the vertical side portions (604A and 604B). The other ends of the vertical side portions (604A and 604B) connect to arcuate portions (610A and 610B) toward the top of the backboard 602. The arcuate portions (610A and 610B) each connect to respective ends of the horizontal top portion 616A to complete the perimeter dimensions of the backboard 602.

Note that although depicted as having "sharp (non-rounded)" corners at the connection point (or junction) of the straight-line angled segment 608A to the left vertical side portion 604A and the connection point of the straight-line angled segment 608B to the right vertical side portion 604B, as a further safety consideration to activity under the goal 504 and hence, the backboard 602, rounded corners (denoted as dashed corner lines) can be employed. For example, left rounded corner 609A and right rounded corner 609B can be utilized rather than the "sharp" corners at the junctions.

It is to be understood that the backboard 602 can include markings (also called indicia) that facilitate scoring from correspondingly selected points on the court surface 102. These are described in FIG. 7.

The backboard 602 can also employ safety materials applied to the some or all of the periphery to mitigate/eliminate player injury. The material can be any type of soft, yet durable material such as foam rubber, or any other materials as are commonly known and used in the industry.

It can be the case that a bracket 611 for the goal 504 can be affixed (e.g., fastened by nut and bolt) to the backboard 602 in vertical slotted apertures (not shown) so that the goal bracket 611 can be raised or lowered as desired.

In one implementation, overall dimensions of the backboard 602 retain the length in the standard backboards currently used in professional (and other levels of) gameplay; however, the height can be reduced to thirty inches, for example, or to any height determined suitable for gameplay. Thus, the length can range from about 60-72 inches and the height can range from about 30-36 inches. In another implementation, the backboard dimensions can range from a height of 32-34 inches and a length of about 50-60 inches. In still another backboard implementation, the backboard dimensions can range from a height of about 34-40 inches and a length of about 50-72 inches.

The fan-shaped backboard 602 may incorporate a top portion in the shape of a semi-circle, and a bottom portion of a substantially rectangular shape (e.g., a polygon of multiple sides such as six). Thus, attempting the four-point shot from the baseline four-point shot boxes is made easier by the absence of the upper corners normally found in the purely rectangular backboard.

In this sense, the distance from the front surface of the backboard 602 to the hoop bracket 611 can also be adjusted to more readily facilitate the successful completion of a shot from the baseline four-point box (or zone). This "adjustment" includes, but is not limited to, making the bracket 611 longer (e.g., one inch, two inches, three inches, etc.) to increase the distance from the hoop center 130A to the front of the backboard. In another implementation, the bracket 611 can be spring loaded and hinged mechanism as a safety measure to bend downward under the weight of the player who happens to momentarily hang on the hoop or dunks the ball, and then quickly springs back to the horizontal position. It is to be appreciated that the bracket 611 can be of any existing design or new design that meets the requirements and regulations for basketball gameplay (e.g., in the NBA, etc.).

The adjustable hoop bracket design also improves the flow of the game by mitigating or eliminating "wedges", where the basketball can get stuck in the space between the hoop and the backboard. By adjusting the hoop bracket an additional one or two inches away from the backboard, the distance between the hoop rim and the backboard can be sufficient to prevent wedges (which in existing backboard/hoop designs require game stoppages to retrieve the basketball, take the ball out of bounds, etc.). Thus, the disclosed design maintains the flow of the game and removes a possible safety concern where players can potentially injure fingers or a hand.

In other words, the hoop 504 can be located adjusted from the front of the backboard (e.g., backboard 602), perpendicular to the backboard and in the horizontal plane, incrementally, as desired. Thus, the bracket 611 enables up/down adjustments of the hoop 504 as well as forward and backward adjustment incrementally, such as by inches, or in smaller increments. When such hoop adjustments are made, the only corresponding court surface adjustments that can be the made are associated with the three-point arc and the baseline four-point shot boxes (160A and 162A). Thus, if the hoop 504 (also hoop 116A is adjusted away from the front of the backboard toward the mid-court line 110, the three-point arc can be moved accordingly to retain the true twenty-four foot distance for the three-point arc to the center of the hoop 504.

Similarly, the baseline four-point shot boxes (160A and 162) can be moved or extended in dimensions toward the mid-court line 110 to further improve the ability make four-point goals therefrom.

In this way, successful corner shots (e.g., the baseline four-point shot boxes) may be better enabled by providing greater exposure to the hoop from these more difficult shooting locations. These small and inconsequential adjustments to the hoop bracket 611 are not likely to have a negative impact on other shots such as lay-ups, or close-in jump shots, for example, or other gameplay activity close to the basket. This type of bracket adjustment can be made user-adjustable given the specific court implementation, whether professional, collegiate, high school, etc., and as described above, can prevent wedges.

In one example implementation, if the bracket is extended away from the front of the backboard an additional one inch over the offset currently in use, the center of the hoop 504 also moves one inch farther away from the front surface of the backboard. The capability to provide adjustable hoop (also referred to as "goal") distance from the front of the backboard 602 can be achieved with the bracket 611 that not only enables vertical adjustment of the hoop 504 via slots in the vertical plane, but also lateral adjustment of the hoop 504 from the front of the backboard 602 in the horizontal plane. In one implementation, lateral adjustment of the hoop 504 can be achieved in one-inch increments, for example, up to a predetermined distance (or length) as defined by the bracket 611. In one example, the bracket 611 employs machined or punched slots in the horizontal plane to enable slidable adjustment in the lateral direction toward or away from the front of the backboard 602.

Adjustments to the hoop bracket offset from the front of the backboard can have an effect on other areas/locations of the court, when retaining the disclosed twenty-four foot three-point arc 128A. For example, shifting the hoop center 130A one inch closer to the mid-court line 110 by adjusting the bracket one inch, will reduce the area of the three-point scoring location 126A by an insignificant amount.

Moreover, in one implementation, the baseline four-point scoring locations (160A and 162A) will now have an additional one inch in the straight-line segments (156A and 158A) from which to attempt the four-point shot, since the line segments (152A and 154A), aligned to the hoop center 130A, will move one closer to the mid-court line 110 as well.

The dimensions of the baseline four-point scoring locations (160A and 162A) need not change at all, but is an optional aspect for the given court design and deployment; however, the alignment the line segments (152A and 154A) to the hoop center 130A can be retained. In this way, offsetting the bracket an additional one inch provides an additional one-inch exposure of the hoop 116A to the shooter from the baseline four-point scoring shot boxes (160A and 162A). It is to be understood that similar changes can occur if increasing the hoop bracket offset to two inches, or even more. Such bracket adjustments may not affect the overall dimensions of the hatched area 180A.

In the same sense, the backboard design can be changed as desired for the given court implementation. For example, the height of the backboard need not be restricted to three and one-half feet (professional) but to a lesser height (e.g., three feet) to facilitate greater exposure of the hoop to the corner or baseline shooter, without affecting rebounding or other aspects deemed important to gameplay. These notions can also apply to reducing the width of the backboard to the extent such width reduction does not negatively impact aspects deemed important to gameplay.

Similarly, the shape of the backboard can be changed to accommodate shots from the baseline four-point shot boxes, such as the top corners being lowered a few inches (e.g., five, six, etc.) (i.e., the backboard height at the top corners is less than the backboard height at the center).

It can be the case that the specific backboard design ultimately used can be selected by the number and location of shots impacting a given area of the backboard. For example, if 80% of the shots impact the backboard in the taped zone on the backboard located above the hoop, it may be determined that the full rectangular backboard is not needed, and that a fan-shaped design can be used where the upper corners are removed or reduced, since the number of shots in those areas are rare or perhaps low percentage scoring shots, when attempted.

Figure 7:
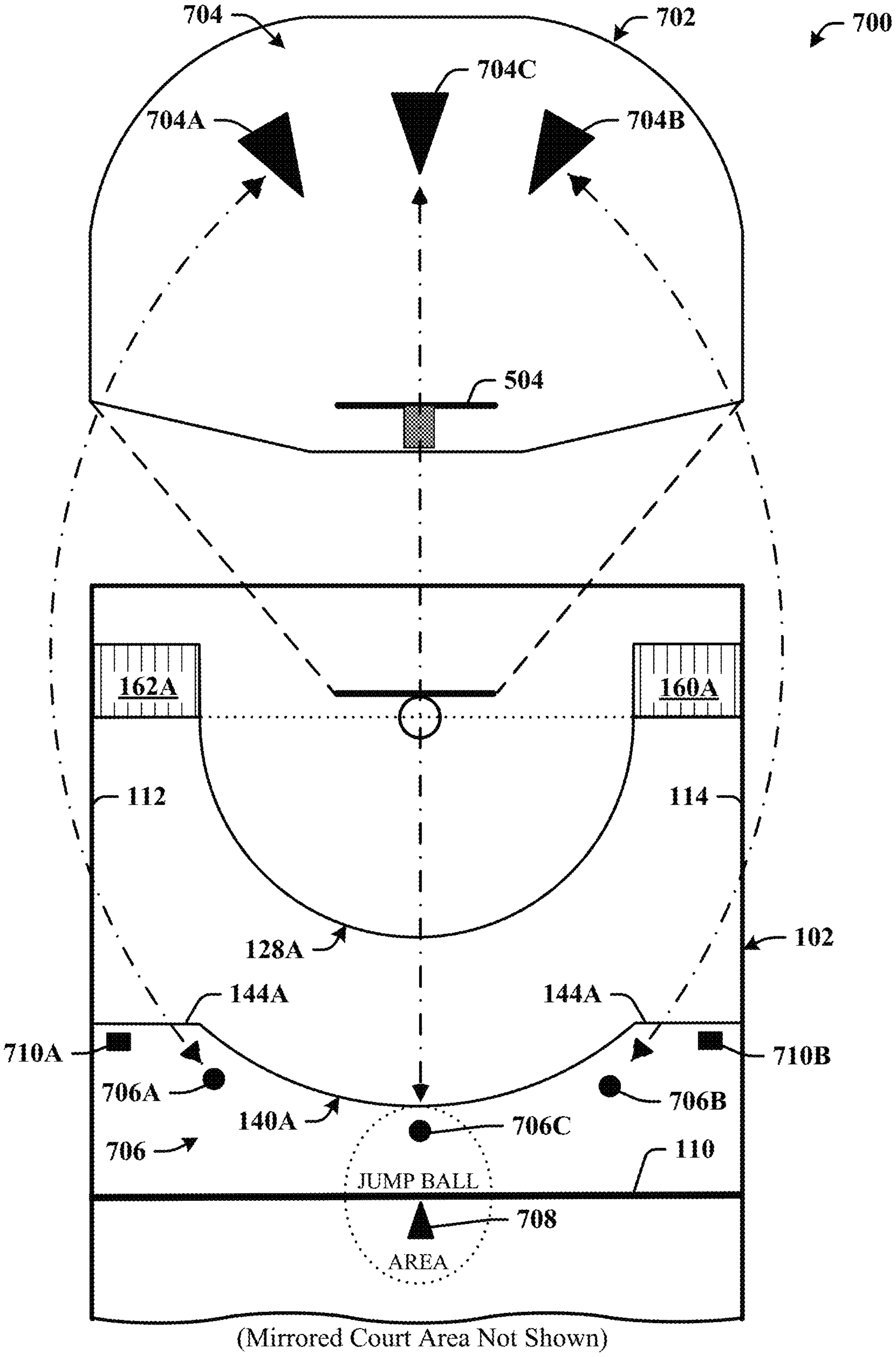
FIG. 7 illustrates an alternative basketball court system that includes a backboard having one or more shot cues (or marks) in accordance with the disclosed architecture.

FIG. 7 illustrates an alternative basketball court system 700 that includes a backboard 702 (in expanded view via the dashed lines) having one or more backboard shot cues (or markings) 704 in accordance with the disclosed architecture. In this example, three backboard visual shot cues 702 are applied to the front surface and upper part (e.g., upper half) of the backboard 700, which indicate to the shooting player where to shoot the basketball on the backboard 702 to increase the probability of the shot caroming off (also commonly referred to as "banking" off the backboard as a "bank shot") the front surface of the backboard 702 and into the goal 504 and thereby scoring the points associated with that shot.

Correspondingly, there can be similar or different markings on the court surface 102 that readily indicate to the player where to take the shot and where to aim the shot on the backboard 702 to possibly make the score in the goal 504. Here, the visual backboard shot cues 704 are depicted as triangles that point downward to the goal 504, and correspondingly, the court surface 102 includes floor shot cues 706 (individually as circles and labeled 706A, 706B, 706C) strategically located and clearly marked so the player knows from where to attempt the shot for the score.

The exact placement (and orientation, if needed) of the backboard shot cues 704 can be engineered based on any type of analysis, such as shot data from various locations on the court surface 102, success/failure of such shots, and so on. This analysis applies as well to the shape and coloration of the backboard shot cues, for example.

Thus, the player, taking a shot from floor shot cue 706A should shoot at the backboard shot cue 704A, taking a shot from floor shot cue 706B should shoot at the backboard shot cue 704B, and taking a shot from floor shot cue 706C should shoot at the backboard shot cue 704C. It is to be appreciated that a player taking a shot (e.g., a five-point shot) from a floor shot cue 708 (and behind the mid-court line 110, where "behind" means in the offensive or "front" court) can also aim at the center backboard shot cue 704C. The player simply needs to account for the distance and arc of the shot to make the goal.

By employing these floor and backboard shot cues, the player has an increased probability of making (scoring) the corresponding shot (the relationships indicated by the dot-hashed lines), such as three-point, four-point, and five-point goals from the various shot locations of the court 100. Moreover, increasing the distance of the hoop 504 from the front of the backboard 702 increases the likelihood that the caroming shot off the backboard 702 will be made.

It is also possible to apply floor shot cues (e.g., hash marks or other indicia) on the inside edges of the sides (112 and 114) or other suitable locations to further indicate to the players the floor location from which a shot can be made for a greater likelihood of scoring. For example, floor shot cues 710 (individually as cues 710A and 710B) can be designed and located proximate the straight-line sections 144A from which four-point shots can be attempted, since the shot would be attempted behind the four-point shot line 140A.

In one example implementation, the floor shot cue 710A can be a two inch by four inch painted block that is one foot in from the sideline 112 proximate the straight-line section 144A, with the floor cue length parallel to the straight-line section 144A. The sideline-edge of the floor cue 710A can then be one foot from the sideline 112, and the other (interior) edge of the floor cue 710A can be one foot from the interior end (that connects to the arcuate section 142A) of the straight-line section 144A. The use of the floor shot cues is to quickly indicate to the player a place from which to attempt the shot (with a higher likelihood of making the shot) when using the corresponding backboard shot cue.

As illustrated, the floor shot cues 710 are not contacting the straight-line sections 144A in order to provide a clear demarcation from the straight-line sections 144A. Thus, it should be readily apparent to the shooting player, viewers, and officials that the shooting player clearly is or is not standing on the four-point shot line 140A (the straight-line sections 144A part of the shot line 140A) when the shot is made.

These additional indicia (or floor markings) can align with the existing backboard shot cues 704, or with additional backboard shot cues (not shown) that can be applied above, below or in between the backboard shot cues 704.

Similar floor shot cues can be applied to the court surface 102 for the three-point arc as well. Floor shot cues along for the three-point arc 128A can be the same design as the floor shot cues 706 along the four-point shot line 140A, or different cue designs.

These backboard and floor shot cues enable enhanced scoring in a video game version designed and developed similar to the disclosed basketball game architecture, and particularly for handheld device user interfaces. For example, these backboard and floor shot cue features enable the use of pointing devices such as a mouse pointer to align, aim, and shoot the virtual basketball. The cue design can be any suitable marking such as circles, bullseyes, etc., as desired, as well as coloring, fill pattern, etc. Similarly, the disclosed basketball game court architecture finds application to other game formats such as for board games (e.g., similar to Monopoly™ by the Parker Brothers company), card games, televised game shows, personal computing device game shows, games played using dice, and so on, where various mechanisms of chance can be employed to determine point shots, shot locations, scoring, penalties, and so on.

The disclosed basketball court system also finds adaptation to fantasy basketball (an Internet/digital network adaptation of the physical sport that enables users to participate in the sport while the physical sport is being conducted by selecting players, competing in online leagues against other teams). In the realm of computer games, the use of automated penalty calls and shot line calls, for example, can simply be encoded.

The utilization of floor shot cues and backboard shot cues further enable the players of any age group as well as the game, in general, room to grow and improve play and shooting abilities.

Figure 8:
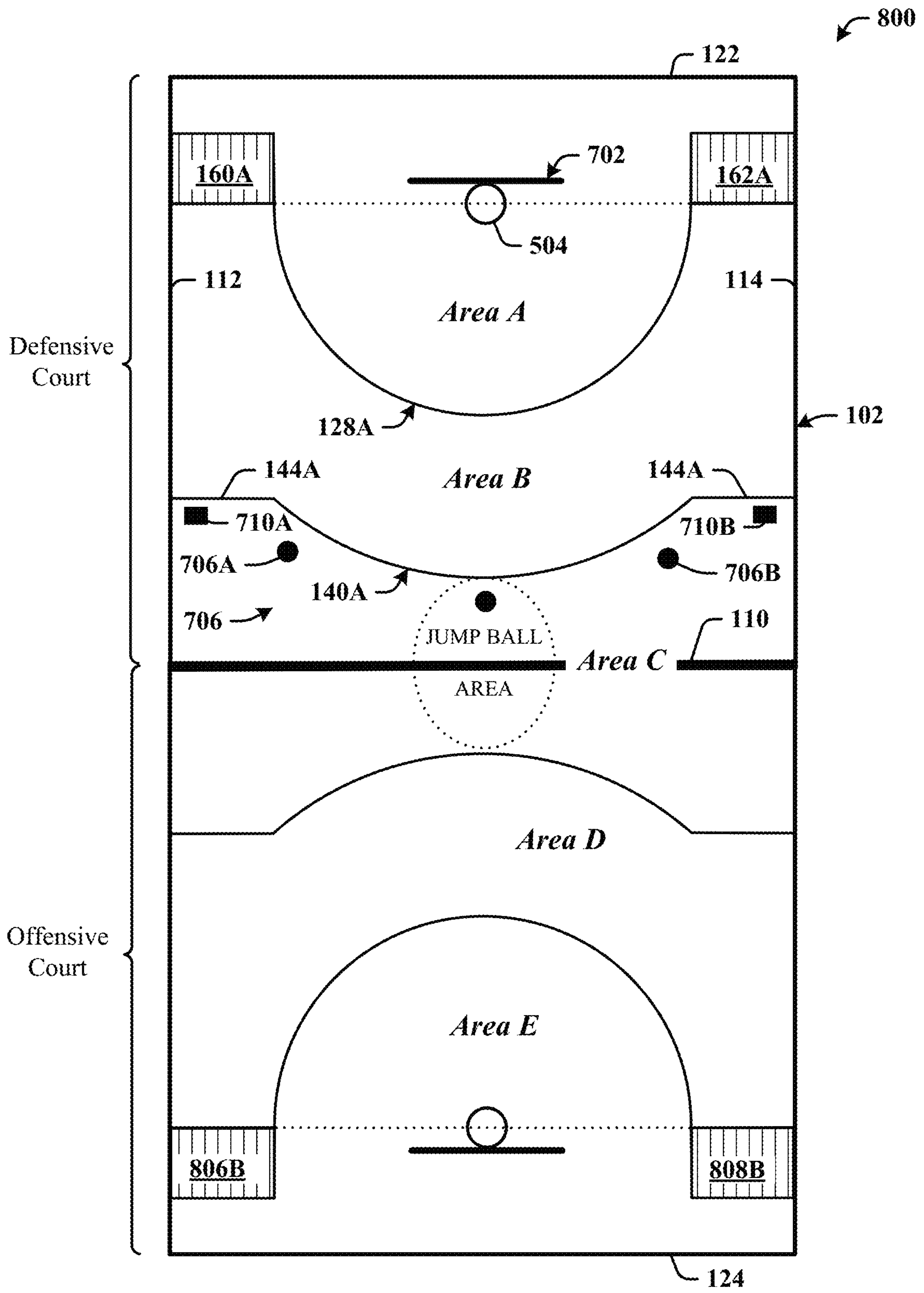
FIG. 8 illustrates a basketball court implementation that includes court surface shooting locations for an increased number of points, in accordance with the disclosed architecture.

FIG. 8 illustrates a basketball court 800 implementation that includes court surface shooting locations and floor shot cues for attempting an increased number of points, in accordance with the disclosed architecture. In this implementation, gameplay enables shooters to score one point (free throws), two points, three points, and four points.

This implementation is now described in detail, in terms of the offensive court (also commonly referred to as the "front court") and the defensive court (also commonly referred to as the "back court"). In implementation, the court design applies to both teams, where the offensive and defensive teams reverse direction of play based on ball possession. In other words, the defensive court "flips" to now become the offensive court and the offensive court becomes the defensive court. The court system 800 can also include backboards (not shown in detail, but similar to backboard 702, for example) with backboard shot cues (similar to backboard shot cues 704) that relate to corresponding floor shot cues.

The basketball court 800 can be partitioned into five shooting/scoring areas: scoring Area A, scoring Area B, scoring Area C, scoring Area D, and scoring Area E. Scoring Area A encompasses the typical one-point free throw shot, and two-point shot areas, but not the baseline four-point shot boxes (160A and 162A). Thus, scoring area A comprises an area on the court surface 102 bounded by the three-point arc

128A, baseline 122, part of the sidelines (112 and 114), and two sides of each of the baseline four point shot boxes (160A and 162A).

Scoring Area B is the three-point shot area and is bounded between scoring Area A and scoring Area C. More specifically, scoring Area B is an area on the court surface 102 bounded by the four-point shot line 140A, part of the sidelines (112 and 114), the three-point arc 128A, and one side of each of the four-point shot boxes (160A and 162A).

Scoring Areas C, D, and E comprise the four-point shot area. More specifically, scoring Areas C, D, and E comprise an area on the court surface 102 bounded by the four-point shot line 140A of the defensive court, part of the sidelines (112 and 114), and the baseline 124.

Note that as previously described in FIG. 7, there can be numerous floor shot cues (e.g., hash marks, polygons, or other indicia) applied to the court surface 102 on the inside edges of the sides (112 and 114) or other suitable floor locations to further indicate to the players the floor location from which a shot can be made for a greater likelihood of scoring in accordance with backboard shot cues (e.g., shot cues 704 of FIG. 7) on the backboard 702, for example.

For example, floor shot cues 710A and 710B proximate the straight-line sections 144A and floor shot cues 706A and 706B can be utilized from which four-point shots can be attempted, since the four-point shot would be attempted behind the four-point shot line 140A. Although not shown, additional floor shot cues can be placed in the offensive court side of scoring Area C for four-point shot attempts before the mid-court line 110 (while in the offensive court), as well.

While the floor shot cues are only shown for the instance where the offensive team is bringing the ball "up the court" in the direction from baseline 124 to baseline 122, it is to be understood that floor shot cues would also be provided on the court surface 102 for the instance where the opposing team then brings the ball "up the court" in the direction from the baseline 122 toward the baseline 124.

In other words, in this latter instance, scoring Areas A, B, and C then become the four-point shot area, scoring Area D becomes the three-point shot area, and scoring Area E becomes the two-point and one-point shot area. Shot boxes 806B and 808B are then also the four-point baseline shot boxes, in this latter instance.

Thus, there can be floor shot cues similarly designed and applied as for the floor shot cues 706 applied for the opposing team. Again, the depicted floor shot cues 706 are only examples of what can be used. Other designs can be employed that use fewer floor cues, or a greater number of floor shot cues. Moreover, the floor shot cues can be of different designs, colors, and/or fill patterns, as desired. For example, one set of floor shot cues for the four-point shot cues 706 can be blue circles, etc.

It is to be appreciated that the different scoring areas can also employ correspondingly different colors. For example, the scoring Area B can be yellow, the scoring Area C can be blue, the scoring Area D can be red, and so on. It can also be the case that there is color symmetry based on the mid-court line 110.

Thus, scoring Areas A and E are of the same color (e.g., white) and/or floor fill pattern (e.g., the standard wood floor look), scoring Areas B and D are of the same color (but different from any other scoring area, e.g., blue) and/or fill pattern (e.g., lined across the width from sideline 112 to sideline 114), and scoring Area C can be a single color (e.g., green) on both sides of the mid-court line 110. Where scoring Area C is a single color, the mid-court line 110 can then be a sufficiently contrasting line up to two inches in width to demarcate the team courts and for over- and back violations.

It can also be an alternative to make scoring Area C of two different and sufficiently contrasting colors based on the mid-court line 110. In this case, the need for the mid-court line 110 may then be obviated, as it will be clearly delineated by the sufficiently contrasting colors.

The use of differentiating colors in the various scoring Areas (A, B, C, D, E, "red boxes", "behind the blue line", etc.) and for various lines also provides a way to more readily engage viewers and listeners (which may be visually impaired) by the announcer calling out colors that clearly indicate to the listener where the "action" is taking place, such as a shot attempt from the team's yellow zone.

More generally, the intelligent use of colors can make the court visually pleasing to the fans and the players. For example, when considering the use of the six-point shot and the five scoring Areas A, B, C, D, and E, Areas A and E can be both green or both white, Areas B and D can both be the natural wood design or both can be white (provided B and D are different than A and E). Specifically, in one implementation, Areas A and E both are white, Areas B and D both are green, and Area C is purple or blue. The four-point shot boxes (806B and 808B) can be red. The floor shot cues 706 can be any color sufficient to be visually contrasting with an adjacent or underlying color. The illegal shot area 916 (shown in FIG. 9) behind the backboard can be black. Thus, it has been shown and described that the court surface 102 can be colorized in any specific way and for any desired venue.

An advantage obtained from the use of contrasting colors and/or patterns, such as red for the baseline four-point scoring location(s) is that suitably selected contrasting colors can obviate the need of the standard two-inch wide black line currently used pervasively on the court surface 102 to demarcate certain areas. In other words, when addressing the currently pervasive use of two-inch wide lines within the court perimeter, the two-inch wide line(s) can be reduced to a one-inch wide line, or even eliminated entirely in certain areas such as for at least one of the four-point scoring zones near the baseline, the four-point shot line near the mid-court line, or the three-point arc, for example, by the selective use of contrasting colors and/or patterns imprinted on the court surface.

Consider the following example where two teams, the Jets and the Mudhens, are playing. Player Jones plays for the Jets, and player Miller plays for the Mudhens. In this example, also consider the scoring Area B is yellow, scoring Area C is blue, and scoring Area D is yellow.

Using coloration as an informative indicator to the listener (and viewer) during play-by-play announcements, the announcer can announce that "Jones is taking a shot from the yellow zone!", which would clearly indicate to the listener (who is aware of the floor color scheme) that a three-point shot is being attempted by the Jets. Similarly, the announcer can announce that "Miller is taking a shot from the blue zone!" or "Miller is taking a shot from the blue!", which would clearly indicate to the listener (who is aware of the floor color scheme) that a four-point shot is being attempted by the Mudhens.

In another example of the benefits of colorization, the announcer can announce that "Miller is taking a shot from the blue line!", which could clearly indicate to the listener (who is aware of the floor color scheme) that a four-point shot is being attempted by the Mudhens. The announcer can also announce that "Miller is taking a shot from the yellow line!", which would clearly indicate to the listener (who is aware of the floor color scheme) that a three-point shot is being attempted by the Mudhens.

In yet another example, the announcer can announce that "Miller is taking a shot from the Jet's blue zone!", which would clearly indicate to the listener (who is aware of the floor color scheme) that a four-point shot is being attempted by a player of the Mudhens. In yet another benefit of colorization, the announcer can announce that "Jones is taking a shot from the Jet's yellow zone!", which would clearly indicate to the listener (who is aware of the floor color scheme) that a four-point shot is being attempted by the Jets. Thus, color provides an added dimension to more readily understanding what is occurring in the game, and where. Other terminology or phrases can also be adapted to more readily indicate to the viewer and listener what is happening in the game. For example, "Jones is taking a shot from behind the blue line" or "Miller is taking a shot from behind the Mudhen's blue line" which can be defined to be synonymous for a four-point shot in the yellow zone, or in the blue zone, and so on.

Figure 9:
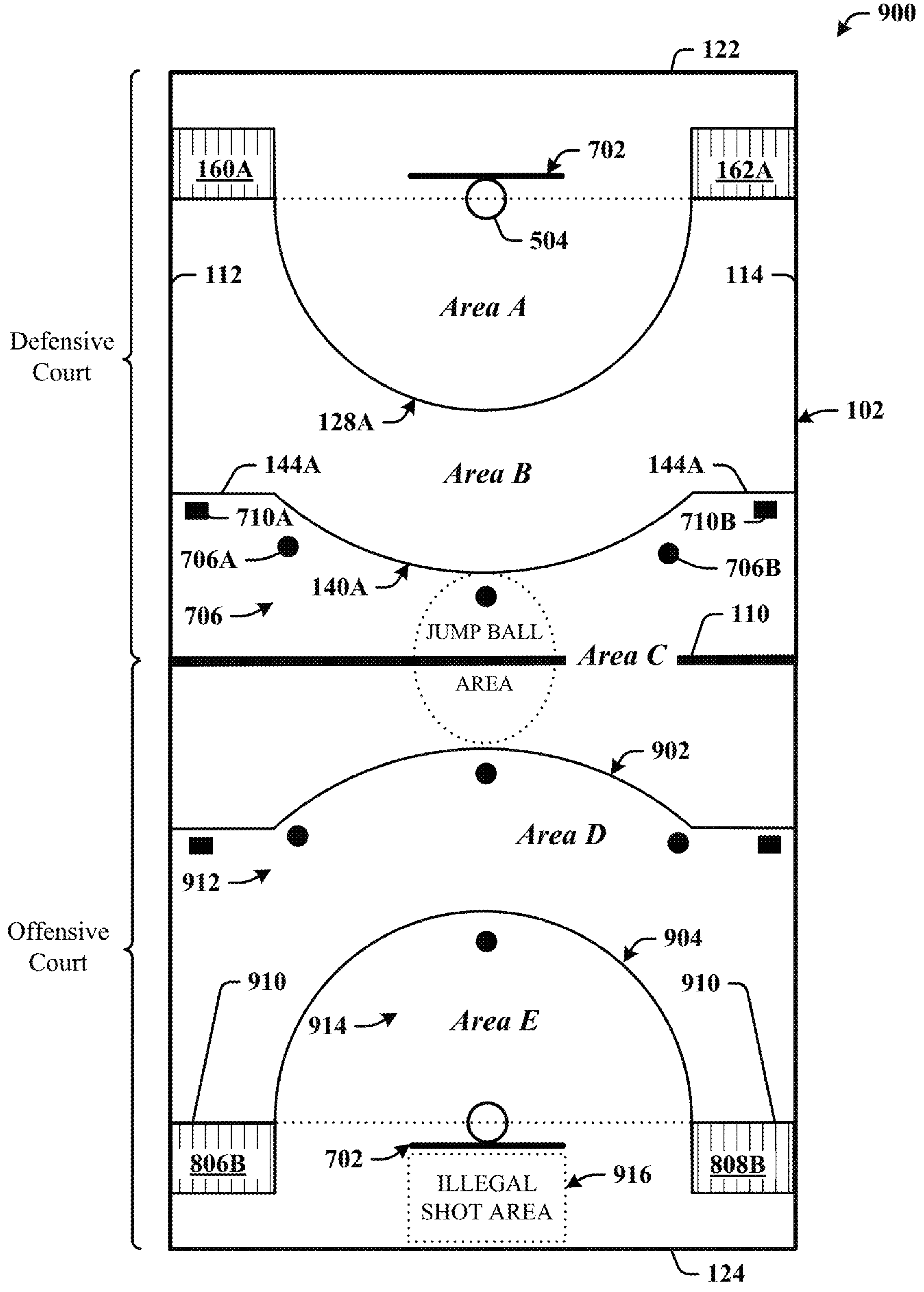
FIG. 9 illustrates a basketball court implementation that includes court surface shooting locations for five-point and six-point shots, in accordance with the disclosed architecture.

It is to be understood that the utilization of separate scoring areas such as Area D and scoring Area E provide a natural way to expand on the court 800 of FIG. 8. Accordingly, FIG. 9 illustrates a basketball court 900 implementation that includes court surface shot locations and floor shot cues for attempting five point and six-point shots, in accordance with the disclosed architecture. In this implementation, gameplay enables shooters to score up to six points for one shot. In this alternative implementation, the five-point shot is not made from specific parts of the jump circle 109. Moreover, the four-point scoring location previously described as encompassing over half the court 100 and for court 800 (e.g., the entire offensive team court plus part of the defensive team court), is now more restricted.

This implementation of court 900 is now described in detail, in terms of the offensive court and the defensive court. In implementation, the court design applies to both teams, where the offensive and defensive teams reverse direction of play based on ball possession. In other words, the defensive court "flips" to now become the offensive court and the offensive court becomes the defensive court. The court system 900 can also include backboards (not shown in detail, but similar to backboard 502, 602, and 702, for example) with backboard shot cues (similar to backboard shot cues 704) that relate to corresponding floor shot cues.

The basketball court 900 is partitioned into five shooting/scoring areas: scoring Area A, scoring Area B, scoring Area C, scoring Area D, and scoring Area E. Scoring Area A encompasses the typical one-point free throw shot, and two-point shot areas, but not the baseline four-point shot boxes (160A and 162A). Thus, scoring area A comprises an area on the court surface 102 bounded by the three-point arc 128A, baseline 122, part of the sidelines (112 and 114), and two sides of each of the baseline four point shot boxes (160A and 162A).

Scoring Area B is the three-point shot area and is bounded between scoring Area A and scoring Area C. More specifically, scoring Area B is an area on the court surface 102 bounded by the four-point shot line 140A, part of the sidelines (112 and 114), the three-point arc 128A, and one side of each of the four-point shot boxes (160A and 162A).

Scoring Area C is the four-point shot area and is bounded between scoring Area B and scoring Area D. More specifically, scoring Area C is an area on the court surface 102 bounded by the four-point shot line 140A of the defensive court, part of the sidelines (112 and 114), and a five-point shot line 902 (the four-point shot line in the offensive court). Thus, the four-point shot area (the scoring Area C), in this implementation, has been reduced in size from the larger four-point shot area previously described in FIG. 8, which extended all the way to the baseline 124.

Notice that scoring Area C also includes (straddles) the mid-court line 110, so the offensive shooter needs to be mindful of an over-and-back violation when attempting to setup for the four-point shot. That is, once the ball handler moves into the defensive court part of scoring Area C, the ball handler cannot then move back across the mid-court line 110 into the part of scoring Area C of the offensive court. However, the ball handler can attempt a four-point shot while standing on the mid-court line 110 when moving from the offensive court into the defensive court.

In an implementation where scoring Area C is a single color such as deep purple or dark blue, it can be advantageous, in order to clearly distinguish or assist in readily identifying an over-and-back violation, to employ a one-inch wide or a two-inch wide mid-court line of a specific color (e.g., white, yellow, etc.) that is sufficiently contrasting to the color (e.g., deep purple, dark blue, etc.) of scoring Area C.

Additionally, the width of the mid-court line used can, optionally, increase the length of the court accordingly. Thus, a one-inch wide mid-court line extends the court length by one inch, a two-inch wide mid-court line extends the court length by two inches, and so on. This enhancement preserves the overall area of scoring Area C. Alternatively, the width of the mid-court line 110 has no effect on the overall court length, but is simply centered in the dividing line of the court.

This latter alternative can reduce the overall area of scoring Area C by a nominal amount, unless the mid-court line 110 can be considered neutral. In other words, when the player with ball possession takes the ball across the mid-court line 110 into the back court, but then steps backward such that the player's foot traverses the entire width of the mid-court line 110 and touches the front court, then an over-and-back violation could be called. Thus, if any part of a ball handler's foot is touching the mid-court line 110 without stepping backward into the front court, this would not be an over-and-back violation.

When considering the description of demarcation lines relative to the overall court dimensions, in one implementation, the perimeter (or out-of-bounds) line can be exclusive of the overall court dimensions. That is, when the court dimension is said to be fifty-four by one-hundred feet, for example, this dimension excludes the two-inch perimeter line (where a two-inch boundary line is used). In an alternative implementation, the perimeter (or out-of-bounds) line can be included in the overall court dimensions. That is, when the court dimension is said to be fifty-six by one-hundred feet, for example, this dimension includes the two-inch perimeter line around the entire court.

Scoring Area D is the five-point shot area and is bounded between scoring Area C and scoring Area E. More specifically, scoring Area D is an area on the court surface 102 bounded by the five-point shot line 902 of the offensive court, part of the sidelines (112 and 114), a six-point shot line 904 (same as the three-point shot line in the offensive court), and one side 910 of each of the four-point shot boxes (806B and 808B) in the offensive court. As before, the four-point shot boxes (806B and 808B) in the currently-designated offensive court become four-point shot boxes for the opposing team when the opposing team gains possession of the ball.

Scoring Area E is the six-point shot area for the offensive team and is bounded between scoring Area D and the baseline 124. More specifically, scoring Area E is an area on the court surface 102 of court 900 bounded by the six-point shot line 904 of the offensive court, part of the sidelines (112 and 114), and the same one side 910 of each of the four-point shot boxes (806B and 808B) described above. Thus, the four-point shot boxes (806B and 808B) in the currently-designated offensive court become part of the scoring Area E for six-point attempts to the goal 504 near the baseline 122 of the defensive court.

Note that the five-point shot area of scoring area D and the six-point shot area of scoring Area E are not requirements, but options offered by the disclosed enhance basketball architecture. Where the six-point shot is not employed, then scoring area D and scoring Area E become the five-point shot area. More specifically, the five-point shot area is then an area on the court surface 102 bounded by the five-point shot line 902 of the offensive court, part of the sidelines (112 and 114), and the baseline 124 in the offensive court. As before, the four-point shot boxes (806B and 808B) in the currently-designated offensive court become part of the offensive team's five-point shot area (i.e., scoring Areas D and E), but remain as the four-point shot boxes for the opposing team when the opposing team gains possession of the ball. Therefore, all shots taken and made from beyond shot line 140A (the side of shot line 140A that is closer to the mid-court line 110) by the offensive team become valued at four points.

An area 916 directly behind the backboards can be designated as an illegal shot area as ruled in the existing basketball game, and which illegal shot area 916 can be cued (designated) on the court by color and/or by other design. The illegal shot area 916 can be applied to the court surface 102 as a rectangular block that is colored and/or a specific design (e.g., angled slash marks). For example, the rectangular block can be aligned with the overhead backboard 702 such that one set of sides align with the vertical sides of the backboard 702, and of the other set of sides, one other side aligns parallel and proximate to the baseline 124 and the other side aligns parallel and proximate to the line (not shown) in the plane of the court surface 102 formed by the intersection of the vertical plane of the front or back face of backboard 702 with the court surface 102.

Note that as previously described in FIG. 7 and FIG. 8, there can be numerous floor shot cues (e.g., hash marks, polygons, or other indicia) applied to the court surface 102 on the inside edges of the sidelines (112 and 114) or other suitable floor locations to further indicate to the players the floor location from which a shot can be made for a greater likelihood of scoring in accordance with backboard shot cues (e.g., shot cues 704 of FIG. 7) on the backboard 702, for example.

For example, floor shot cues 710A and 710B proximate the straight-line sections 144A and floor shot cues 706A and 706B can be utilized from which four-point shots can be attempted, since the four-point shot would be attempted behind the four-point shot line 140A. Although not shown, other floor shot cues can be placed in the offensive and defensive court sides of scoring Area C for four-point shot attempts before and after the mid-court line 110, as well.

Similarly, floor shot cues 912 can be applied to the court surface 102 proximate the five-point shot line 902 and from which five-point shots can be attempted to goal 504 in the defensive court, and one or more floor shot cues 914 can be applied to the court surface 102 proximate the six-point shot line 904 from which six-point shots can be attempted to goal 504 in the defensive court.

While the floor shot cues are only shown for the instance where the offensive team is bringing the ball "up the court" in the direction from baseline 124 to baseline 122, it is to be understood that floor shot cues would also be provided on the court surface 102 for the instance where the opposing team then brings the ball "up the court" in the direction from the baseline 122 toward the baseline 124.

In other words, in this latter instance, scoring Area A then becomes the six-point shot area, scoring Area B becomes the five-point shot area, scoring Area C becomes the four-point shot area, scoring Area D becomes the three-point shot area, and scoring Area E becomes the two-point and one-point shot area. Shot boxes 806B and 808B are then the four-point baseline shot boxes, in this latter instance.

Thus, there can be floor shot cues similarly designed and applied as for the floor shot cues applied for the opposing team. Again, the depicted floor shot cues are only examples of what can be used. Other designs can be employed that use fewer floor cues, or a greater number of floor shot cues. Moreover, the floor shot cues can be of different designs, colors, and/or fill patterns, as desired. For example, one set of floor shot cues (not shown, but can be employed) for the three-point shot line 140A can be yellow triangles, the four-point shot cues 706 can be blue circles, and the five-point floor shot cues 912 can be red squares, the six-point shot cues 914 can be unfilled circles, etc. If no six-point shot is incorporated into the game, six-point floor shot cues 914 need not exist, but can be retained as floor shot cue(s) for four-point shot(s). Similarly, if no five-point shot is included as part of the game, the five-point floor shot cues 912 need not exist, but can be retained as floor shot cues for four-point shots.

It is to be appreciated that the different scoring areas can also employ correspondingly different colors. For example, the scoring Area B can be yellow, the scoring Area C can be blue, the scoring Area D can be red, and so on. It can also be the case that there is color symmetry based on the mid-court line 110. Thus, scoring Areas A and E are of the same color (e.g., white) and/or floor fill pattern (e.g., the standard wood floor look), scoring Areas B and D are of the same color (but different from any other scoring area, e.g., blue) and/or fill pattern (e.g., lined across the width from sideline 112 to sideline 114), and scoring Area C can be a single color (e.g., green) on both sides of the mid-court line 110. Where scoring Area C is a single color, the mid-court line 110 can then be a sufficiently contrasting line up to two inches in width to demarcate the team courts and for over-and back violations.

It can also be an alternative to make scoring Area C of two different colors based on the mid-court line 110. In this case, the need for the mid-court line 110 may then be obviated, as it will be clearly delineated by the sufficiently contrasting colors.

It is also to be understood that the six-point shot scoring Area E is not a requirement, but simply an alternative that can be realized when utilizing the disclosed court architecture. This applies to the five-point shot scoring Area D, as well. Where the six-point shot scoring Area E is not utilized, the five-point shot scoring Area D then extends from shot line 902 all the way to the baseline 124.

The use of differentiating colors in the various scoring Areas (A, B, C, D, E, "red boxes", "behind the blue line", etc.) and for various lines also provides a way to more readily engage viewers and listeners (which may be visually impaired) by the announcer calling out colors that clearly indicate to the listener where the "action" is taking place, such as a shot attempt.

Consider the following example where two teams, the Jets and the Mudhens, are playing. Player Jones plays for the Jets, and player Miller plays for the Mudhens. In this example, also consider the scoring Area B is yellow, scoring Area C is blue, and scoring Area D is yellow. Using coloration as an informative indicator to the listener (and viewer) during play-by-play announcements, the announcer can announce that "Jones is taking a shot from the yellow zone!", which would clearly indicate to the listener (who is aware of the floor color scheme) that a three-point shot is being attempted by the Jets. Similarly, the announcer can announce that "Miller is taking a shot from the blue zone!" or "Miller is taking a shot from the blue!", which would clearly indicate to the listener (who is aware of the floor color scheme) that a four-point shot is being attempted by the Mudhens.

In another example of the benefits of colorization, the announcer can announce that "Miller is taking a shot from the blue line!", which could clearly indicate to the listener (who is aware of the floor color scheme) that a four-point shot is being attempted by the Mudhens. The announcer can also announce that "Miller is taking a shot from the yellow line!", which would clearly indicate to the listener (who is aware of the floor color scheme) that a three-point shot is being attempted by the Mudhens.

In yet another example, the announcer can announce that "Miller is taking a shot from the Jet's blue zone!", which would clearly indicate to the listener (who is aware of the floor color scheme) that a four-point shot is being attempted by a player of the Mudhens. In yet another benefit of colorization, the announcer can announce that "Jones is taking a shot from the Jet's yellow zone!", which would clearly indicate to the listener (who is aware of the floor color scheme) that a five-point shot is being attempted by the Jets. Thus, color provides an added dimension to more readily understanding what is occurring in the game, and where. Other terminology or phrases can also be adapted to more readily indicate to the viewer and listener what is happening in the game. For example, "Jones is taking a shot from behind the blue line" or "Miller is taking a shot from behind the Mudhen's blue line" which can be defined to synonymous for a five-point shot in the yellow zone, or in the blue zone, and so on.

The disclosed and described implementations all find applicability to computer games, where, for example, high-count shots such as five points and six points are readily implementable and can be positively received by computer gamers. Another variation on basketball that can employ these high-count shots is the well-known game of "H.O.R.S.E", where an opposing player(s) attempts to force the opposing player(s) to accumulate the H-O-R-S-E letters first by making difficult and typically unconventional shots. This game can also be played by two or more opposing players per team.

The disclosed architecture also finds applicability to Wi-Fi "pick-up" games where users (anywhere in the world) can simply go online and login to join one of two teams, for example, up to three players per team or five players per team, etc., and engage in gameplay with other team mates to play basketball against another team. In another implementation, a single user launches the game on their handheld device (e.g., cellphone) and plays against the software program itself (via a software "bot" or robot). The game can be points-limited or time-limited. In the implementation for fantasy basketball, the user playing the fantasy game can receive a predetermined number of points based on the shot scored in the actual basketball game. For example, while the actual ball player scores a four-point shot, the fantasy player receives six points.

Figure 10:
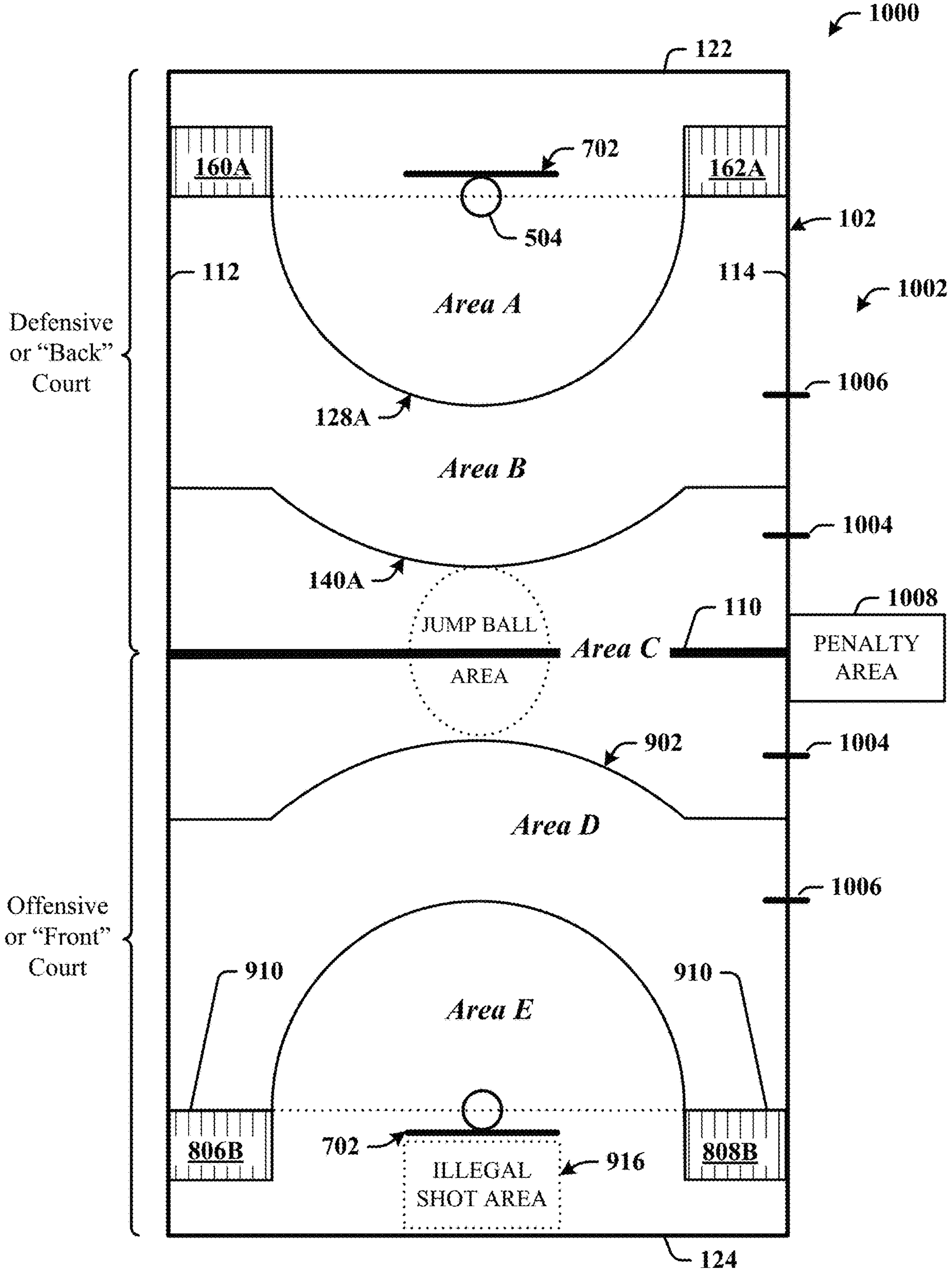
FIG. 10 illustrates a basketball court implementation that includes court surface shooting locations for an increased number of points, as well as penalty locations and ball-in locations on the court surface, in accordance with the disclosed architecture.

FIG. 10 illustrates a basketball court implementation 1000 that includes ball in-bound demarcations and penalty locations for higher point-count shots, in accordance with the disclosed architecture. As previously described, the basketball architecture can employ four-point shots, and in a more expansive implementation, five point shots. Accordingly, the court surface 102 can comprise the scoring Areas C and D/E to accommodate these additional scoring opportunities, where scoring Area D is for four-point shots and scoring Areas D and E are for five point shots.

A situation that can arise with these higher-point scoring opportunities and court layout relates to ball in-bound occurrences, where the ball is brought in-bound from the sidelines (e.g., sideline 112 and sideline 114), and which can precipitate an over-and-back infraction (or "call") relative to the mid-court line 110.

As implemented herein, for a defensive foul committed in the three-point scoring Area B against a player attempting a three-point shot, the given foul can result in three free-throws being given to the player fouled. Similarly, for a defensive foul committed in the four-point scoring Area C against a player attempting a four-point shot, the given foul can result in four free-throws being given to the player fouled. Still similarly, for a defensive foul committed in the five-point scoring Area D/E against a player attempting a five-point shot, the given foul can result in five free-throws being given to the player fouled.

Where the defensive foul does not result in free throws, but enables a sideline in-bound pass, the ball in-bound pass should not force an over-and-back situation at the mid-court, or penalize the offensive team by limiting usage of the expended scoring Areas C-E.

For example, the four-point scoring Area C overlaps the mid-court line 110. Thus, a sideline in-bound pass related to a four-point foul by the defense should not restrict the pass to the part of scoring Area C in the defensive (or back) court, but enable the in-bound pass into any part of scoring Area C, including the part in the front court. (Note that where there is no five-point shot allowed in the game, the four-point scoring area encompasses scoring Areas C, D, and E.)

Similarly, a sideline in-bound pass related to a five-point shot foul by the defense should not restrict the in-bound pass to any area in the defensive court not associated with the five-point shot, but enable the in-bound pass into any part of scoring Area D/E. Thus, gameplay stopped due to a defensive foul should resume in the scoring area that corresponds to the where the foul occurred and without incurring an over-and-back call.

In support of these higher-point scoring shots, one or both of the sidelines (112 and 114) can be marked with sideline marks 1002, which include in-bound pass location marks 1004 for the various higher-point shot infractions, and coach/team bench location marks 1006. It is to be appreciated that the coach/team bench location marks 1006 be placed so as to also serve as a five-point in-bound pass location mark, where the team that was fouled and retains possession, can bring the ball back into play in the scoring Area D associated with the five-point shot. This eliminates an over-and-back call that would otherwise occur under existing rules.

It is to be understood that on the court surface 102, and at least for NBA gameplay, two lines (or hash marks) are drawn on the same sideline (e.g., sideline 114), which designate the extent of the coaching box and team bench area. In the existing NBA court design the two lines are each twenty-eight feet from each of the baselines (122 and 124). However, in the disclosed expanded court design, these lines can remain the same distance from the baselines (122 and 124), or be moved up to and including thirty-one feet from the baselines (122 and 124) for the one-hundred-foot court length. For a given court (defensive or offensive), this line marks the farthest extent and the area within which a coach can stand and which the team bench extends. Thus, both teams are benched on the same sideline, but separated by a predetermined distance (e.g., ranging from approximately 38-44 feet). It is to be understood, however, it is not a requirement that both teams be located on the same sideline. Thus, one team can be located along sideline 112 and the other team can be located along sideline 114.

In one variation of the disclosed basketball game, it is conceivable to incorporate features that enable single and multi-player advantages (e.g., two-man) or "power plays". A player committing a flagrant foul can be directed to a penalty area 1008 to sit for a predetermined amount of time (e.g., two minutes) or until an event has occurred in the gameplay, such as the offensive team scored. Such a feature would also retain fan interest until the last second of the game while maintaining the flow of the game. This feature can apply to five and six-player basketball teams as well.

The penalty area 1008 can be located along the court perimeter so that the player(s) sitting in the penalty area 1008 (also referred to as the "penalty cage", using "cager" terminology generated long ago in the initial era of basketball) are isolated from at least verbal communications with other team players and the coach. It is to be understood that the penalty area 1008 can be located anywhere on the perimeter, such as behind the backboard, sidelines, baselines, etc., as long as the penalty area 1008 isolates the player from the coach and members of the team.

With respect to the existing flagrant fouls, a Flagrant-1 foul relates to unnecessary contact, and a Flagrant-2 foul relates to unnecessary and excessive contact. In either case, the player can be ejected from the game. The Flagrant-1 foul includes wind-up motion plus hard contact or hard contact plus some follow-through. The Flagrant-2 foul includes all of Flagrant-1, but combines the actions to deliver a wind-up motion, hard contact, and follow-through motion. Free throws and retained ball possession are awarded for both of the flagrant fouls, and multiple Flagrant-1 fouls can result in ejection from the game, while a single Flagrant-2 foul can result in ejection.

There are other types of fouls ("common" fouls, technical fouls, etc.) that can be committed and penalized in basketball. As a new feature of the disclosed basketball architecture, based on the type of foul committed, the player committing the foul can be sent to a penalty location (also referred to as a "penalty cage") for a given amount of time (e.g., two minutes), until such penalty time expires or an event occurs in the game (e.g., opposing team scores). The event can be the opposing team scoring a higher-point shot (e.g., 3-point, 4-point, 5-point, etc.). Moreover, the team fouled retains ball possession.

If a non-player commits a technical foul, the person can be ejected from the game. For example, a first technical foul can result in a two minute or four-minute penalty. If a non-player commits a technical foul, the opposing team can select any player on the court of the "fouling" team to serve the penalty. If the coach commits the technical foul, a player will be removed for a specific period of time depending on the severity of the technical foul. Thus, it is conceivable that the star player of the fouling team can be picked to serve the penalty. A second technical foul can lead to a two- or four-minute penalty, and even ejection from the game.

For example, a Flagrant-1 foul committed by a player can result in the player sitting in the penalty cage for two minutes, multiple Flagrant-1 fouls, by the team or the player, can result in the player sitting in the penalty cage for four minutes followed by ejection, and one or more Flagrant-2 fouls can result in the player sitting in the penalty box for the rest of the quarter, game, etc., followed by ejection.

It can also be implemented that the commission of flagrant fouls within a certain span of time will result in a four-minute penalty and/or ejection. For example, where an aggressive player commits two flagrant fouls with five minutes of each other, within one quarter, and/or within the same half, etc., the aggressive player can be penalized four minutes, and/or ejected. This player/team penalization is intended to put such team/player on notice that said behavior will not be tolerated. This enhances player safety, keeps the game moving, and is intended to keep players in the game, rather than on the sidelines or ejection from the game.

It is to be understood that when a foul is committed with less than a predetermined amount of time on the clock (e.g., fourteen seconds), the clock can be reset to at least this predetermined amount of time for the opposing team to get the ball in-bound and attempt a shot.

Where the specific foul directs the infracting player to the penalty cage, this generates a "power play" situation, where one team has more players on the court than the opposing team. For example, it would be possible for an offensive team to field six players against the opposing team, which would have five players. Depending on the magnitude of the foul (i.e., the time imposed in the penalty area 1008 or "cage"), it could also be possible that the offensive team would field four players against the opposing defensive team of five players. As realized, the creation of the power play situation in basketball can have a dramatic effect on the outcome of the game score and in very short period of time, thereby retaining fan excitement by prolonging the uncertainty in the outcome of the game.

These penalty rules in combination with the expansive court and associated features makes the game more compatible with at least six players per side, and one or more additional officials. It further mitigates the occurrence of unsafe and unwise fouls during the game, while retaining fan attention to the last second of the game. As previously indicated, due to the reduction or elimination of game stoppages, the overall game time can be reduced, thereby extending player energy in the gameplay while reducing the potential for player injuries normally associated with extended gameplay and stoppages by player fatigue. Thus, quarters can be reduced in time from twelve minutes to ten minutes, for example, to keep players "fresh" throughout the entirety of the game. The six-player team also extends player/team "freshness" by reducing player fatigue through more passing, for example.

A six-player squad capability can also lead the team to expanding their roster by one or more players. This also returns the game to the de-emphasis of the current focus on the player size/height of the "big man" and re-emphasizes speed and quickness on the court, as well as passing and longer range shooting skills. The enhanced basketball architecture also expands game strategy, and introduces new plays by coaches, such as new plays that can be run behind that backboard due to the increased area provided by the expanded court design.

Included herein is one or more flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. Moreover, not all acts illustrated in a methodology may be required for a novel implementation.

Figure 11:
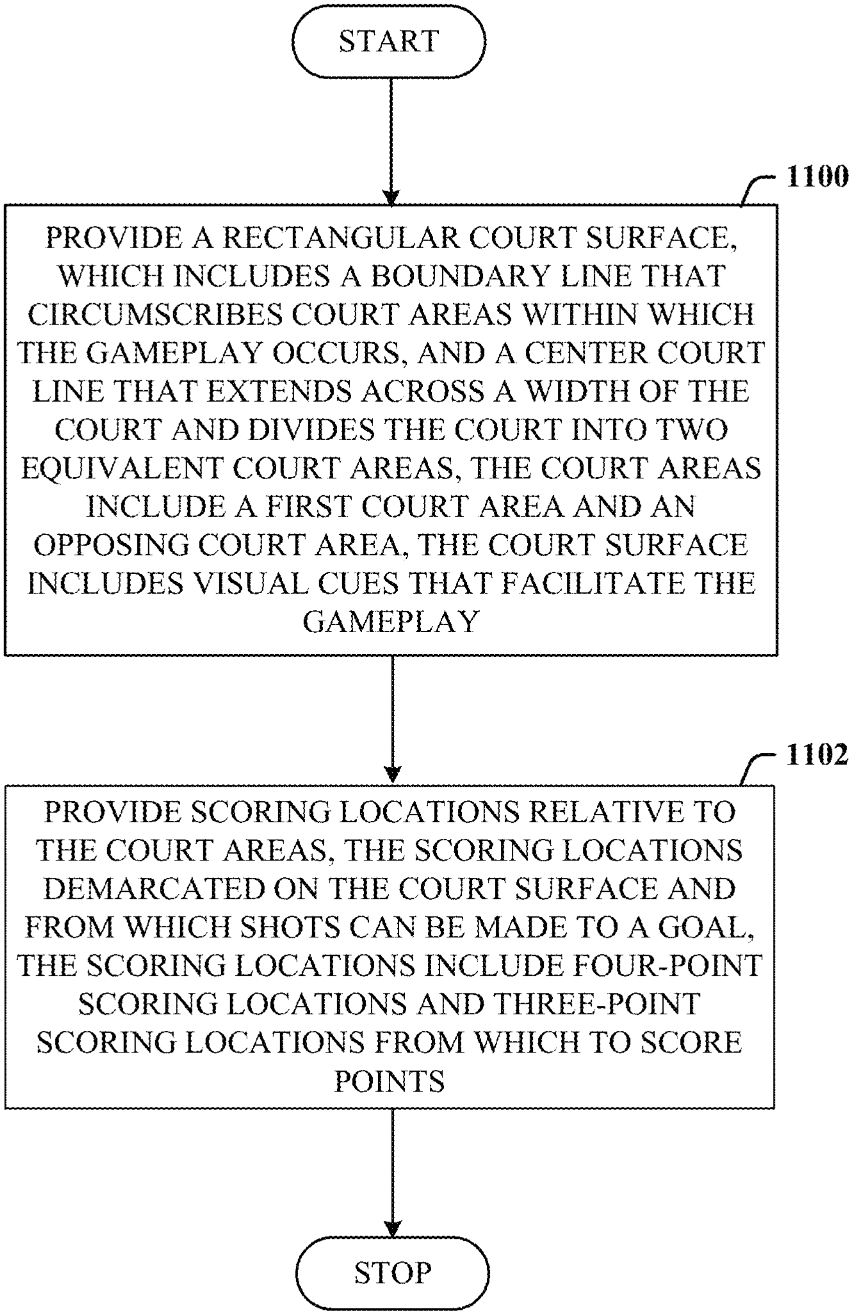
FIG. 11 illustrates a method of providing a basketball court for basketball gameplay, in accordance with the disclosed architecture.

FIG. 11 illustrates a method of providing a basketball court for basketball gameplay. At 1100, a rectangular court surface is provided, which includes a boundary line that circumscribes court areas within which the gameplay occurs, and a center court line that extends across a width of the court and divides the court into two equivalent court areas. The court areas include a first court area and an opposing court area (a second court area of an opposing team). The court surface includes visual cues that facilitate the gameplay. The visual cues include hash marks placed along the sidelines (e.g., to define the bench area of a team, etc.), the tip-off circle at the center of the court and centered on the center court line, the free throw area (e.g., player locations when a free throw is being made, etc.), and so on.

At 1102, scoring locations are provided relative to the court areas, the scoring locations demarcated on the court surface and from which shots can be made to the goal. The scoring locations include four-point scoring locations and three-point scoring locations from which to score points.

The method can further comprise providing at least two four-point scoring locations in each court area: a first four-point scoring location proximate the center court line (e.g., within four feet of the center court line), and a second four-point scoring location on one side of the goal and bounded on one side by a back-court baseline (e.g., the short side 124).

The method can further comprise demarcating the first four-point scoring location by a mid-court four-point shot line (e.g., the shot line 140A, the shot line 208A, the shot line 320A) and the second four-point scoring location by baseline four-point shot line. The method can further comprise providing the mid-court four-point shot line with an arcuate segment having a radius of curvature greater than a radius of curvature of a three-point line.

As a brief, but non-exhaustive, summary of the disclosed basketball court architecture, an improved basketball court architecture is described that provides a safe environment for the players in which to play the game and officials to officiate gameplay. Moreover, the architecture further enables players of any age group, as well as the game, in general, room to grow, and, improve play and shooting abilities.

In support thereof, the disclosed enhanced court exhibits features such as updated dimensions and court annotation or artifacts that accommodate and promote the increased size and athletic capabilities of the players, as well as improve the game at least insofar as playing and viewing. For example, the improved court architecture includes increased point scoring opportunities such as for four-point goals and five-point goals, as well as clearly marked scoring areas on the court surface from which to make these shots.

The use of colorization of selected areas of the court surface facilitates increased visual acuity of the players in determining from where shots should be taken and for officiating to ensure the proper scoring and game rules are enforced. The use of contrasting colors of court features such as shooting areas and lines enables players who may be colorblind, for example, or have other visual deficiencies to still compete and enjoy the game. Moreover, colorization can be used to enhance the contrast between adjacent scoring areas and other floor features so that players and officials can more readily determine where they are on the court and to more quickly make decisions based on the current court location.

Colorization enhances fan enjoyment not only at the arena, but also improves viewer recognition of actions on the court for the video viewer (e.g., television, computing device live and/or replay viewing, etc.), particularly, those fans viewing the game via the smaller displays associated with handheld devices such as smartphones, tablets, laptop computers, and the like. As indicated herein, for example, colors associated with specific areas of the court can be quickly recognized (visually and/or audibly) by viewers using smaller displays as corresponding to certain actions. For example, a shooting activity from a yellow area can be readily understood as a four-point shot, where yellow is the floor color of the four-point scoring area.

The use of colors in the basketball court architecture also facilitates other visual enhancements for fan enjoyment and improved flow of the game. For example, where a shot is being attempted from the red shot box 806B, a corresponding red identifier can be presented not only on the court-based electronic scoreboard system, but also in the television/video interface for fans watching the game but not physically at the arena. Where red is understood as associated with a four-point shot, the fan can readily understand that a four-point shot is being attempted or has been successfully made.

Thus, when a "legal" shot is being made from a given colored area, the electronic systems employed to make such a determination can automatically communicate the state of the shot to the audience via one or more of several different ways. The state of the shot can include parameters such as who is making the shot, where the shot is being made from, the point count for the given shot (e.g., three points, four points, five points, etc.), whether the shooter is (has) stepping (stepped) on a line that impacts the intended point count (e.g., intending to make four points but steps on a line that reduces the shot to three points, stepping out of bounds, etc.), and so on.

As part of the disclosed basketball architecture, one or more electronic data acquisition, data processing, and sensor systems can be employed to automate infraction identification, shot identification, floor location of the shooter/players at all times, etc., all of which provide data that can be processed to enhance the flow of the game, improve safety over what currently exists in sporting events, prolong fan interest, and generally, provide new and/or improved revenue streams for teams, companies, and advertisers involved with sporting events.

Sensors can be implemented in any of the following ways/locations to more precisely track gameplay: player clothing, the basketball, player shoes, line(s) on the floor (e.g., out-of-bounds lines, shot lines, shot boxes, etc.), backboard, hoop, hoop bracket, and so on. Imaging systems can be employed as well to process at least the shooting player to quickly assess the state and/or validity of the shot being attempted in order to prevent game stoppage and keep the game moving. Such data can also be employed to interface to computer games in non-realtime and/or substantially realtime presentation of the game using computer avatars of the players, for example.

Additionally, a redesigned backboard system also facilitates the increased likelihood of making the four-point and five-point shots by incorporating backboard shot cues at which the shooting player can aim to make these longer shots.

More specifically, the court has increased dimensions and incorporates additional shooting locations for an increased number of points not currently employed in basketball courts. For example, the basketball court is widened by four feet or six feet and lengthened by six feet, the court includes one or more four-point shooting locations, and a larger and more expansive three-point area for shooting three-point shots. Additional features include increasing the distance from the baseline to the center of the basket, which introduces additional room for players to traverse this area behind the basket, as well as facilitating the use of additional four-point shooting areas by the back baseline and on either side of the basket.

In another implementation, the court surface is clearly marked into five scoring areas, and can use different floor colorations and floor shot cues from which to attempt the shots. This further enables not only four-point shots, but also five-point shots, and even six-point shots. The flexibility of the disclosed implementations enables the user to decide to what extent high-point scoring will be employed, the associated floor shot cues and other markings, and the backboard shot cues.

Figure 12:
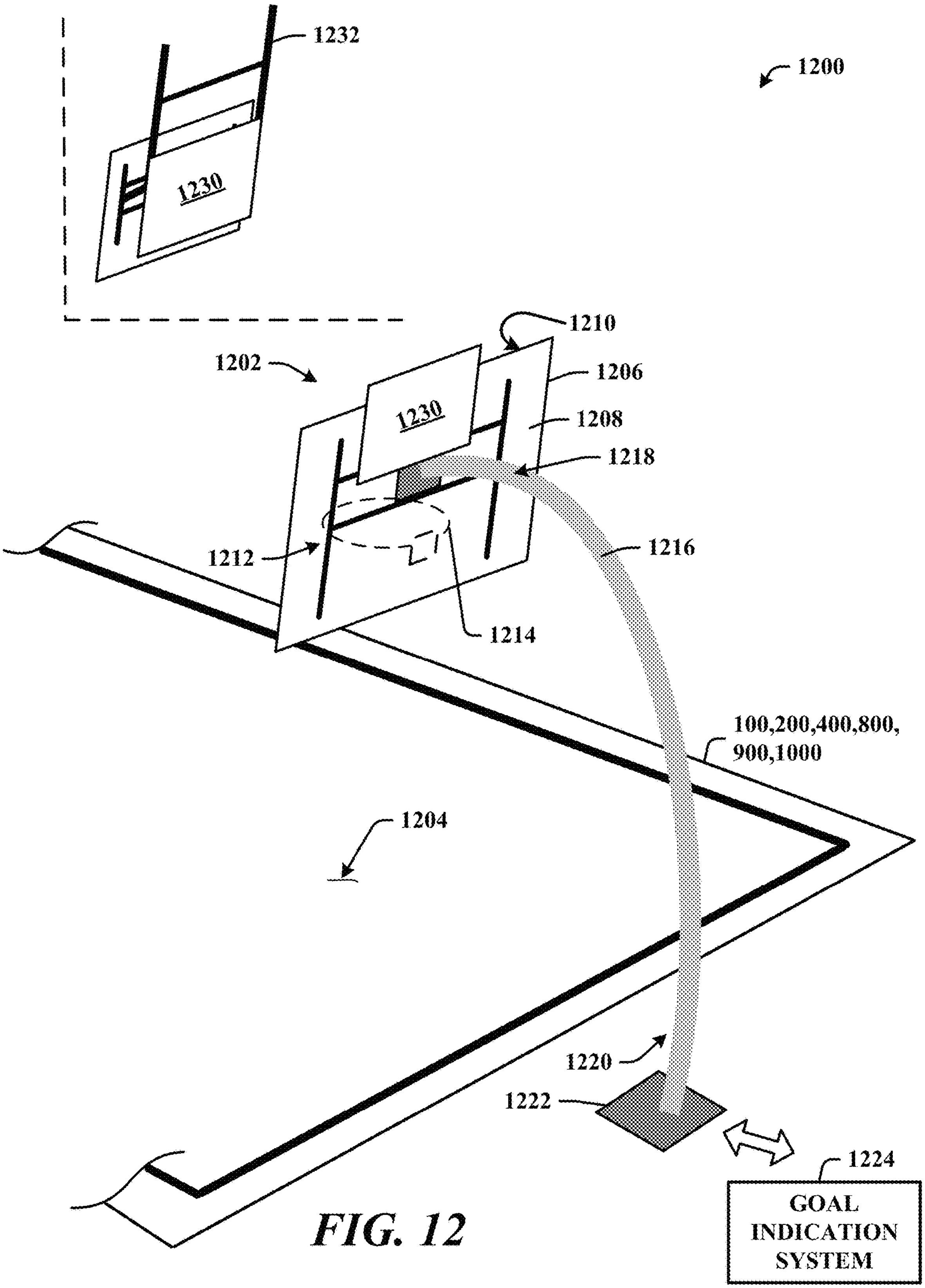
FIG. 12 illustrates an alternative embodiment of a basketball goal system in accordance with the disclosed architecture.

FIG. 12 illustrates an alternative embodiment of a basketball goal system 1200 in accordance with the disclosed architecture. The basketball goal system 1200 can comprise a backboard assembly 1202 positioned above a basketball game playing surface 1204 (e.g., similar to court surface 102), the surface 1204 part of the many courts (100, 200, 400, 800, 900, 1000) disclosed herein.

The backboard assembly 1202 can comprise a backboard 1206 having a back surface 1208 and a front surface 1210, a suspension frame 1212 affixed to the back surface 1208; and a goal 1214 (similar to goal 116A, and using a dashed line to indicate viewing through the backboard 1206) affixed to the front surface 1210.

The goal system 1200 can further comprise a suspension structure 1216 connected on a proximal end 1218 to the suspension frame 1212 of the backboard and secured on a distal end 1220 to a supporting foundation 1222 (represented generally as a metal plate affixed to a solid surface such as a concrete). The suspension structure 1216 suspends the backboard assembly 1202 above the playing surface 1204, which surface 1204 can be at a basketball arena, for example, or concrete at a private residence or outdoor public venue (e.g., a park). Although the suspension frame 1212 is indicated as a cross-bar design, it is understood the illustrated frame 1212 generally represents any of a number of different frame designs commercially available and that can be used to affix the suspension structure 1216 to the backboard 1206.

The suspension structure 1216 is multi-purpose to provide primary strength in supporting above the playing surface 1204, at least loading of the backboard assembly 1202, gameplay interactions (player hanging on the goal 1214, player impacting the backboard 1206, etc.) with the backboard assembly 1202, and peripheral systems proximate the backboard assembly and above the playing surface, such as a display 1230. The display 1230 can, in effect, be operated as a mirror for viewing by viewers sitting behind the backboard, of action occurring directly in front or the sides of the backboard or basket.

The suspension structure 1216 can further comprise a light transmissive property where, at least one of light impinged on the suspension structure 1216 or light caused to be generated within the suspension structure 1216, causes the suspension structure 1216 to emit a color indicative of the points associated with the shot attempted at the goal 1214.

The suspension structure 1216 can be a goose-necked structure (similar to the cantilevered structure 1216 of FIG. 12) and/or an overhead structure 1232 (see the inset bounded by a dashed line) which suspends the backboard assembly 1202 from above. The overhead structure 1232 is intended to represent generally any of a number of different designs which are commonly known and built commercially. The display (or television) 1230 can also be mounted in some fashion on the overhead structure 1232 and in an orientation that provides the greatest number of viewers (e.g., at an indoor arena) with the best possible view of at least activity around the backboard 1206. The suspension structure 1216 can be affixed at the distal end 1220 to a (floor) surface (in a way that does not interfere with gameplay and at a safe location) using any suitable combination of hardware to assure stability and strength of the backboard assembly 1202 at the desired height and to accommodate the expected loading during gameplay.

The basketball goal system 1200 can also include a goal indication system 1224 which interfaces to the suspension structure 1216 to cause an indication to be presented via the suspension system 1216, the indication relates to the shot points associated with a shot attempted at the goal 1214. The goal indication system 1224 includes all the hardware and software needed to effectuate the desired results. For example, the goal indication system 1224 includes the hardware to connect to the suspension structure 1216, which connect can be a wired power connection to power a colored light generation system embedded in the structure 1216 and/or applied to the outer surface of the suspension structure 1216.

Figure 13A:
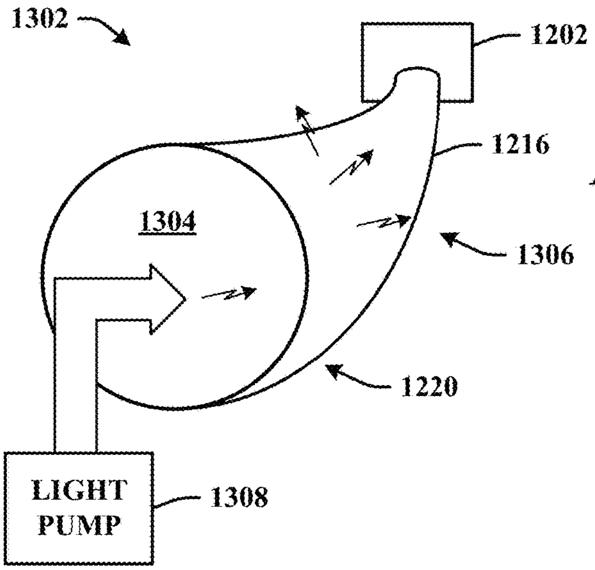
FIGS. 13A-13D illustrate alternative embodiments for employing suspension structures that can emit light according to shot points in accordance with the disclosed architecture.

FIGS. 13A-13D illustrate alternative embodiments 1300 for employing suspension structures that can emit light according to shot points in accordance with the disclosed architecture. FIG. 13A depicts a first design 1302 as a tubular (or pipe) construction, and as one example of the suspension structure 1216 (of FIG. 12). The first design 1302 depicts the structure 1216 as a single homogenous composition 1304 of a light transmissive material having sufficient strength to meet the static and dynamic loading demands and activity demands the backboard assembly 1202 would be expected to experience during the most energetic gameplay.

The composition 1304 can be a high-strength plastic with transparent and/or translucent properties such that light directed into the distal end 1220, for example, using techniques commonly known in the art for lighting optical tubes/fibers. In yet another implementation, the composition 1304 can include graphene and other high strength and conductive materials in the proper proportion to provide the material strength for gameplay, and light transmissivity for presenting color changes viewable along the length of the structure 1216 when controlled to display such color emissions 1306 along the length of the structure 1216.

The first design 1302 depicts a light pump 1308 which functions (responsive to hardware and/or software control) to generate colored light, which colored light is then output from the pump 1308 into the structure 1216 (e.g., into the distal end 1220). The light pump 1308 can be capable of flashlamp pumping, arc lamp pumping, laser pumping, etc., light source technologies, and other commonly-known methods for generating and directing light at or into a light conductive material (e.g., material 1304).

For example, a red colored flashing light emanating from the composition 1304 can indicate to the viewer that a three-point shot has been attempted to the goal. Alternatively, as an example, a flashing blue light can be designed to indicate to the viewer that a four-point shot is being attempted at the goal. Other color mappings can be employed for other types of point shots, such as a two-point shot, a five-point shot, etc.

Figure 13B:
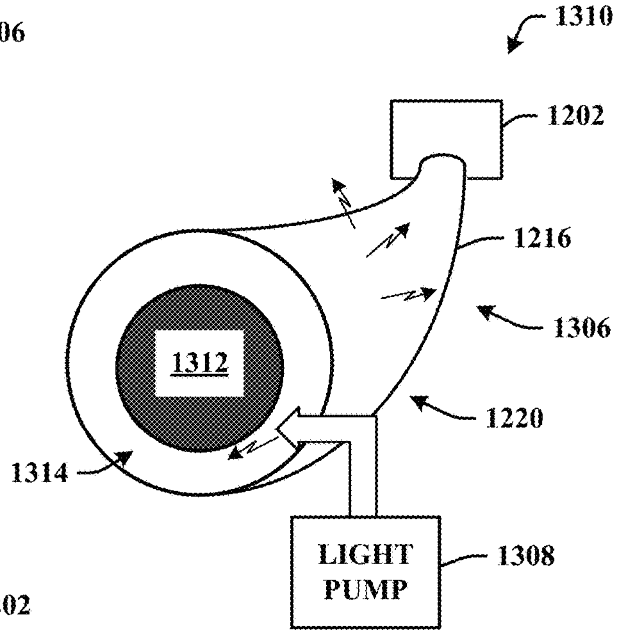

FIG. 13B depicts a second design 1310 of the suspension structure 1216 as having a core material (e.g., steel) 1312 as the primary structural strength and support material, and an outer coating or casing 1314 of light conductive material which surrounds some or all of the core material 1312.

The second design 1302 also depicts the light pump 1308 which functions (responsive to hardware and/or software control) to generate colored light, which colored light is then output from the light pump 1308 into the casing 1314 of the structure 1302 (e.g., into the distal end 1220). The light pump 1308 can be capable of flashlamp pumping, arc lamp pumping, laser pumping, etc., and other commonly-known methods for generating and directing light at or into a light conductive material of the casing 1314.

Once injected into the casing 1314, emitted light 1306 of a specific color indicates to the viewer the shot points mapped to that color. For example, a red colored flashing light emanating from the casing 1314 can indicate to the viewer that a three-point shot has been attempted to the goal. Alternatively, as an example, a flashing blue light can be designed to indicate to the viewer that a four-point shot is being attempted at the goal. Other color mappings can be employed for other types of point shots, such as a two-point shot, a five-point shot, etc.

Figure 13C:
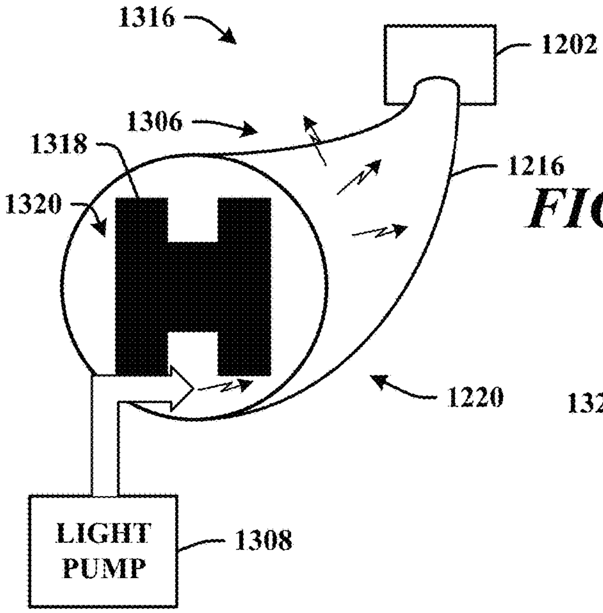

FIG. 13C depicts a third design 1316, for example, of the suspension structure 1216 as having a core material (e.g., a steel I-beam) 1318 as the primary structural strength and support material, and an outer coating or casing 1320 of light conductive material which surrounds some or all of the core material 1318.

The third design 1316 also depicts the light pump 1308 which functions (under hardware and/or software control) to generate colored light, which colored light is then output from the light pump 1308 into the casing 1320 of the structure 1216 (e.g., into the distal end 1220).

The light pump 1308 can be capable of flashlamp pumping, arc lamp pumping, laser pumping, etc., and other commonly-known methods for generating and directing light at or into a light conductive material of the casing 1314. Once injected into the casing 1320, emitted light 1306 of a specific color indicates to the viewer the shot points mapped to that color. For example, a red colored light (e.g., flashing) emanating from the casing 1320 can indicate to the viewer that a three-point shot has been attempted to the goal. Alternatively, as an example, a flashing blue light can be designed to indicate to the viewer that a four-point shot is being attempted at the goal. Other color mappings can be employed for other types of point shots, such as a two-point shot, a five-point shot, etc.

Figure 13D:
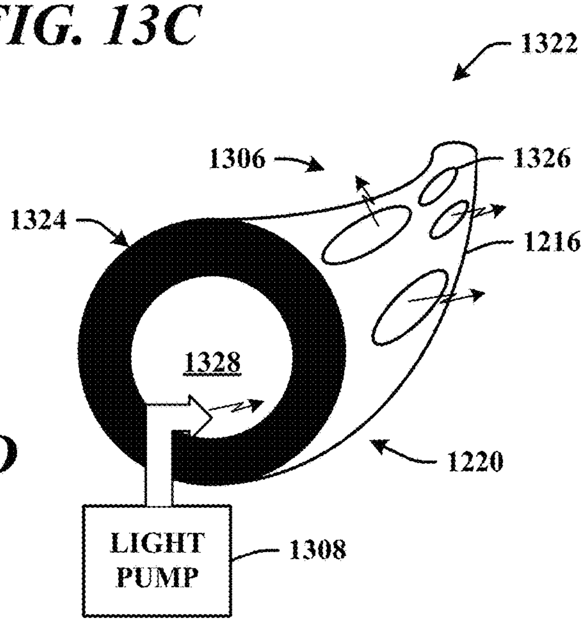

FIG. 13D depicts a fourth design 1322, for example, of the suspension structure 1216 where the strength material is implemented as a pipe 1324 through which are drilled or formed numerous holes 1326 for viewing light 1306 emanating therefrom by way of the light generated from the light pump 1308 and injected into a centrally located light transmissive core 1328.

The fourth design 1322 also depicts the light pump 1308 which functions (under hardware and/or software control) to generate colored light, which colored light is then output from the light pump 1308 into the core 1328 of the suspension structure 1216 (e.g., into the distal end 1220).

The light pump 1308 can be capable of different light-generation technologies such as flashlamp pumping, arc lamp pumping, laser pumping, etc., and other commonly-known methods for generating and directing light at or into a light conductive material of the core 1328. Once injected into the core 1328, emitted light 1306 of a specific color, emitted through the holes 1326 indicates to the viewer the shot points mapped to that color. For example, a red colored flashing light emanating from the core 1328 can indicate to the viewer that a three-point shot has been attempted to the goal.

Alternatively, as an example, a flashing blue light can be designed to indicate to the viewer that a four-point shot is being attempted at the goal. Other color mappings can be employed for other types of point shots, such as a two-point shot, a five-point shot, etc.

It is to be appreciated that any cabling needed or utilized at the backboard assembly 1202 can be routed through the suspension structure 1216 where a cavity is provided, and/or on the surface of the suspension structure 1216 (a "surface run").

Figure 14:
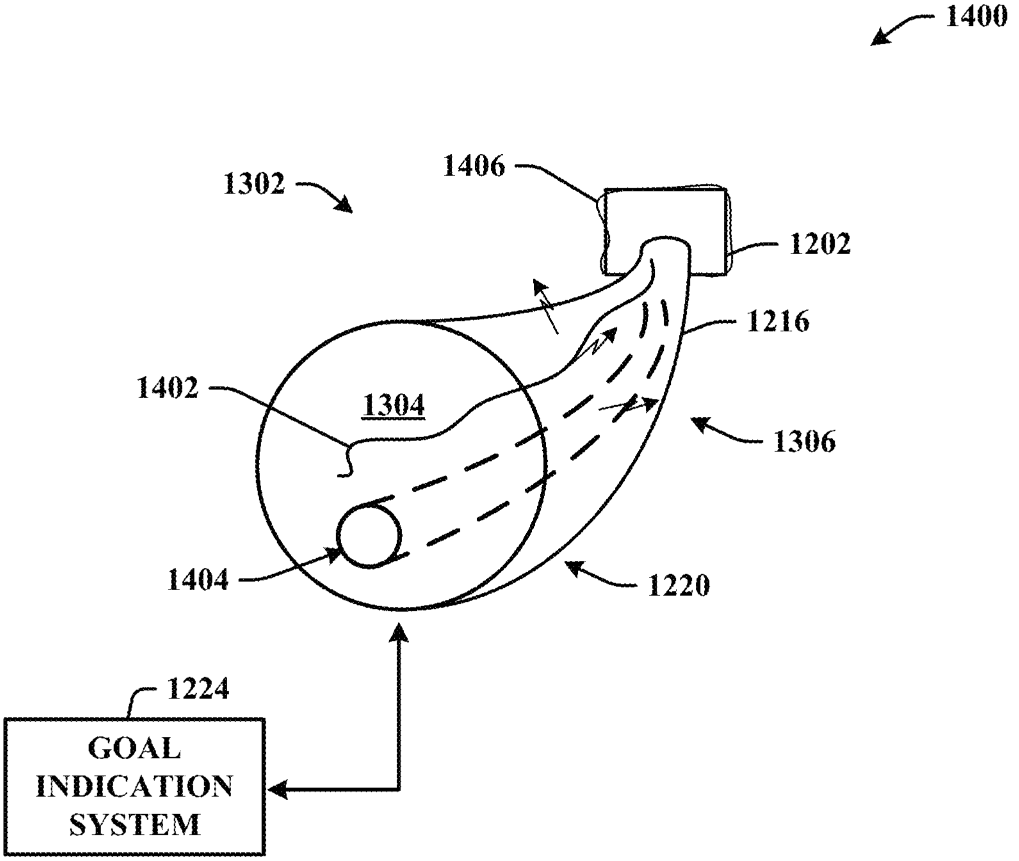
FIG. 14 illustrates an alternative embodiment where light emitting elements can be constructed into the of composition or placed into a cavity of the composition, of the suspension structure.

FIG. 14 illustrates an alternative embodiment 1400 where light emitting elements 1402 (e.g., LEDs) can be constructed into the of composition 1304 or placed into a cavity 1404 of the composition 1304, of the suspension structure 1216. The elements 1402 can then be controlled by the goal indication system 1224 to emit the desired color of light 1306 for the shot points attempted. The goal indication system 1224 includes at least the hardware (wired or wireless) connectivity to control and connect power to the control the elements 1402 to change colors and to power on/off, as desired.

The backboard assembly 1202 can also be implemented with light emitting elements 1406 that operate synchronously with the elements 1402, or asynchronously from the elements 1402 to show a color indicative of the attempted shot points. The elements can be affixed to the perimeter of the backboard 1206, and/or constructed into the edge of the backboard 1206, and controlled as described herein based on the attempted shot points. The elements 1406 can alternatively be strung around the surface of the suspension structure 1216 and controlled as described herein.

Figure 15:
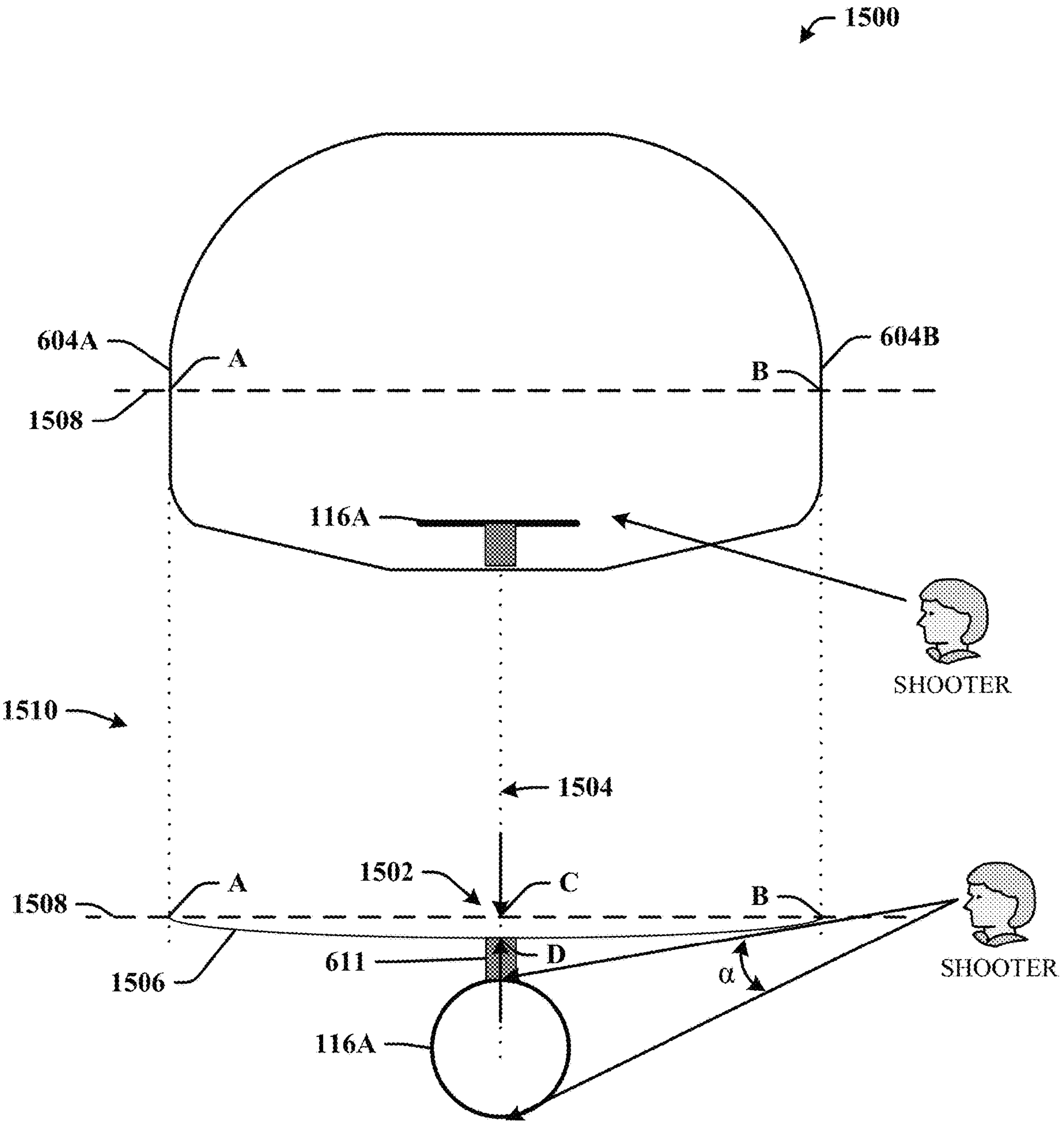
FIG. 15 illustrates an alternative embodiment of a backboard which comprises a curvature for increased player viewing from the corner shots, which are behind the plane of the basketball backboard.

FIG. 15 illustrates an alternative embodiment of a backboard 1500 which comprises a curvature 1502 for increased player viewing from the corner shots, which are behind the plane of the basketball backboard. The amount of curvature 1502 can be measured on a centerline 1504 of the goal bracket 611 and the goal 116A, and as the distance between the front surface 1506 at points C and D, as defined by a line 1508 which extends between opposing points (A and B) on opposing vertical sides (portions 604A and 604B) and the centerline 1504.

In typical planar backboard utilizations, the player ("Shooter") shooting from the corner does so with a partially-blocked view of the goal 116A (the "hoop") due to the lower corners of the substantially rectangular backboard typically in use.

A top-down view 1510 of the backboard 1500 shows an amount of curvature C-D. The greater the distance between points C-D translates into a correspondingly greater amount of curvature on the backboard surface 1506 relative to points A and B and point D. The view of the goal 116A provided to the shooter when attempting a "corner shot" improves based on the amount of curvature employed, since the increasing amount of curvature increases the view angle $\alpha$ (alpha) for portion of the goal 116A from the shooter's perspective from the location- and shot-restricted corner shot area(s). Thus, backboard curvature 1502, in this implementation, can be said to be applied in the horizontal plane (but not the vertical plane) of the backboard 1500.

It is also to be noted that while the curvature 1502 enables a better view of the goal 116A when performing the corner shot, the goal bracket 611 can be made extendable, and extended to a specific distance from the front surface 1506 of the backboard 1500, which increases the view of the goal 116A, as well, for the corner shooter. Accordingly, a combination of bracket adjustment and amount of backboard curvature 1502 can further enhance basketball gameplay by enabling high-point shots from the corners.

It is to be understood that any number and combination of hi-tech materials can be employed to provide strength without significant mass or weight, such as graphene, for example, and high tensile strength plastics (e.g., PVC (polyvinyl chloride), PAI (polyamide-imide), PEI (polyetherimide), PEEK (polyetheretherketone), PPS (polyphenylene sulfide), nylon, LCP (liquid crystal polymer), POM (polyoxymethylene), etc.).

It can be the case that since the curvature of the backboard surface 1506 can change the carom angle of the ball flight off the surface 1506 and into the goal 116A, players simply need to make small corrections for such shots for successful goals. Alternatively, the backboard shot cues (704A, 704B, and 704C) of FIG. 7 can be provided on the backboard surface to assist in the more successful scoring of shots made from the court. Such backboard curvature finds applicability to both public and private basketball goal implementations.

In order to implement enhanced basketball gameplay features, computer control systems and sensor systems can be employed. Of particular interest is readily computing shooter location during gameplay. This can be accomplished using various techniques. In the most basic implementation, a technician viewing the gameplay can be tasked with quickly identifying the shooter location and entering such location data for computer processing and output of backboard indications.

For example, in one manual implementation, the basketball court can be partitioned virtually into sectors of L×W, where L and W are in feet, and can be equal or different. Thus, when the ball carrier enters a Sector 7 location and appears to be setting up for the shot, the technician can quickly press a Sector 7 button, which button press is then processed to present the backboard cues for the given Sector 7 and enable the goal indication system to present light indicators to the viewers.

In another example implementation, the physical location of the ball carrier on the court surface can be automatically computed in real-time such that backboard indicators (e.g., colored lights) and shot cues (e.g., shot cues 704A, 704B, and 704C of FIG. 7) will be presented and automatically updated as the ball carrier moves across the court sectors. Once the shot is attempted, the goal indicators (e.g., cues, light colors, etc.) are manipulated according to programmed instructions to present the light color that maps to the shot points.

In one technique for computer-controlled location sensing and shot sensing, the basketball can employ an active or passive sensor (e.g., RFID-radio frequency identification). When the passive sensor is energized by a compatible RFID reader, the ball location is sensed and computer instructions processed to compute the ball location relative to the court location. In this way, the shot points can be readily computed and associated backboard indicators made ready for presentation. The active sensor is continually powered and transmits signals which can then be readily received and detected by the reader and processed accordingly.

In such system techniques, there is a need to prevent "false positives" where the computing system executes to produce the output based on the sensed location, when the output is not required. In other words, the ball carrier is interpreted by the computing and sensing systems to have attempted a shot, when in fact, the shooter has not attempted a shot.

A more enhanced system implementation can employ image recognition technology, alone or in combination with location sensing technology. Thus, player features can be image recognized and used to identify the player as the ball carrier, and perhaps the shooter. Location processing can readily compute the shooter's location on the basketball court.

Such technology can further employ computing where the ball carrier is likely to dribble the ball, pass the ball, take a shot, who to pass the ball, etc. Thus, the computing system can more quickly compute the more probable outcome based on game time, the skills of the ball carrier, position assigned to the ball carrier, current game score, location on the court, shooting percentage, shooter statistics at a given point in time, and so on.

Innovative scoring techniques can be employed as well to retain and enhance viewer excitement. The stoppage of play by fouling an opposing player is one reason that basketball is inferior to other major sports. An example of this is the "hack a Shaq" move, where the worst free-throw shooter is intentionally fouled, and in another tactic, the last two minutes of a game would take an inordinately long time. However, the NBA eventually created a rule preventing this from happening during the last two minutes of a game.

One analysis of this problem indicates that the "magic number" in professional basketball is twenty-four (24). For example, the average number of possessions a team has each quarter is twenty-four. Thus, if a team can score more than twenty-four points each quarter, for three quarters, and hold the opposing team to less than twenty-four points per quarter for three quarters, then that team has a much greater chance of not losing the game, if the clock is used appropriately.

For example, sometimes late in a game, the team with the leading score may fail to shoot before the twenty-four second shot clock expires. This may not necessarily be a detriment and may be as good as scoring one point, since it denies the opposing team the ball for a long time thereby forcing the opposing team to enter a "panic mode" and attempt to score quickly. The panic mode play can induce more difficult or desperate shots than otherwise would normally be attempted.

Consider, for example, Team A is leading the score when entering the last quarter by eight (8) points. If Team A can score twenty-four points in the fourth quarter, which a professional team should be able to score, then the opposing team, Team B, has to score thirty-two (32) points to tie. With the clock acting as an ally of teams that are leading late in a game, in any sport that has a clock, a good defensive team will utilize the clock and drag out play to win. This behavior can be considered as having an additional player during this critical time.

For conventional play, it seems preferable to "milk the clock" and only attempt high percentage shots. This frustrates the opposing team and forces the opposing team to make desperate fouls to risk a free throw or two, and regain ball possession. It then becomes imperative to make at least seventy-five percent (75%) of the free-throws, since the clock has stopped.

One innovative tactic (rule) for a tie game, is to make the fourth quarter a race to see which team can score twenty-four points first. For example, if Team A is leading (eighty (80) to seventy-two (72) at the start of the fourth quarter, the "magic number" for victory would be one-hundred four (104), or eighty plus twenty-four. Thus, the first team to score one-hundred four points is the winner.

If coaches are worried about the game being decided by a free-throw, this can be resolved. If the score, in the above example, is tied at one-hundred three (103) and a player is shooting free-throws, rather than having two free-throws to score one point to win the game, a rule can be defined that in a tie situation and a player at the foul line, a team will have to win by two points. Thus, the foul shooter needs make both free-throws to win.

Figure 16:
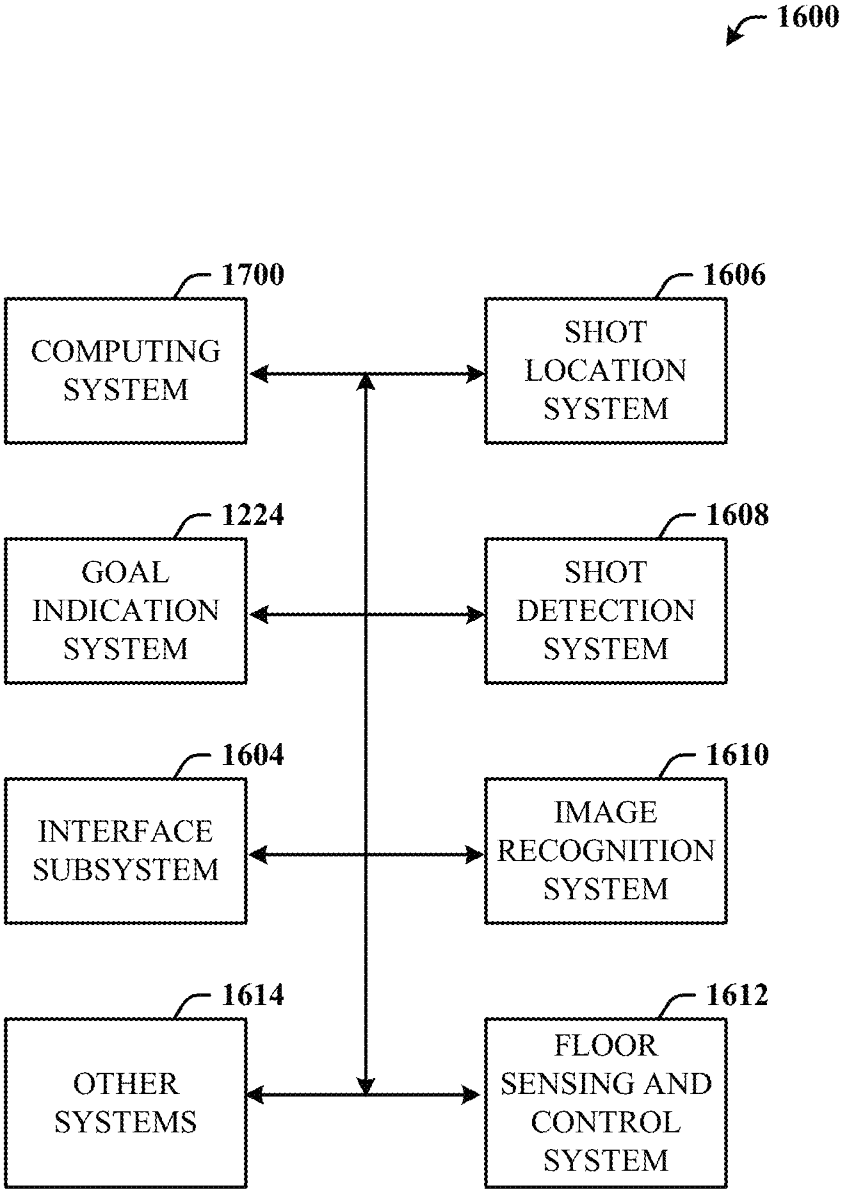
FIG. 16 illustrates a hardware and software system that can be employed to enable features of at least the disclosed backboard goal system, goal indication system, suspension structure, and floor technology.

FIG. 16 illustrates a hardware and software system 1600 (collectively, an instrumentation system) that can be employed to enable features of at least the disclosed backboard goal system, goal indication system, suspension structure, and floor technology. In support thereof, the system 1600 includes, but is not limited to, a computing system 1700, the goal indication system 1224, an interface system 1604, a shot location system 1606, a shot detection system 1608, an image recognition system 1610, a floor sensing and control system 1612, and other systems 1614. The other systems 1614 can include the latest technologies appended for specific purposes to the hardware and software system 1600, such as 4G and 5G communications for such capable devices.

In an enhanced embodiment of the disclosed basketball architecture, a fully intuitive computing system(s) with artificial intelligence (AI) can be employed in a completely functioning system all unto itself. Thus, the floor, backboard, gameplay, rules, fouls, shots, etc., are sensed and controlled for a complete basketball entertainment system. In other words, the system can become intuitive to the rules and spirit of the game.

For example, the goal indication system 1224 has been described in detail herein for executing color output for the suspension structure, backboard, and other media output (e.g., audio, video, music, beeps, horns, cheers, other sounds, etc.) based on player activities on the court.

The interface system 1604 comprises all type of data and signal communications employed, such as wired and/or wireless communications between such systems, hardware components between the systems (e.g., wire), electronics to enable communications between the systems over wire and/or wirelessly (e.g., transceiver systems, etc.).

The shot location system 1606 operates to sense the location of the ball and player location on the court surface. As previously indicated, the floor can be partitioned into equally-sized partitions, or sets of different partition sizes to facilitate optimum shot location detection for the different shot points for the correspondingly different shot locations. For example, smaller partitions and greater number of the smaller partitions can be implemented for higher point shots, which are farther away from the goal. Whereas, larger partitions (and hence a smaller number of the partitions) can be employed for the lower valued shots which are closer to the goal.

Location technology such as LIDAR (light detection and ranging) uses a pulsed laser to measure a distance (e.g., variable) an object. LIDAR enables three-dimensional data associated with objects and surfaces. Another technology described above is RFID, which can use active and/or passive RFID sensors attached to objects to estimate location of those objects at points in time. Other types of distance sensing can be achieved using ultrasonics, infrared, and lasers, for example.

The shot detection system 1608 determines when a shot has been attempted. This system 1608 can use the same or similar systems described for use by the shot location system 1606. The shot detection system 1608 includes the capability to compute when the ball reaches a predetermined altitude (or height), which clearly indicates the ball is in flight as a shot. One or more of the above detection techniques can be used to compute a confirmed shot and the direction of flight of the attempted shot. The shot detection system 1608 and shot location system 1606 operate in concert to ultimately output data to the goal indication system 1224 to enable color lighting for the indications and when employed, cue enablement on the front of the backboard based at least on the shot location.

The image recognition system 1610 can perform image recognition of players for identification, shot location, shot attempts, and so on, for any desired purpose to enhance the game for the viewers. LIDAR can be employed to track the basketball, and player movements, for example, and hence, provide data which can be processed to determine when a valid shot has been attempted, blocked, passed, etc.

The floor sensing and control system 1612 can perform overlap functions, for example, for confirmation of shot attempts from specific shot locations. That is, in order to provide a reliable system for shot location and shot detection, the court floor can have embedded sensors and/or non-contact sensors (e.g., sonic, laser, etc.) that output data for processing to assist in confirming ball location, player location, shot location, and shot attempts.

It is to be understood that other systems 1614 can be employed to sense and process data and signals to provide an optimum system with minimal or no errors that could decrease the viewer experience.

Figure 17:
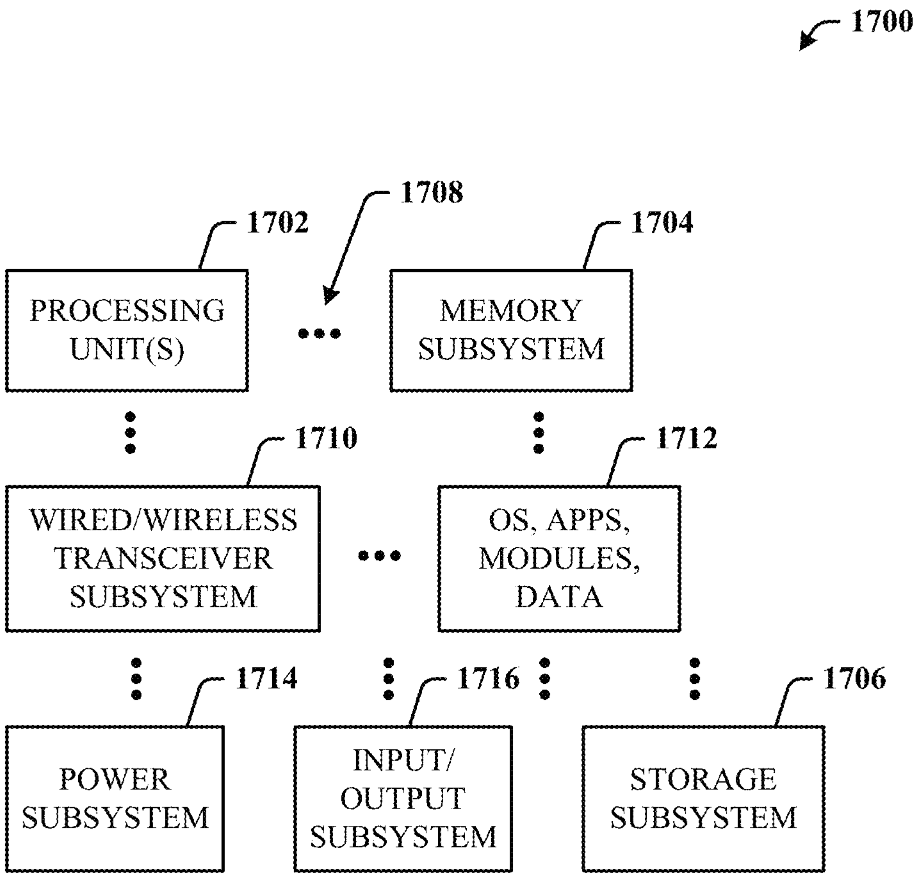
FIG. 17 illustrates a block diagram of a computing system (and shown in FIG. 16) that can be employed for interfacing to and controlling systems in accordance with the disclosed basketball architecture.

Referring now to FIG. 17, there is illustrated a block diagram of a computing system 1700 (and shown in FIG. 16) that can be employed for interfacing to and controlling systems in accordance with the disclosed basketball architecture.

In order to provide additional context for various aspects thereof, FIG. 17 and the following description are intended to provide a brief, general description of a robust and suitable control system 1700 in which the various aspects can be implemented. While the description above is in the general context of computer-executable instructions that can run on one or more computing systems, those skilled in the art will recognize that a novel implementation also can be realized in combination with other program modules and/or as a combination of hardware and software.

The control system 1700 for implementing various aspects includes (micro)processing unit(s) 1702 (also referred to as microprocessor(s) and processor(s)), a memory subsystem 1704 comprising a computer-readable storage medium such as a system memory and a storage subsystem 1706 (computer readable storage medium/media also include magnetic disks, optical disks, solid state drives, external memory systems, and flash memory drives), and a bus system 1708 (denoted using ellipsis . . . ). The processing unit(s) 1702 can be any of various commercially available microprocessors such as single-processor, multi-processor, single-core units and multi-core units of processing and/or storage circuits.

The control system 1700 can be employed in support of cloud access and computing services. Cloud computing services, include, but are not limited to, infrastructure as a service, platform as a service, software as a service, storage as a service, desktop as a service, data as a service, security as a service, and APIs (application program interfaces) as a service, for example.

The memory subsystem 1704 can include computer-readable storage (physical storage) medium such as a volatile (VOL) memory (e.g., random access memory (RAM), static RAM for caching, etc.) and a non-volatile memory (NON-VOL) (e.g., ROM, EPROM, EEPROM, etc.), for example. A basic input/output system (BIOS) can be stored in the non-volatile memory, and includes the basic routines that facilitate the communication of data and signals between components within the control system 900, such as during startup.

The bus system 1708 provides an interface for system components including, but not limited to, the memory subsystem 1704 to the processing unit(s) 1702, and any wire/metal track interconnectivity between all modules such as a wired/wireless transceiver subsystem 1710, operating system (OS) applications (Apps), software modules, and data components 1712, a power subsystem 1714 that provides power to all subsystems and components, and an I/O (input/output) subsystem 1716 which includes all sensors (e.g., microphone, temperature, humidity, geolocation, level, pressure, and so on) and the electronics to operate and return data therefrom. The bus system 1708 can be any of several types of commercially available bus architectures.

The control system 1700 further includes machine readable storage subsystem(s) 1706 (and storage interface(s)) for interfacing the storage subsystem(s) 1706 to the bus system 1708, and other desired components and circuits. The storage subsystem(s) 1706 (physical storage media) can include any one or more of commonly known storage and storage interface technologies.

Although shown as separate blocks, one or more application programs, program data, OS, and other software modules of block 1712 can be stored in the memory subsystem 1704, a machine readable and removable memory subsystem (e.g., flash drive form factor technology), and/or the storage subsystem(s) 1706 (e.g., optical, magnetic, solid state). The operating system, one or more application programs, other program modules, and/or program data can include items and components of the control system 1700 of FIG. 17, for example.

Generally, programs include routines, methods, data structures, other software components, etc., that perform particular tasks, functions, or implement particular abstract data types. All or portions of the operating system, applications, modules, and/or data in block 1712 can also be cached in memory such as volatile memory and/or non-volatile memory of the memory subsystem 1704, for example.

The storage subsystem 1706 and memory subsystem 1704 serve as computer readable media for volatile and non-volatile storage of data, data structures, computer-executable instructions, and so on. Such instructions, when executed by a computer or other machine, can cause the computer or other machine to perform one or more acts of a method.

Computer-executable instructions comprise, for example, instructions and data which cause a general-purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed, and include volatile and non-volatile internal and/or external media that is removable and/or non-removable. The various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods and processes of the disclosed architecture.

A user can interact with the programs and data using external user input devices as part of the I/O subsystem 1716 such as a keyboard and a mouse, as well as by voice commands facilitated by speech and image recognition. Other external user input devices (sensors) can include a microphone, an IR (infrared) remote control, a joystick, a game pad, camera recognition systems (e.g., gesture recognition, etc.), a stylus pen, touch screen, gesture systems (e.g., eye movement, body poses such as relate to hand(s), finger (s), arm(s), head, etc.), and the like. The user can interact with the programs and data using user input devices such a touchpad, microphone, keyboard, etc., where desired, for example.

These and other input devices are connected to the processing unit(s) 1702 through input/output (I/O) subsystem 1716 via the bus system 1708, but can be connected by other interfaces such as a parallel port, IEEE 1394 serial port, a game port, a USB port, an IR interface, short-range wireless (e.g., Bluetooth) and other personal area network (PAN) technologies, etc. The I/O subsystem 1716 also facilitates the use of output peripherals such as printers, audio devices, camera devices, and so on, such as a sound card and/or onboard audio processing capability.

The I/O subsystem 1716 can comprise one or more graphics interface(s) (also commonly referred to as a graphics processing unit (GPU)) provide graphics and video signals on a display and external display(s) (e.g., LCD, plasma) and/or onboard displays (e.g., for portable computer). The graphics interface(s) can also be manufactured as part of a system board.

The disclosed computing system 1700 can operate in a networked environment (e.g., IP-based) using logical connections via the wired/wireless transceiver communications subsystem 1710 to one or more networks and/or other devices or computers. The other computers can include workstations, servers, routers, personal computers, microprocessor-based entertainment appliances, peer devices or other common network nodes, and typically include many or all of the elements described relative to the computing system 1700. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, mesh networks and mesh nodes, all of which may connect to a global communications network such as the Internet 1704.

When used in a networking environment the computing system can connect to the network via a wired/wireless transceiver communication subsystem 1710 (e.g., a network interface adapter, onboard transceiver subsystem, etc.) to communicate with wired/wireless networks, wired/wireless printers, wired/wireless input devices, and so on.

In a networked environment, programs and data relative to the computing system can be stored in the remote memory/storage device, as is associated with a distributed system. It will be appreciated that the network connections shown are exemplary and other means of establishing a communications link between the computers can be used.

The computing system 1700 can be made operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), telephones, cell phones, smart phones and smart devices (e.g., smart TVs), for example. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

It is appreciated, however, that the some or all aspects of the disclosed methods and/or systems can be implemented in more compact technologies such as a SoC (system-on-a-chip), where analog, digital, mixed signals, and other functions are fabricated on a single chip substrate.

Put another way, disclosed and described is a basketball goal system, the system comprising a backboard assembly positioned above a basketball game playing surface, the backboard assembly, comprising a backboard having a back surface and a front surface, a suspension frame affixed to the back surface, and a goal affixed to the front surface. The basketball goal system can further comprise a suspension structure connected on a proximal end to the suspension frame of the backboard and secured on a distal end to a supporting foundation, the suspension structure suspends the backboard assembly above the playing surface, which can be at a basketball arena. The basketball goal system can further comprise a goal indication system which interfaces to the suspension structure to cause an indication to be presented via the suspension system, the indication relates to the shot points associated with a shot attempted at the goal.

The suspension structure can provide primary strength in supporting above the playing surface, at least loading of the backboard assembly, gameplay interactions with the backboard assembly, and peripheral systems proximate the backboard assembly and above the playing surface. The suspension structure can further comprise a light transmissive property where, at least one of light impinged on the suspension structure or light caused to be generated within the suspension structure, causes the suspension structure to emit a color indicative of the points associated with the shot attempted at the goal.

The suspension structure can be at least one of, a goosenecked structure affixed at the distal end to a floor surface and which is controlled to change color based on the shot points associated with the shot attempted at the goal, or an overhead structure which suspends the backboard assembly from above and is controlled to change color based on the points associated with the shot attempted toward the goal.

The suspension structure can be encased in a light transmissive material which can be controlled by the goal indication system to transmit a color, which color indicates the shot points of a shot attempted at the goal. The suspension structure can be constructed entirely of a light transmissive material which can be caused to transmit a color by the goal indication system, which color indicates the shot points of a shot attempted at the goal.

The architecture can further comprise at least one display system mounted proximate the back surface of the backboard and at the proximal end of the suspension structure, the at least one display system presents basketball gameplay actions for viewing by viewers in attendance at the basketball arena. At least one of the suspension structure(s), the goal, the suspension frame, or the backboard, can comprise graphene as a strength material. The suspension structure can comprise light emitting electronics controlled to emit light of a specific color which corresponds to the shot attempted at the goal. The backboard can comprise elements that are controlled to emit light of a specific color which corresponds to the shot attempted at the goal.

The goal indication system further interfaces to the backboard to cause presentation of a cue on the front surface of the backboard, the cue of a color related to shot points associated with the shot attempted at the goal. The cue indicates where the attempted shot should impact the backboard for a goal based on the location from where the shot is attempted.

The backboard goal system can be a standalone system designed for at least one of personal use at a private venue or public use at an outdoor public venue. The backboard can be of a fan-based design of planar rectangular dimensions having opposing upper corners on a top horizontal side and opposing lower corners on a bottom horizontal side, the opposing lower corners proximate the goal and upwardly-angled to respective vertical sides, and opposing upper corners above the goal and arcuate from the vertical sides to the top horizontal side.

In another implementation, a basketball goal system can be provided comprising a backboard assembly positioned above a basketball game playing surface, the backboard assembly further comprising a backboard, a suspension frame affixed to a back surface of the backboard, a goal affixed to a front surface of the backboard.

The basketball goal system can further comprises a suspension structure connected on one end to the suspension frame of the backboard, and secured on a distal end to a supporting structure for suspending the backboard assembly above the playing surface, the suspension structure further comprises a light transmissive property for emitting light; and further comprise a goal indication system which interfaces to the suspension structure to cause the suspension structure to emit a color of light which relates to shot points associated with a shot attempted at the goal. The color of light is emitted from the entire suspension structure.

The suspension structure can be at least one of, encased in a light transmissive material which can be controlled by the goal indication system to emit the color of light or made entirely of a light transmissive material which can be controlled by the goal indication system to emit the color of light. The suspension structure can comprise light emitting elements controlled by the goal indication system to emit the color of light which corresponds to the shot points attempted by the shot at the goal. The backboard can comprise light emitting elements controlled by the goal indication system to emit light of a specific color which corresponds to the shot attempted at the goal.

The goal indication system can further interface to the backboard to cause presentation of a cue on a front surface of the backboard, the cue of a color corresponding to shot points associated with the shot attempted at the goal, the cue indicates where on the front surface of the backboard the attempted shot should impact for a goal based on a location from where the shot is attempted. The backboard goal system can also be a standalone system designed for at least one of personal use at a private venue or public use at an outdoor public venue.

In yet another implementation, a basketball goal system can be provided where the system comprises a backboard assembly, a suspension structure, a goal indication system, and a display system.

The backboard assembly can be positioned above a basketball game playing surface, the backboard assembly further comprising a backboard, a suspension frame affixed to a back surface of the backboard, a goal affixed to a front surface of the backboard. The suspension structure can be connected on one end to the suspension frame of the backboard, and secured on a distal end to a supporting structure for suspending the backboard assembly above the playing surface, the suspension structure further comprises a light transmissive property for emitting light.

The goal indication system can interface to the suspension structure to cause the suspension structure to emit a color of light which relates to shot points associated with a shot attempted at the goal, the goal indication system further interfaces to the backboard to cause presentation of a cue on a front surface of the backboard, the cue of a color corresponding to shot points associated with the shot attempted at the goal.

The display system can be mounted proximate the back surface of the backboard and at the proximal end of the suspension structure, the display system presents basketball gameplay actions for viewing by viewers in attendance at the basketball game.

The cue indicates where on the front surface of the backboard the attempted shot should impact for a goal based on a location from where the shot is attempted. The backboard comprises light emitting elements around a perimeter, which elements are controlled by the goal indication system to emit light of a specific color which corresponds to the shot attempted at the goal, the goal indication system controls the backboard elements and light emission of the suspension frame in synchronism or out of synchronism. The cue indicates where on the front surface of the backboard the attempted shot should impact for a goal based on a location from where the shot is attempted.

Basketball Architecture—Instrumentation, Court Structure, and Rules for Electronic Game (eGAME) and Terrestrial Venues The disclosed Basketball Architecture finds applicability and implementations as electronic- and/or software-based games (virtual "egames") in computing devices such as smart phones, tablets, portable and desktop computers, and servers, for example, all devices and systems capable of executing software algorithms, programs, and applications. The Basketball Architecture also finds egame implementations in standalone computing systems such as kiosks, and game centers typically provide standalone and single-user interaction gameplay systems, that can, for example, receive coins or other forms of credit/money/tickets, etc., to play the egame on the machine. In such an implementation, the single user can "play against the machine", where the software is executed by the machine software algorithms and electronics to outplay ("beat") the single user.

The disclosed Basketball Architecture also finds terrestrial (physical) applicability and implementations where humans and teams compete on a physical basketball court suitable to enable and employ data acquisition and control of the associated instrumentation to effect stadium gameplay and rules enforcement as described herein.

One exemplary basic outline of the egame and complementary terrestrial game is now disclosed. Court dimensions can simulate a terrestrial court of any dimensions; however, court dimensions commonly used in educational institutions and professional sports can be used (e.g., 100-foot Length× 56-foot Width, but with court demarcations and measurements as illustrated in FIG. 1). The basket (hoop—goal 116A) can be extended four (4) inches toward center court (or an appropriate distance to be determined) such as associated with the capabilities of hoop bracket 611 to accommodate four-point shots from sideline corner areas 160A and 162A (in FIG. 1). Increasing the distance between the hoop center 130A and the front surface of the backboard 602 exposes more of the goal 504 to the corner shooter of a 4-point shot.

Backboards (e.g., backboard 150A) can be a fan-shaped design to accommodate 4-point shots from corner areas 160A and 162A. Additionally, or alternatively, the front surface of the backboards (e.g., backboards 500 and 600) can be flat from side-to-side and top-to-bottom. In yet another design the backboard 1500 can be employed having left and right surfaces (of the front surface) that are slightly curved with a curvature 1502 to enable the corner shooter to obtain a better view the goal 116A.

Backboard markings (suggested cues 704) can be illuminated as relate to position of the ball carrier, the shooter, etc., on the court. Area about and above the basket and at appropriate angles can have cues displayed such as dots, arrows, etc., that only illuminate for the location and/or identification of the ball carrier and/or shooter, and relative to the position of the player on the court and in reference to the basket. Suggested shot cues via the backboard can be restricted, for example, to be illuminated only for 4-pt shots in area(s) between center line and demarcation line 144A, for simplicity, to lessen complexity.

All court lines/demarcations have associated sensors to indicate if the shooter has executed an infraction such as being out of bounds, over a shot line, on or over a court line, etc. Other lines/demarcations can be instrumented with sensors as well to ensure that activities associated relative to those lines are valid, such as shot points are correctly scored only when the related shot line is not infracted (e.g., crossed, stepped on, etc.).

An additional mechanism for accurate/precise location of the shooter, ball handler, on the playing surface can be to instrument the basketball itself, such as to fabricate the basketball with a detectable composition such as graphene to rapidly detect and assess the location of the ball relative to the playing surface at all times. Players can be instrumented (e.g., clothing) with one or more sensors, such as for example, in the toe of the basketball shoes to quickly ascertain the location of the toe of a shoe (e.g., of the ball handler, the coach on the sideline, etc.) relative to a court line such as an out-of-bounds line, any shot line, for example. Sensors can also be implemented in the perimeter of the shoe soles to compute the precise location of the shoe on the play surface at any given moment.

This technique of clothing instrumentation can also be employed to detect close-contact player interactions during jump ball actions, shot-block actions, and so on, while enabling computer rendering of the action to determine if allowable or non-allowed player contact occurred, based on clothing sensor rendering in realtime (at or near the time in which the action occurred). For example, player uniforms can be instrumented with one or more sensors in the waist bands and shirt collars, for example, to obtain a more precise "picture" (set of data) of player orientation at any moment on the court. Moreover, each player can be required to wear a finger band that when detected by the instrumentation system can determine the exact location of that player's finger (hand) at any point in time while playing on the court.

Player uniforms can be embroidered with electronic lights, which can be controlled to emit a specific color of light based on location of the player on the court (e.g., in the team's own court versus the opposing team's court), inter-player actions, line infractions, and so on. In addition to lighting constructed into uniforms, the uniform system can also be enabled to emit one or more different audio sounds based on line infractions, player interactions (allowed or penalized), goals (made or missed), and so on.

Court lines/demarcations for 3-point shots and 4-point shots can have sensors implemented, which when activated/triggered, indicate on the backboard (e.g., LEDs, projection, etc.), the value of the shot attempted. In one implementation, a yellow-colored light can be used for 3-point shots and a green-colored light can be used for 4-point shots. The lights can be controlled to flash a predetermined amount of time (e.g., five seconds, ten second, etc.) in response to a successful shot. Separately or in combination therewith, a specific audio sound can be generated which indicates an unsuccessful shot (the sounds can be user and/or venue programmable). In other words, the sound can be a short audio clip played that is associated with the home team, and played in response to a successful score. Similarly, a different audio clip can be played in response to a missed shot.

Following are examples of unique aspects of the game. The game can be played with six (6) players per side and up to four (4) referees/officials per game. Penalty boxes ("the box") can be placed on the sidelines (outside the boundary line, as appropriate to the court design): one penalty box or set of penalty boxes for each team to accommodate a predetermined number of players, coach(es), referee(s) at one time. In other words, there can be a player penalty box and a coach penalty box for each team, and one or more referee penalty boxes (not associated with any team), one referee box for each referee of the game or one referee penalty box for all the referees. The team (player) penalty box can be located a specific distance from the team bench and the opponent bench.

Alternatively, a team's penalty box can be located out-of-sight from the corresponding team's bench, and optionally, out-of-sight of the opposing team and opposing team bench. In another implementation, or in combination with herein, all penalty boxes (e.g., team, coach, referee, etc.) can be viewed by all fans, but members in one penalty box cannot see the members of the other penalty boxes. Additionally, any more than two of a team's players of a single team in the penalty box at the same time can constitute a forfeiture for the offending team.

Example penalty assessments can be the following:

1. Break-away foul: a current professional rule is two free throw shots and loss of following possession. The disclosed innovative rules include adding a one-minute penalty in the box, since this action is considered a minimum foul/penalty. Moreover, break-away fouls can be dangerous to a player running full speed to the basket. Thus, the one-minute penalty is designed to reduce/discourage occurrence of the break-away foul.
2. Single technical foul: a current professional rule is a two-minute penalty, but in this implementation, the player serves two minutes in the box (a minor foul/penalty).
3. Double technical foul: a current professional rule is a five-minute penalty, but in this implementation, the player serves five minutes in the box (major foul/penalty).
4. A player committing two technical (single) fouls in a game incurs a five-minute major penalty, at the second occurrence, but will not be disqualified. As before, the time can be served "in the box".
5. A player committing a technical foul (single) after previously committing a double technical foul, or a player committing a double technical foul after previously committing a single technical foul, is disqualified from the game and cannot return to the game or be replaced in the game by another player.
6. A single flagrant foul is a single technical foul (a "2-minute minor"), and which can be served "in the box".
7. A second flagrant foul is 5-minute major penalty, and which can be served "in the box".
8. A player cannot return to the court until there is an official stoppage of play (e.g., timeout, foul shot, TV timeout, etc.). This innovative return-to-court policy can force a team to use a valuable timeout in order to return a player to the court and further disadvantage the team with the offending player.
9. Coaches can also be subjected to penalty box violations of similar lengths and disqualification as determined by the referee/official. A first attempt to coach while in the penalty box results in assessment of an additional two-minute penalty, which can be immediately imposed and served while the coach is currently in the box. The second attempt of penalty box coaching results in disqualification from the game.
10. Common fouls can result in free throw shots ("free throws"). Minor/major fouls result in one or more free throws and loss of possession.

Following are additional unique gameplay and rules aspects of the game, regarding the e-game (also referred to as the virtual game) and/or terrestrial game.

11. Game(s) consist of three (3) time periods and one (1) final UNtimed period.

Timed periods can be of any agreed upon length of time. The final period will not be played using the game clock. The final period play is simply a race to score the most points to a winning total before the opposing team.

12. The shot clock can remain at twenty-four (24) seconds or any agreed upon length of time.
13. The team leading/tied in score after three (3) periods will need to be the first to score twenty-four (24) points to win. For additional excitement and fan interest, teams tied after three periods can be required to win by two points over the opponent.
14. The team trailing after three (3) periods will need to score the total of their deficit plus twenty-four (24) points. For example, Team A has one-hundred (100) points after three periods and Team B has ninety-six

(96) points. It is now a race to be the first team to reach a score of one-hundred twenty-four (124) points to win.

15. Teams trailing by a large deficit after three periods will likely be motivated to take a greater number of higher point-valued shots to win, such as more three- and four-point shots. This rule adds to the fan excitement and "keeps them in their seats", and not "rushing for the exits". Moreover, the race to score a predetermined number of points to win will eliminate overtime in games, reduces player wear-and-tear (e.g., fatigue, etc.), and reduces possible injury to players.

Following are features associated with, and various applications of, virtual play (eGame) and terrestrial play. eGames can be played in various venues and in different ways. For example, electronic play can be performed with consoles, virtual reality glasses and headsets (e.g., gaming, etc.), avatars (an electronic image or virtual animation that can be manipulated by a computer user), learning-type neural networks (also, a "neural net", a multi-processor interconnection that suggests the types of connections and neurological activity in the human brain and can which learn by the process of trial and error), augmented reality (AR), artificial intelligence (AI), television monitors (at home or at the game stadium), and via any other future technologies. Various betting, prizes, and advertising opportunities can be incorporated, as well as pursuing charitable endeavors. Medically and/or physically disabled players can also play using avatars, AR, AI, or any other current and future virtual technologies.

Robots (also referred to as "bots") are software programs which can be programmed using computer algorithms that incorporate professional player characteristics/capabilities, retired or deceased, and can take into account the player's physical and mental abilities, as well as learned physical and mental stamina, proneness to injury, and any other characteristic(s)/attributes. Machine learning can be employed to analyze and learn player characteristics, strategies, physical and mental capabilities over time by the robot player virtual game for the and terrestrial (physical) game application.

Terrestrial game data of a professional player, team, etc., current or past, can be obtained from websites and other network-based data sources, and uploaded into the egame application for virtual play, for example. Accordingly, and single egame user/player can play against the professional, virtually, via the egame, based on the uploaded data. Thereafter, over time, the user/player can improve personally for virtual gameplay, and potentially physically and mentally on the physical basketball court. In other words, this basketball architecture can be utilized as a training program for improving the mental game and physical gameplay of any user.

The disclosed basketball architecture also provides the potential for league(s) formation and play for the egame and terrestrial (physical) application(s), as listed below.

1. Games can be played at any skill level
2. A Professional/Club League can be formed for one or both of the egame or terrestrial applications.
3. Terrestrial leagues can be formed with former professional/college and high school/street "ballers" (another name for a basketball player) or robots, in any combination of abilities.
4. Teams can have Owners/General Managers for both terrestrial and egame "fantasy" leagues.
5. Leagues can require an entry fee for teams to join (for both applications of egame and physical forms of play).
6. Players can be paid by sharing net gate/concession receipts, with the winning team getting a larger share.
7. Leagues can also take a share of net receipts.
8. Leagues can also be modeled after the current Professional leagues.
9. eGame leagues can bid/trade for players and pay estates of former deceased players and/or retired players who choose to participate, based on their talents and value to the team, as machine learning "bot" players. Retired/deceased players can be represented by machine learning robots in terrestrial play. Retired and/or estates of deceased professional players can have an additional ability to secure a stream of income for their Name, Image and Likeness (NIL) after their physical abilities have diminished.
10. Virtual games and courts can be designed to be played in/under any environmental circumstances, including under water, in the air and atmosphere, outer space, and any other environment, for example, astronauts/space travelers may want to play a game while traveling outside of the ship.

Virtual games can also be played in 3D (three dimension) where the user can employ electronics (e.g., headsets, glasses, etc.) which enable the user to perceive user play (participation) on the court, in contrast to 2D play perceived when viewing the game on a computer display. The egame disclosed herein can be adapted to any multi-dimensional (e.g., 3D, 4D, etc.) computer implementations. The disclosed rules and technical implementations also enable allowed/retired players, coaches, referees, users, etc., to utilize their skills in the egame. Each set of skills can be obtained by requesting the user to enter information into a user profile, which profile is than executed during computer play to entertain the player interacting as a particular persona (player, coach, referee, fan, etc.). A skill set can also be determined by requesting the user to play some "test" games from which the skill set is updated as the user plays, to more accurately define user capabilities for a given persona (e.g., referee, coach, player, fan, etc.). This capability can track user play over time to ascertain improvements/weak spots in various aspects of the chosen skill set and persona.

The disclosed rules and technical implementations can also enable the user to insert any other person's likeness into the game. For example, the likeness of an actor or actress can be inserted as a coach, or referee, for example. Moreover, audio renderings of the inserted likeness can be processed and played back as the likeness moves around the court.

This particular technical/computing capability can be employed in a broader sense to movies and shows, in general. For example, the user can insert his/her likeness into a movie along with audio clips and/or processed audio voice signals such that user interactions in the movie can be accompanied by user voice clips, prefabricated and/or real-time insertion of user voice commentary/actor lines as the movie progresses. Similarly, the disclosed capability enables the user to replace a movie actor with another person likeness and voice intonations. For example, insert comedian Tim Conway in as Rhett Butler in the movie *Gone With the Wind.*

Described herein is a basketball game system, the system comprising: a court system having a play surface on which gameplay occurs, the play surface defined by a boundary line imposed on the play surface and within which gameplay occurs, the court system comprising: shot locations and shot areas, the shot locations defined by shot location lines on the play surface and the shot areas defined by shot area lines on the play surface; and a goal system comprising a respective backboard suspended above the play surface at each opposing farthest end of the play surface; and an instrumentation system of sensors which detects play activities within the boundary line of the court system and non-player activities outside the boundary line of the court system, the instrumentation system derives ball data sensed from ball location and ball heading as a player advances the ball toward a specific goal, the instrumentation system interfaces to the goal system to control features of the respective backboards during the gameplay, the instrumentation system executes rules of gameplay as part of the gameplay, the rules based in part on the ball data, player and non-player activities relative to the court system, the goal system, lines on the play surface, and player interactions relative to each other and the lines during the gameplay.

The basketball game system is employed as part of at least one of a virtual game or a physical game, the virtual game mimics at least one of a physical game previously played, a game currently being played, or a computing device generated game. The virtual game can be played using consoles, virtual reality glasses and headsets, electronic eyewear, avatars, neural nets, augmented reality, artificial intelligence, and television monitors. The virtual game enables a single user to compete as part of a first virtual team against another virtual team, one or both virtual teams generated by a computing device. The virtual game and the physical game comprise no more than three periods of agreed-upon timed gameplay. The gameplay includes at least six players and up to four referees who officiate the gameplay.

The system can further comprise a respective penalty box for each of two teams participating in the gameplay, each penalty box of a respective team located outside the boundary line, wherein each respective penalty box can accommodate at least one player who has created an infraction, the infraction time-based and after time expiration the one player can be released for further gameplay play or ejected from the game.

The system can further comprise a respective penalty box for each of two teams participating in the gameplay, wherein the rules of gameplay include directing at least one of an official, a coach, or a player to the penalty box due to one or more penalties. The goal system is controlled to display a shot cue on a corresponding backboard based on location and heading of a player currently in control of the basketball, the cue suggests where a ball of a shot made by the player should impact the corresponding backboard to score a goal.

The shot cue is displayed only when attempting a goal which scores at least a predetermined number of points. The shot cue is displayed only when attempting a goal from a specified location on the court. The shot cue is prevented from display on the backboard when the player attempting the shot causes an infraction while attempting the shot.

In another implementation, a basketball game system is disclosed where the system comprises: a court system having a play surface on which gameplay occurs, the play surface defined by a boundary line imposed on the play surface and within which gameplay occurs, the court system further comprising shot locations and shot areas, the shot locations defined by shot location lines on the play surface and the shot areas defined by shot area lines on the play surface, and a goal system comprising a respective backboard suspended above the play surface at each opposing farthest end of the play surface; an instrumentation system which comprises sensors to detect activities within the boundary line of the court system, which activities detected comprise ball data sensed from ball location and ball handler identification as the ball handler attempts to advance the ball toward a specific goal, line infraction data obtained relative to play surface lines, player infraction data related to player interactions during gameplay, and shot point data to score relative to a shot location line; and a respective penalty box for each team in which to serve a penalty assessed for an infraction, the respective penalty box located outside the boundary line and proximate to a corresponding team.

Each respective penalty box can accommodate at least one player assessed with an infraction, the infraction time-based such that after expiration of the associated infraction time, the at least one player can be released for further gameplay play or ejected from the game. The penalty assessed and to serve in the penalty box relates to a breakaway foul, a single technical foul, two single technical fouls, and a double technical foul. The penalty assessed for a single technical foul after a prior double technical foul or a double technical foul after a prior single technical foul, is ejection from the game.

A penalty assessed for a single flagrant foul is equivalent to a single technical foul, which is two minutes in the penalty box. A penalty assessed for a second flagrant foul is equivalent to a double technical foul, which is five minutes in the penalty box. A player serving time in the penalty box can return to play only when there is an official stoppage of play. A coach is subject to an assessed infraction by serving time in the penalty box. The coach is subject to an assessed additional infraction for coaching while in the penalty box, which time associated with the additional infraction is served while the coach is in the penalty box for a prior infraction. A referee is subject to an assessed infraction and penalized by serving time in the penalty box. The line infraction data is processed to determine when a shot attempt by a player is to be a specific point value.

The basketball game system is employed as part of at least one of a virtual game or a physical game, the virtual game mimics at least one of a physical game previously played, a game currently being played, or a computing device generated game, the virtual game played using at least one of consoles, virtual reality glasses and headsets, electronic eyewear, avatars, neural nets, augmented reality, artificial intelligence, or television monitors, the virtual game enables a single user to compete as part of a first virtual team against another virtual team, one or both virtual teams generated by a computing device.

In another implementation, a basketball game system is disclosed comprising, a court system having a play surface on which gameplay occurs, the play surface defined by a boundary line imposed on the play surface and within which gameplay occurs, the court system further comprising shot locations and shot areas, the shot locations defined by shot location lines on the play surface and the shot areas defined by shot area lines on the play surface, and a goal system comprising a respective backboard suspended above the play surface at each opposing farthest end of the play surface; an instrumentation system which comprises sensors to detect activities within the boundary line of the court system, which activities detected comprise ball data sensed from ball location and ball handler identification as the ball handler attempts to advance the ball toward a specific goal, line infraction data obtained relative to play surface lines, player infraction data related to player interactions during gameplay, and shot point data to score relative to a shot location line; and a respective penalty box for each team in which to serve a penalty assessed for an infraction, the respective penalty box located outside the boundary line and proximate to a corresponding team.

The instrumentation system further comprises a shot location system which detects on the play surface from where a shot attempt of a specific point amount has occurred, a shot detection system which detects on the play surface when a shot is taken, a goal indication system which detects which of several goal indications to activate based on a made or missed goal, an image recognition system which detects the player who attempted the shot, and a floor sensing system which detects location of the ball and players relative to lines on the play surface.

The image recognition system further detects activities on and off the court as relate to behavior of players and non-players, the players and non-players can be assessed penalties associated with the activities. The basketball game system is employed as part of at least one of a virtual game or a physical game, the virtual game mimics at least one of a physical game previously played, a game currently being played, or a computing device generated game, the virtual game played using at least one of consoles, virtual reality glasses and headsets, electronic eyewear, avatars, neural nets, augmented reality, artificial intelligence, or television monitors, the virtual game enables a single user to compete as part of a first virtual team against another virtual team, one or both virtual teams generated by a computing device.

Figure 18:
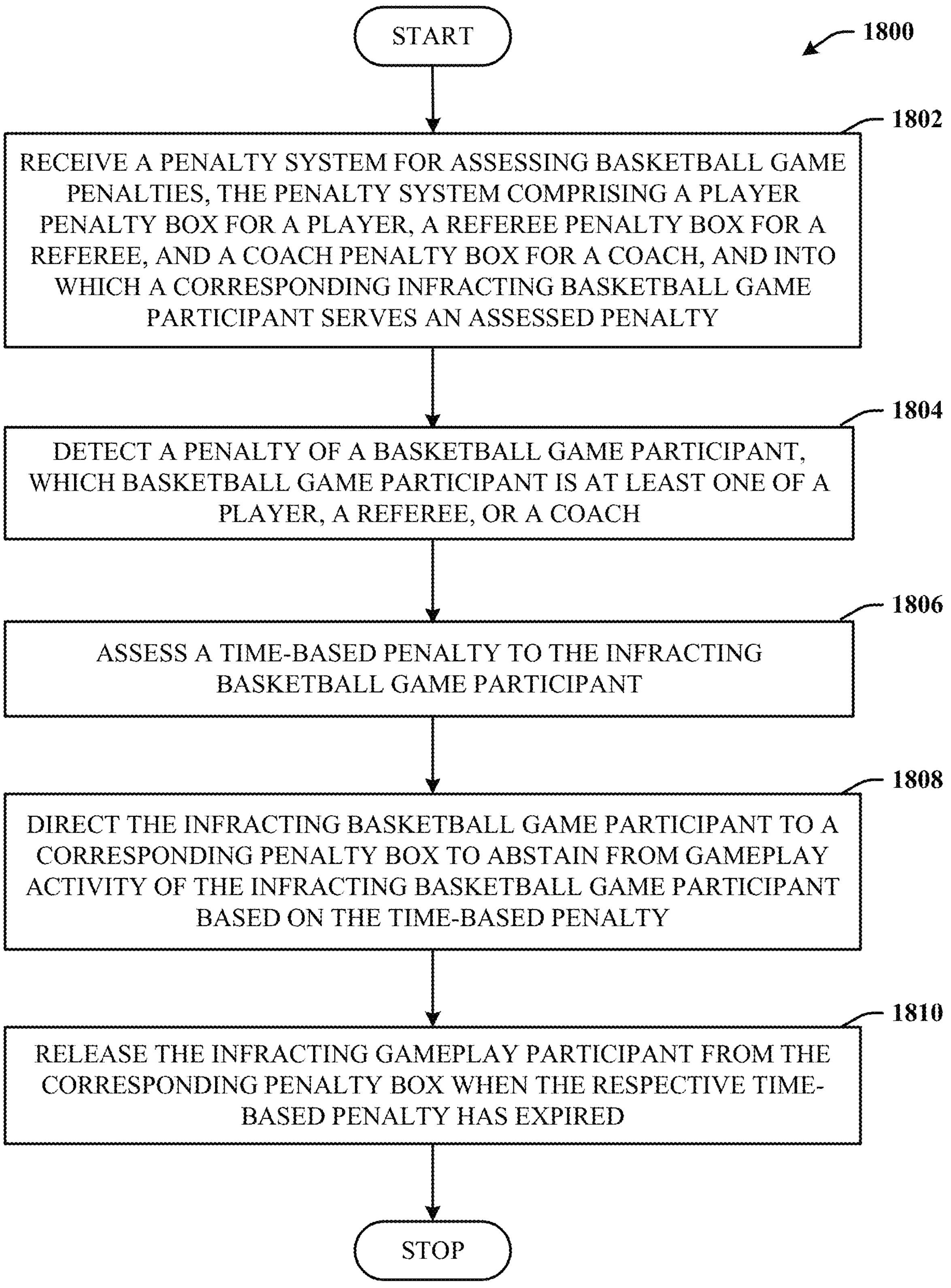
FIG. 18 illustrates a basketball penalty method for processing penalties on game participants such a players, coaches and referees in accordance with the disclosed basketball architecture.

FIG. 18 illustrates a basketball penalty method 1800 for processing penalties on game participants such a players, coaches and referees in accordance with the disclosed basketball architecture. At 1802, a penalty system is received for assessing basketball game penalties, the penalty system comprising a player penalty box for a player, a referee penalty box for a referee, and a coach penalty box for a coach, and into which a corresponding infracting basketball game participant serves an assessed penalty.

At 1804, a penalty is detected of a basketball game participant, which basketball game participant is at least one of a player, a referee, or a coach. At 1806, a time-based penalty is assessed to the infracting basketball game participant. At 1808, the infracting basketball game participant is directed to a corresponding penalty box to abstain from gameplay activity of the infracting basketball game participant based on the time-based penalty. At 1810, the infracting gameplay participant is released from the corresponding penalty box when the respective time-based penalty has expired.

The method 1800 can further comprise imposing time in the penalty box in addition to assessing free throw shots and loss of ball possession, imposing time in the penalty box instead of assessing free throw shots and loss of ball possession, and imposing time in the penalty box equivalent to time currently imposed for a foul in a professional basketball game.

The method 1800 can further comprise assessing an additional penalty to a coach in the coach penalty box, when the coach is attempting to coach from the coach penalty box, ejecting from the game, at least one of a player, a referee, or a coach, in response to excessive respective penalties, preventing return of an infracting player to the game until occurrence of an official stoppage of play, and applying the basketball game penalty method to a virtual basketball game and a physical basketball game.

Figure 19:
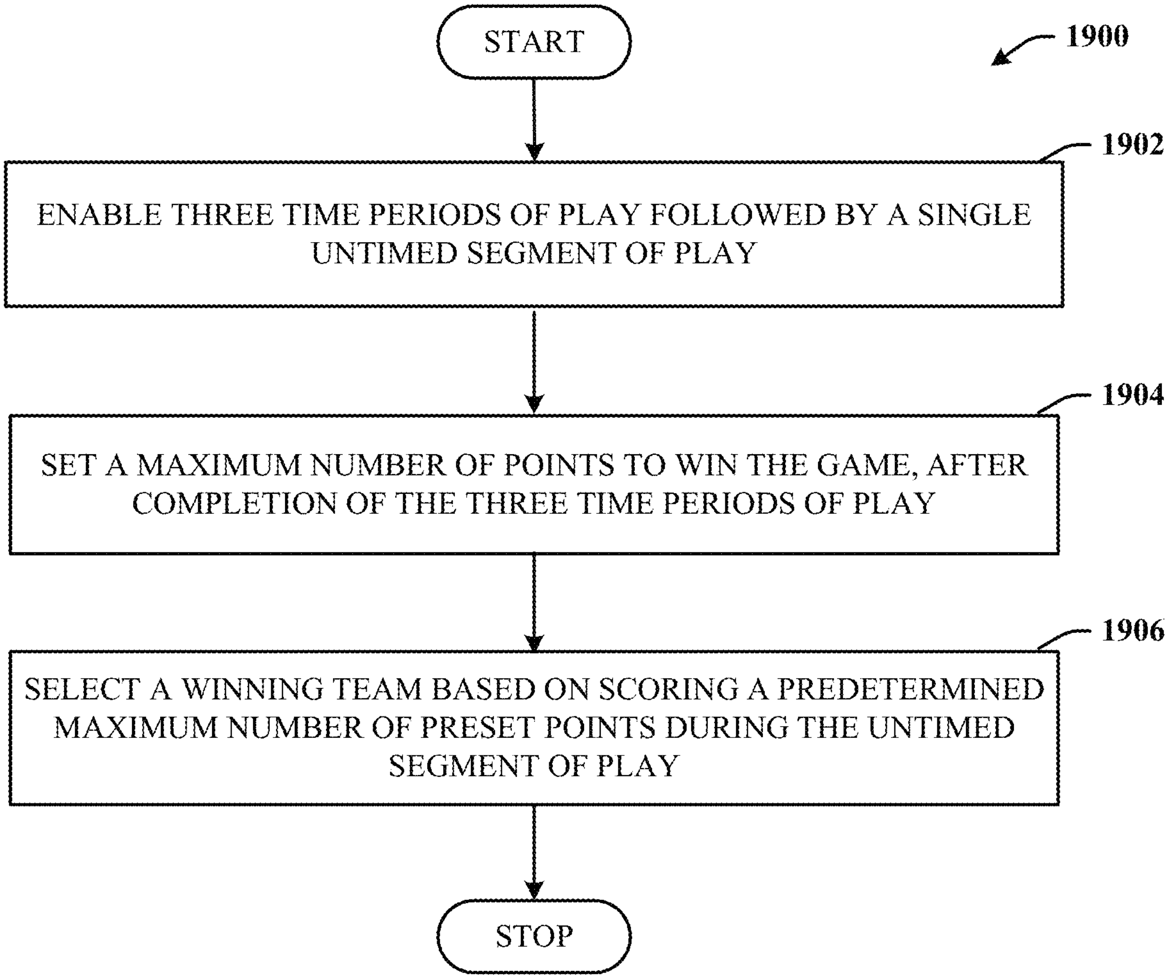
FIG. 19 illustrates a scoring method that limits play to three timed periods and ends play during untimed gameplay where the winner is determined in accordance with race to be the first team to score the most points to a predetermined score.

FIG. 19 illustrates a scoring method 1900 that limits play to three timed periods and ends play during final untimed segment of gameplay where the winner is determined in accordance with race to be the first team to score the most points to a predetermined score. The scoring method 1900 comprises, at 1902, enabling three time periods of play followed by a single untimed segment of play. At 1904, a maximum number of points is set to win the game, after completion of the three timed periods of play. At 1906, the winning team is selected based on scoring a predetermined maximum number of points during the untimed segment of play.

The method 1900 can further comprise imposing on the team trailing by a deficit value after the three time periods, a requirement to score the maximum number of points from the deficit value in order to tie or win the game from the opposing team.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A basketball game system, the system comprising:

a court system having a play surface on which gameplay occurs, the play surface defined by a boundary line imposed on the play surface and within which gameplay occurs, the court system comprising:

shot locations and shot areas, the shot locations defined by shot location lines on the play surface and the shot areas defined by shot area lines on the play surface; and a goal system comprising a respective backboard suspended above the play surface at each opposing farthest end of the play surface;

an instrumentation system of sensors which detects play activities within the boundary line of the court system and non-player activities outside the boundary line of the court system, the instrumentation system derives ball data sensed from ball location and ball heading as a player advances the ball toward a specific goal, the instrumentation system interfaces to the goal system to control features of the respective backboards during the gameplay, the instrumentation system executes rules of gameplay as part of the gameplay, the rules based in part on the ball data, player and non-player activities relative to the court system, the goal system, lines on the play surface, and player interactions relative to each other and the lines during the gameplay, the gameplay employed as part of a virtual game, the virtual game mimics at least one of a game previously played, a game currently being played, or a computing device generated game; and a respective penalty box for each of two teams participating in the gameplay, each penalty box of a respective team located outside the boundary line, wherein each respective penalty box can accommodate at least one player who has created an infraction, the infraction time-based and after time expiration the one player can be released for further gameplay play or ejected from the game.

2. The system of claim 1, wherein the virtual game can be played using consoles, virtual reality glasses and headsets, electronic eyewear, avatars, neural nets, augmented reality, artificial intelligence, and television monitors.

3. The system of claim 1, wherein the virtual game enables a single user to compete as part of a first virtual team against another virtual team, one or both virtual teams generated by a computing device.

4. The system of claim 1, wherein the virtual game and the physical game comprise no more than three periods of agreed-upon timed gameplay.

5. The system of claim 1, wherein the gameplay includes at least six players and up to four referees who officiate the gameplay.

6. The system of claim 1, further comprising a respective penalty box for each of two teams participating in the gameplay, wherein the rules of gameplay include directing at least one of an official, a coach, or a player to the penalty box due to one or more penalties.

7. The system of claim 1, wherein the goal system is controlled to display a shot cue on a corresponding backboard based on location and heading of a player currently in control of the basketball, the cue suggests where a ball of a shot made by the player should impact the corresponding backboard to score a goal.

8. The system of claim 7, wherein the shot cue is displayed only when attempting a goal which scores at least a predetermined number of points.

9. The system of claim 7, wherein the shot cue is displayed only when attempting a goal from a specified location on the court.

10. The system of claim 7, wherein the shot cue is prevented from display on the backboard when the player attempting the shot causes an infraction while attempting the shot.

11. A basketball game system, the system comprising:

a court system having a play surface on which gameplay occurs, the play surface defined by a boundary line imposed on the play surface and within which gameplay occurs, the court system further comprising shot locations and shot areas, the shot locations defined by shot location lines on the play surface and the shot areas defined by shot area lines on the play surface, and a goal system comprising a respective backboard suspended above the play surface at each opposing farthest end of the play surface;

an instrumentation system which comprises sensors to detect activities within the boundary line of the court system, which activities detected comprise ball data sensed from ball location and ball handler identification as the ball handler attempts to advance the ball toward a specific goal, line infraction data obtained relative to play surface lines, player infraction data related to player interactions during gameplay, and shot point data to score relative to a shot location line;

a respective penalty box for each team in which to serve a time-based penalty assessed for an infraction, the respective penalty box located outside the boundary line and proximate to a corresponding team, each respective penalty box can accommodate at least one player assessed with the time-based penalty, such that after expiration of the associated penalty time, the at least one player can be released for further gameplay play or ejected from the game; and a computing device which generates the basketball game and game play as a virtual game based on data of the sensors of the instrumentation system, the virtual game mimics at least one of a previous game played, a game currently being played, or a computing device generated game, the virtual game enables a single user to compete as part of a first virtual team against another virtual team, one or both virtual teams generated by a computing device, the virtual game played using at least one of consoles, virtual reality glasses, virtual reality headsets, avatars, artificial intelligence, or augmented reality technology.

12. The system of claim 11, wherein a penalty assessed and to serve in the penalty box relates to a break-away foul, a single technical foul, two single technical fouls, and a double technical foul.

13. The system of claim 11, wherein the penalty assessed for a single technical foul after a prior double technical foul or a double technical foul after a prior single technical foul, is ejection from the game.

14. The system of claim 11, wherein a penalty assessed for a single flagrant foul is equivalent to a single technical foul, which is two minutes in the penalty box.

15. The system of claim 11, wherein a penalty assessed for a second flagrant foul is equivalent to a double technical foul, which is five minutes in the penalty box.

16. The system of claim 11, wherein a player serving time in the penalty box can return to play only when there is an official stoppage of play.

17. The system of claim 11, wherein a coach is subject to an assessed infraction by serving time in the penalty box.

18. The system of claim 17, wherein the coach is subject to an assessed additional infraction for coaching while in the penalty box, which time associated with the additional infraction is served while the coach is in the penalty box for a prior infraction.

19. The system of claim 11, wherein a referee is subject to an assessed infraction and penalized by serving time in the penalty box.

20. The system of claim 11, wherein the line infraction data is processed to determine when a shot attempt by a player is to be a specific point value.

21. The system of claim 11, wherein the virtual game played using at least one of electronic eyewear, neural nets, or television monitors, the virtual game enables a single user to compete as part of a first virtual team against another virtual team, one or both virtual teams generated by a computing device.

22. A basketball game system, the system comprising:

a court system having a play surface on which gameplay occurs, the play surface defined by a boundary line imposed on the play surface and within which gameplay occurs, the court system further comprising shot locations and shot areas, the shot locations defined by shot location lines on the play surface and the shot areas defined by shot area lines on the play surface, and a goal system comprising a respective backboard suspended above the play surface at each opposing farthest end of the play surface;

an instrumentation system which comprises sensors to detect activities within the boundary line of the court system, which activities detected comprise ball data sensed from ball location and ball handler identification as the ball handler attempts to advance the ball toward a specific goal, line infraction data obtained relative to play surface lines, player infraction data related to player interactions during gameplay, and shot point data to score relative to a shot location line, the gameplay employed as part of a virtual game, the virtual game mimics at least one of a game previously played, a game currently being played, or a computing device generated game; and a respective penalty box for each team in which to serve a time-based penalty assessed for an infraction, the respective penalty box located outside the boundary line and proximate to a corresponding team, each respective penalty box can accommodate at least one player assessed with an infraction, the infraction time-based such that after expiration of the associated infraction time, the at least one player can be released for further gameplay play or ejected from the game.

23. The system of claim 22, wherein the instrumentation system further comprises a shot location system which detects on the play surface from where a shot attempt of a specific point amount has occurred, a shot detection system which detects on the play surface when a shot is taken, a goal indication system which detects which of several goal indications to activate based on a made or missed goal, an image recognition system which detects the player who attempted the shot, and a floor sensing system which detects location of the ball and players relative to lines on the play surface.

24. The system of claim 23, wherein the image recognition system further detects activities on and off the court as relate to behavior of players and non-players, the players and non-players can be assessed penalties associated with the activities.

25. The system of claim 22, wherein the basketball game system is employed as a virtual game the virtual game played using at least one of consoles, virtual reality glasses and headsets, electronic eyewear, avatars, neural nets, augmented reality, artificial intelligence, or television monitors, the virtual game enables a single user to compete as part of a first virtual team against another virtual team, one or both virtual teams generated by a computing device.

* * * * *